United States Patent [19]

Kohsaka et al.

[11] Patent Number: 5,159,198
[45] Date of Patent: Oct. 27, 1992

[54] INFRARED IMAGE PICK-UP APPARATUS

[75] Inventors: Hiroshi Kohsaka; Masakazu Nakanishi; Toshio Miyashita; Isamu Nakajima; Yuji Takumiya; Kenji Hamaguri; Hiroaki Iio, all of Osaka, Japan

[73] Assignee: Minolta Camera Kabushiki Kaisha, Osaka, Japan

[21] Appl. No.: 544,324

[22] Filed: Jun. 26, 1990

[30] Foreign Application Priority Data

Jun. 27, 1989 [JP] Japan .................. 1-164357
Jun. 29, 1989 [JP] Japan .................. 1-167323
Jun. 30, 1989 [JP] Japan .................. 1-170225
Jun. 30, 1989 [JP] Japan .................. 1-170228

[51] Int. Cl.$^5$ ............................ G01J 5/48
[52] U.S. Cl. .................. 250/330; 358/113; 354/82; 354/293; 352/243
[58] Field of Search ......... 250/330, 332, 334, 370.08; 358/113, 229; 354/81, 82, 292; 352/243

[56] References Cited

U.S. PATENT DOCUMENTS

| 4,010,367 | 3/1977 | Suzuki | 250/334 |
| 4,244,500 | 1/1981 | Fournier | 224/265 |
| 4,466,748 | 8/1984 | Needham | 250/352 |
| 4,550,343 | 10/1985 | Nakatani | 358/229 |
| 4,717,952 | 1/1988 | Kohayakawa et al. | 358/113 |

FOREIGN PATENT DOCUMENTS

| 0136624 | 4/1985 | European Pat. Off. |
| 62-19728 | 1/1987 | Japan |
| 2073989 | 10/1981 | United Kingdom |
| 2115637 | 9/1983 | United Kingdom |

OTHER PUBLICATIONS

Catalogue "Agema Thermovision 450 Information", 1988 by Agema Infrared Systems.
Catalogue "Probeye Model 7100 Thermal Video System", 1986 Hughs Aircraft Company.

Primary Examiner—Carolyn E. Fields
Assistant Examiner—Drew A. Dunn
Attorney, Agent, or Firm—Price, Gess & Ubell

[57] ABSTRACT

An infrared image pick-up apparatus includes: a body having a condenser lens for condensing an infrared ray emitted from an object, a sensor for detecting intensity of the condensed ray and generating an electric signal corresponding to the intensity, a signal processing circuit for processing the signal from the sensor, and a display device for displaying a two-dimensional infrared image in accordance with a signal from the circuit; and a grip provided separately from the body and attached thereto. The grip has an operating member for adjusting an infrared image on the display device. An infrared image pick-up apparatus includes: the lens, the sensor, a display device for simultaneously displaying both the intensity of the ray as a two-dimensional image in accordance with a signal processed by the circuit and an offset level, which is served as reference intensity of an infrared ray in displaying the image in accordance with the signal from the circuit; and a control device for changing the offset level and change speed thereof. An infrared image pick-up apparatus includes: a detecting device for detecting an internal temperature of an inside of the apparatus; an internal temperature operation device for performing an operation on an internal temperature datra on the basis of a signal outputted from the detecting device; an outputting device for outputting data of power consumption of the apparatus; and a peripheral temperature operation device for performing estimation and an operation of a peripheral temperature on the basis of the data of the internal temperature and the consumption.

27 Claims, 39 Drawing Sheets

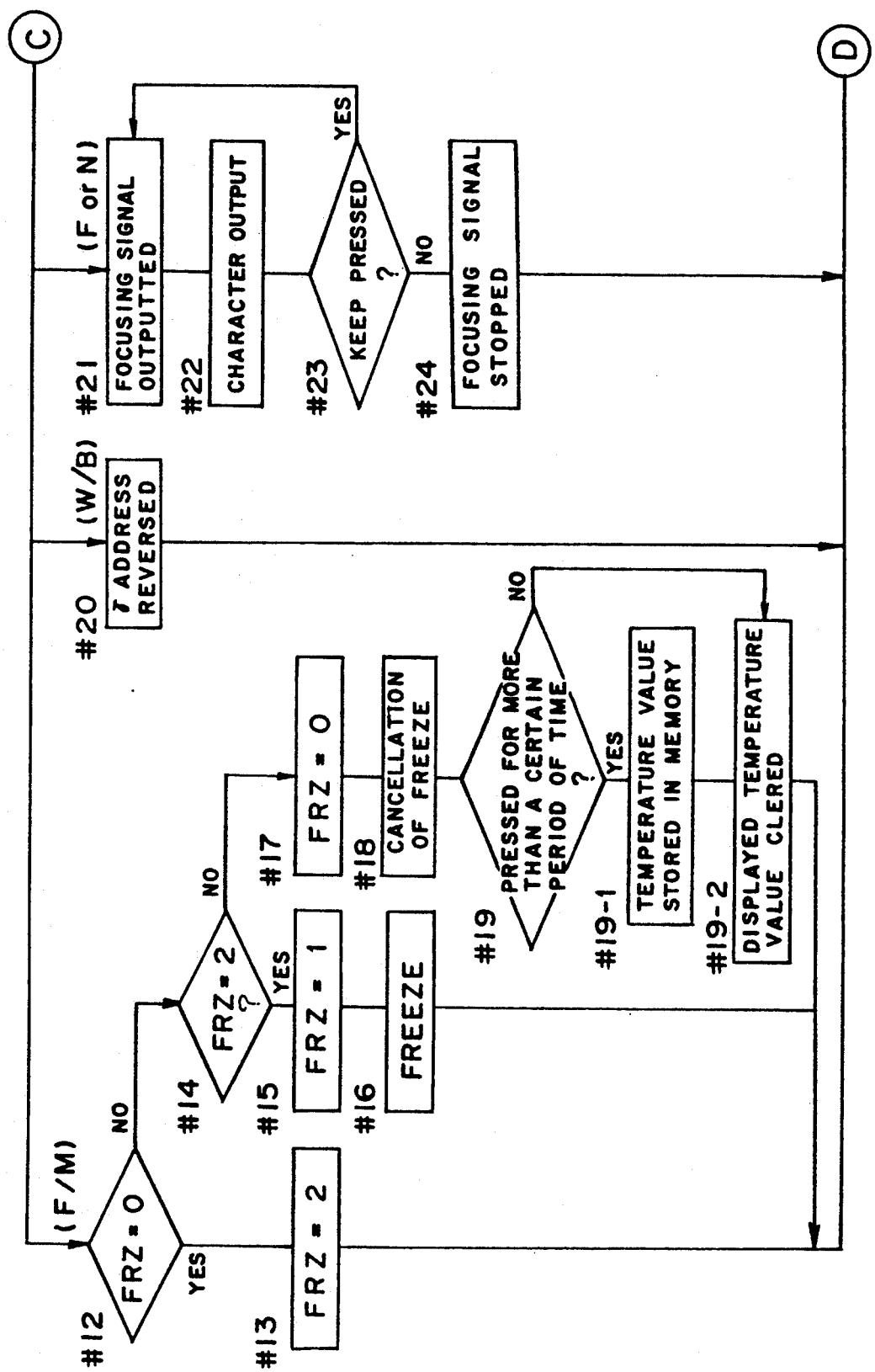

Fig. 6(C)

```
ADD ON LENS DATA
WIDE (x0.4) 1024 1024 1024
TELE (x2.5) 1024 1024 1024
AUX  (x5  ) 1024 1024 1024

LENS IN USE
WIDE

UNIT C

TIME
27/03/89 12:31
```

Fig. 6(B)

```
ADD ON LENS DATA
WIDE (x0.4) 1024 1024 1024
TELE (x2.5) 1024 1024 1024
AUX  (x5  ) 1024 1024 1024

LENS IN USE
WIDE

UNIT C

TIME
27/03/89 12:30
```

| BIT7 | 6 | 5 | 4 | 3 | 2 | 1 | 0 |
|---|---|---|---|---|---|---|---|
| — | — | — | BACK-UP | POWER SOURCE VOLTAGE | RANGE | EEPROM | POLYGON |

INFRARED IMAGE PICK-UP APPARATUS

BACKGROUND OF THE INVENTION

The present invention relates to an infrared image pick-up apparatus for detecting a temperature of an object to be measured.

1. Field of the Invention

In picking up an infrared image by the use of an infrared image pick-up apparatus, it is necessary to make various adjusting operations of the apparatus during observation of an object.

2. Description of Related Art

Various kinds of portable type infrared image pick-up apparatuses are known. According to a typical construction, the operation thereof is performed by the left hand while holding an apparatus by the shoulder and the right hand. According to the apparatus, in the infrared image adjusting operation during observation, it is necessary to operate keys while watching alternatively a CRT (cathode ray tube) and an operation panel. According to another example, operation keys are mounted on the camera section which is separately provided from the processor and the operation keys are manipulated by one hand with the grip projecting from the center portion of the camera section held by the other hand. However, the construction is very inconvenient to operate. Furthermore, according to this construction, it is necessary to hold the processor on the shoulder in addition to the camera section, which creates a restraint in any adjusting operation of the infrared image.

On the other hand, infrared rays in accordance with an object are always emitted from the object having a temperature higher than absolute zero. Utilizing this, infrared rays emitted from the object are detected to measure the temperature of the object, which is already known. Additionally, an infrared image pick-up apparatus is widely known to pick-up such rays in two-dimension so as to form an infrared image.

In the apparatus, it is necessary to designate a criterion temperature for a first display, which is called "offset level", (the first display normally is a lowest temperature level) and a width of a temperature range being displayed, which is called "window", in displaying a temperature range on a screen thereof.

In known manners, such an offset level is adjusted so that an infrared image is displayed with suitable temperature distribution while observing the image displayed on a screen of the apparatus. However, it is difficult to adjust at a constant level because an infrared image itself has a high temperature part and a low temperature part which are mixed with each other. Specially, in a case where graduations of infrared images in the previous observation and the current observation are intentionally coincided to each other or a case where different objects to be measured are intentionally displayed in the same scale, it is difficult to adjust an offset level to set it into a constant value only by observing an infrared image.

Additionally, the above-described known adjustment of the offset level has another disadvantage: Change of gain in converting the intensity of an infrared image to the graduation of an infrared image causes the offset level to move at too high speed or too low speed. The latter requires a long time period to adjust the offset level.

Furthermore, in an infrared image pick-up apparatus for detecting an infrared ray emitted from an object to be measured and thus obtaining a video image indicating its temperature distribution, disclosed in, for example, Japanese Laid-open Patent Publication No. 62-19728, the peripheral temperature of the object to be measured greatly affects the measured result thereof. Therefore, the consideration of the influence is taken by measuring the internal temperature of the inside of the apparatus as already known.

However, the apparatus has several disadvantages: The apparatus requires large power consumption, so that the difference between the internal temperature and the peripheral temperature of the apparatus is about 10° C. in a steady state. Furthermore, the apparatus has a large thermal capacity, so that it takes not less than one hour for the internal temperature to reach in a steady state. Additionally, it is necessary for measurement of an object with lower emissivity to correctly detect the peripheral temperature as well as the internal temperature of the apparatus for background correction.

On the other hand, the suitably usable temperature range of the apparatus is from −20° C. to 50° C., which is determined by the usable temperature range of electronic parts such as IC. If the apparatus is used other within the range, it is possible for the apparatus to cause failure. Therefore, it is necessary for a user to be informed of the possibility of the failure of the apparatus. Additionally, even though the apparatus is used within the range of −20° C. to 50° C. without the possibility of failure, when the apparatus is used other than a temperature range of 0° C. to 40° C., an error is caused in a measured temperature value in accordance with deterioration of the function of parts such as IC in the apparatus.

Accordingly, an essential object of the present invention is to remedy the above-described disadvantages in operations for adjusting an infrared image and to provide an infrared image pick-up apparatus capable of improving the operability in adjusting the infrared image.

Another important object of the present invention is to remedy such disadvantages in adjusting an offset level and to provide an infrared image pick-up apparatus capable of easily adjusting an offset level.

A further important object of the present invention is to remedy such disadvantages in correctly detecting a temperature of an object to be measured and to provide an infrared image pick-up apparatus capable of correctly estimating a peripheral temperature thereof by considering a power consumption amount thereof in estimating the peripheral temperature from an internal temperature, thereof utilizing that the peripheral temperature depends on the internal temperature, power consumption, and operating time of the apparatus, and thus detecting a temperature of an object to be measured.

A still further object of the present invention is to remedy such disadvantages in measuring a temperature of an object to be measured and to provide an infrared image pick-up apparatus capable of expressing a plurality of stages of warning displays such as a warning display when a peripheral temperature causes an error in a measured value in accordance with deterioration of functions of the apparatus and parts thereof and a warning display when a peripheral temperature causes possibility of failure of the apparatus and parts thereof, by always monitoring a peripheral temperature of the apparatus.

BRIEF DESCRIPTION OF THE DRAWINGS

These and other objects and features of the present invention will become clear from the following description taken in conjunction with the preferred embodiments thereof with reference to the accompanying drawings, in which:

FIGS. 3(a) to (d) are flowcharts showing the method for operating the apparatus;

FIGS. 6A–6C and 7A–7D show examples of displays;

FIG. 33 is a view for describing a range filter driving mechanism, in which

DETAILED DESCRIPTION OF THE EMBODIMENTS

Figure 1A:
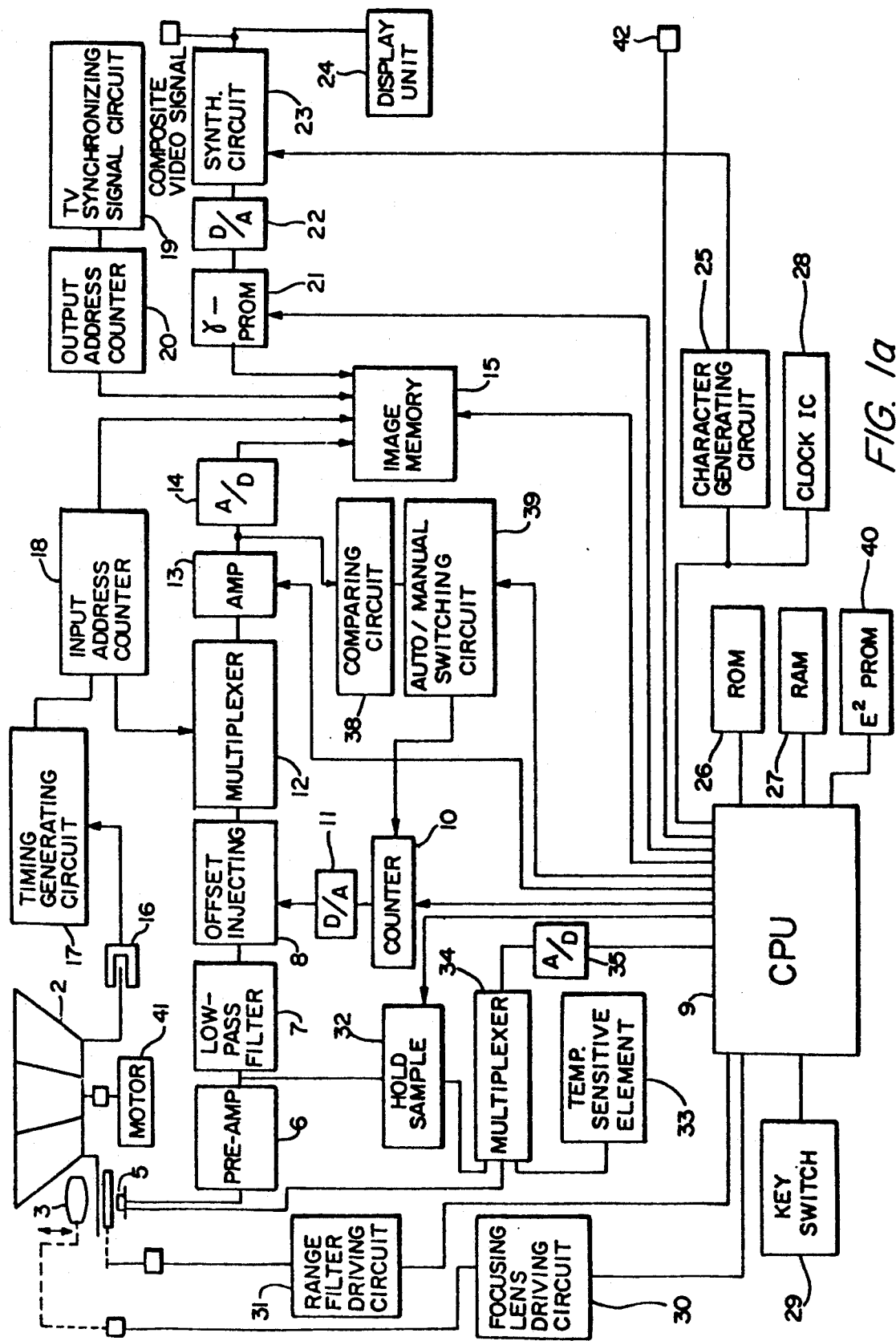
FIG. 1(a) is a block diagram showing each structure in an apparatus according to one embodiment of the present invention.

Before the description of the present invention proceeds, it is to be noted that like parts are designated by like reference numerals throughout the accompanying drawings.

Firstly, an infrared image pick-up apparatus of one preferred embodiment according to the present invention will be hereinafter described with reference to FIGS. 1 through 23.

Infrared rays are always emitted from an object having a temperature higher than the absolute zero, and there is a correlation between the temperature of the object and its emission quantity. Utilizing this, infrared rays emitted from each part of the object are picked up, signal processings are executed, and the variation of the quantity of infrared rays is displayed in the form of the difference of a luminance, for example, color tone and color hue.

FIG. 1 is a block diagram indicating each structure of the apparatus in this embodiment. FIG. 2 is an illustration for describing the operation of a two-dimensional scan to be carried out by the apparatus according to this embodiment. Infrared rays emitted from an object are reflected by a polygon mirror 2, then converged on a multi-element infrared detector 5 through a condenser lens 3 and a filter 4 selected by an observed temperature range. The infrared detector outputs a signal corresponding to the quantity of each incident infrared ray. The polygon mirror 2 rotates in one direction at a constant speed by a motor 41. Accordingly, one band is scanned horizontally by the rotation of one face of the polygon mirror 2 (FIG. 2). One band includes a plurality of lines in correspondence with the number of elements of the multi-element detector 5. On the other hand, since each of adjacent faces of the polygon mirror 2 forms a certain angle with each other, faces and bands become correspondent to each other. For example, the first face of the polygon mirror 2 becomes correspondent to the first band $B_1$, and the second face becomes correspondent to the second band $B_2$ while the polygon mirror 2 is rotating. Thus, each band is scanned in the vertical direction thereof. In such a manner, scans are performed in the vertical and horizontal directions, and two-dimensional information of infrared rays of the object is obtained by lights sequentially received by the multi-element infrared detector 5.

The output of the signal thus obtained by the detector 5 is amplified by a pre-amplifier 6, then processed by a low-pass filter 7, thereafter inputted to an offset injecting circuit 8. As will be described later, in addition to the output signal outputted from the low-pass filter 7, the output signal outputted from a D/A (digital/analog) converter 11 is injected to the offset injecting circuit 8. In response to the signals, the reference level (offset level) of the output signal of the low-pass filter 7 can be freely altered. The output signal of the offset injecting circuit 8 is inputted to a multiplexer 12, and signals corresponding to the number of elements of the multi-element detector 5 are sequentially multiplexed, then amplified by an amplifier 13, and thereafter, inputted to an A/D (analog/digital) converter 14. The signals converted into digital values by the A/D converter 14 are guided to an image memory 15. On the other hand, the polygon mirror 2 rotates and its rotation is detected by a photo-sensor 16. The output from the photo-sensor 16 is inputted to an input address counter 18 through a timing generating circuit 17, and regularly counted according to the rotation of the polygon mirror 2. This counted value is supplied as the address of the image memory 15. Then, the digital signals guided to the above described image memory 15 are sequentially and regularly stored according to this input address. Thus, image data corresponding to one screen is stored in the image memory 15 according to one full rotation of the polygon mirror 2. The data stored in the image memory 15 is read out and displayed, which will be described hereinbelow.

A signal synchronized with a television signal and outputted from a television synchronizing signal generator 19 is inputted to an output address counter 20. Based on the television synchronizing signals, the output address counter 20 successively generates addresses for specifying data in the image memory 15. The output from the output address counter 20 is inputted to the address of the image memory 15, and data of specified addresses are sequentially read out, and inputted to a read $\tau$-PROM (gamma programmable read-only memory) 21. The $\tau$-PROM 21 makes a gamma correction. Since, in general, the temperature of the object is not linear with the energy thereof, nor is linear the voltage of the CRT screen with the luminance thereof, nor is linear the quantity of incident rays which enter the human eye with quantity sensed by the human eye, the $\tau$-PROM 21 makes a correction so as to obtain a linear relationship between the temperature of the object and the quantity sensed by the human eye. The $\tau$-corrected output from the $\tau$-PROM 21 is inputted to a D/A convertor 22 in which the input is converted into an analog value. A synthesizing circuit 23 synthesizes the analog value obtained in the D/A convertor 22 and various types of character information generated in a character generating circuit 25. The output from the synthesizing circuit 23 is inputted to a display unit 24 for a display. Since the output from the synthesizing circuit 23 can be supplied to the outside as a composite video signal, the composite video signal can be supplied to an external monitor television for a display, and the supply thereof to a VTR (video tape recorder) allows a recording. A terminal 42 outputs a VTR start/stop signal.

As described above, infrared images are generated and displayed while a CPU (central processing unit) 9 controls the apparatus, calculates the object temperature, and controls a character display.

The focusing, an offset level, and a gain for adjustment of the infrared image will be described hereinbelow. The adjustment can be executed by the CPU 9 by detection of the pressing of a key switch positioned at a key switch 29.

The CPU 9 detects the pressing of a focusing key, thus outputting a motor driving signal to a focusing lens driving circuit 30. A motor 36 drives the infrared condenser lens 3 vertically in response to the motor driving signal. Thus, a focusing is performed.

The offset adjustment is carried out by moving up or down the level of a whole temperature range displayed on the screen. The pressing of the O/W key allows the CPU 9 to switch a mode between the automatic offset adjusting mode and the manual offset adjusting mode (including the mode for adjusting the window).

Figure 1B:
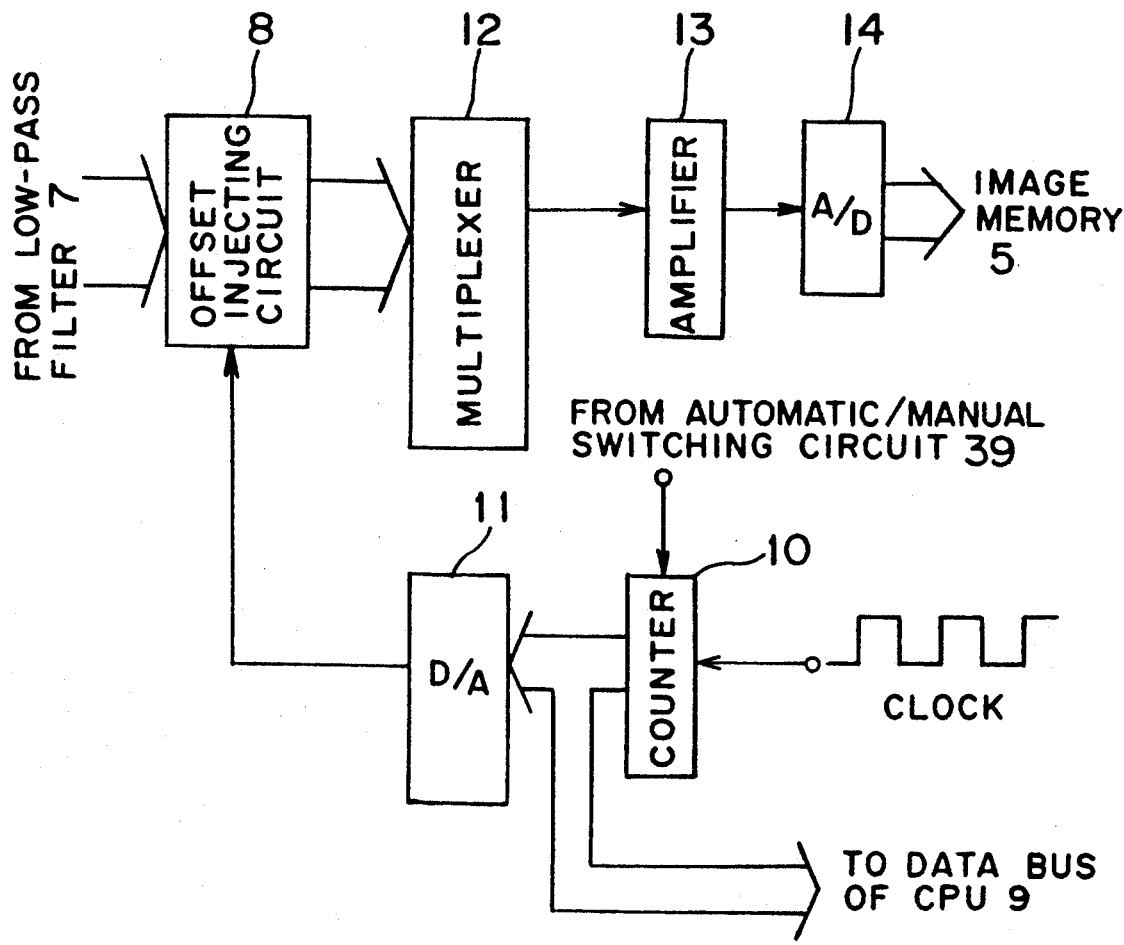
FIG. 1(b) is a view showing a circuit relating to an offset adjustment of the apparatus.
Figure 1C:
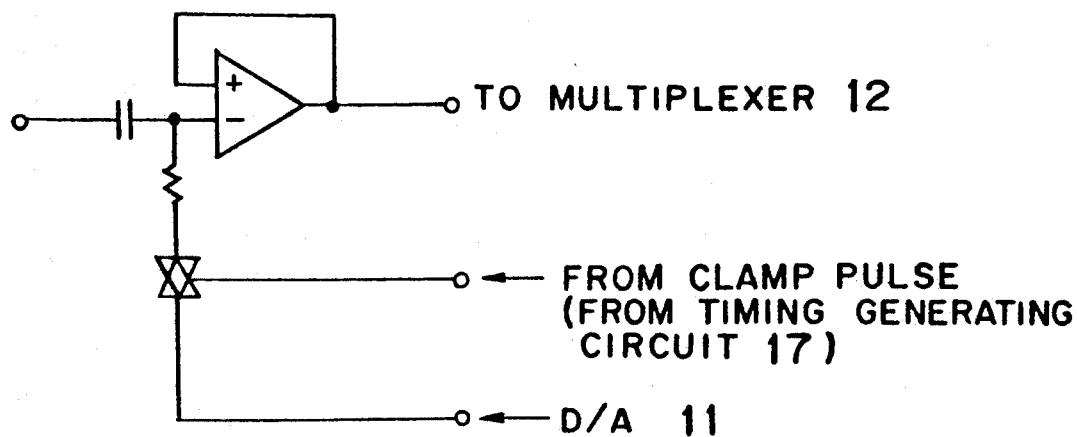
FIG. 1(c) is a view showing an example of the construction of an offset injecting circuit.
Figure 2:
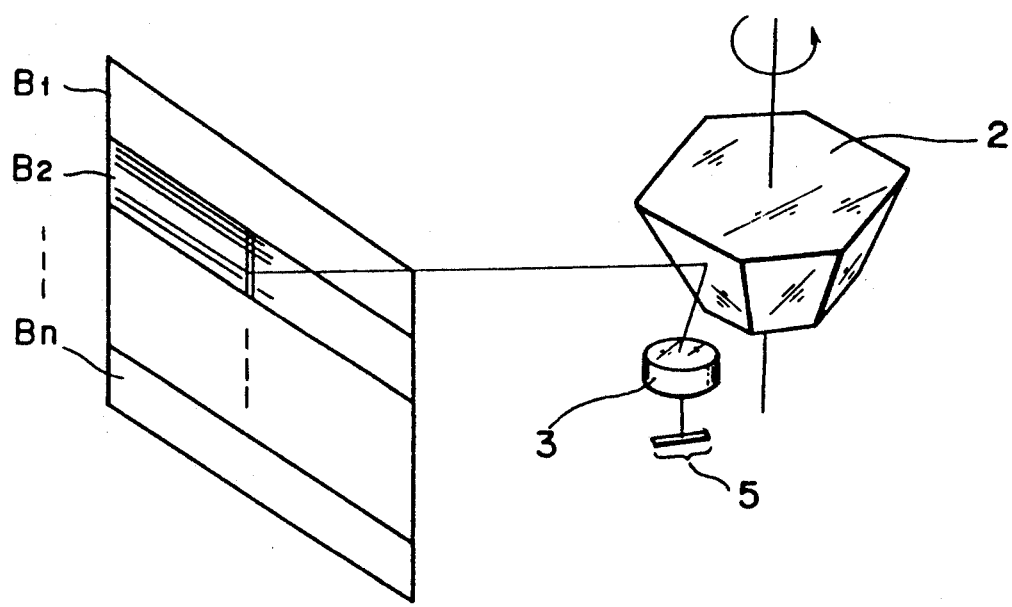
FIG. 2 is an illustration for explaining a two-dimensional scanning to be performed by the apparatus.

The offset adjustment of this embodiment will be described referring to FIG. 1(b) showing the circuit relating to the offset adjustment and FIG. 1(c) showing an example of the construction of the offset injecting circuit 8.

Figure 24:
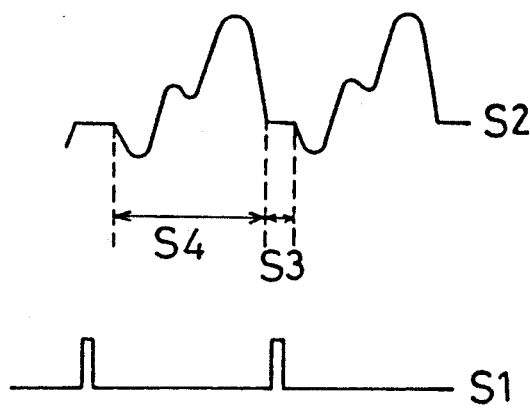
FIG. 24 is a view showing a pulse signal from a timing generating circuit and a pulse signal from a low-pass filter.
Figure 25:
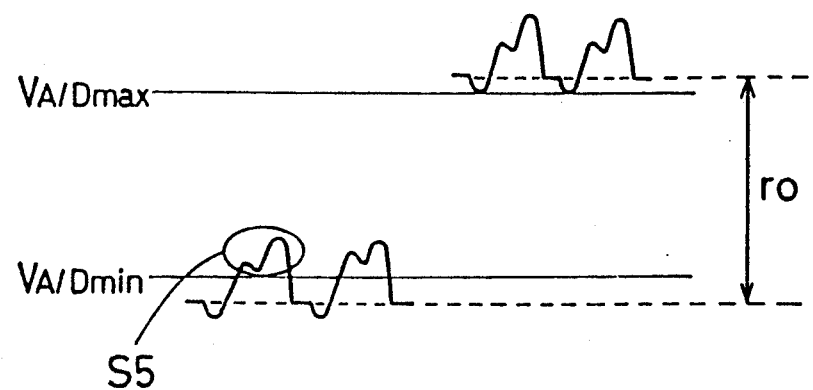
FIG. 25 is a view showing a relationship between the level of the whole output signal of the low-pass filter and an offset voltage adjustable range.

A chopper (not shown) fixed to the polygon mirror 2 covers the detector 5 during the period in which the polygon mirror 2 does not scan the object, thus preventing infrared rays emitted by on object from entering into the detector 5. During the above-described period, the timing generating circuit 17 outputs a pulse signal (clamp pulse, namely, S1 shown below in FIG. 24). The output signal S2 of the low-pass filter 7 is shown on the upper side of FIG. 24. During the output of the clamp pulse, this signal S2 becomes a signal S3 (as S4 is shown in FIG. 24, the signal S2 may be lower than the signal S3 if the temperature of the object is lower than that of the chopper) corresponding to energy radiated by the chopper itself because the chopper covers the detector 5. Accordingly, as shown in FIG. 25, the level of the whole output signal of the low-pass filter 7 can be arbitrarily changed within the offset voltage adjustable range r0 by clamping the signal S3 by means of an arbitrary offset voltage during the output of the clamp pulse. In FIG. 25, VA/Dmax and VA/Dmin indicate the maximum level and the minimum level that the A/D converter 14 can make an analog to digital conversion, respectively and signals within this range are finally displayed on the screen by the density in either white or black. Therefore, if the observation of a portion S5 in which the intensity of infrared rays is high (portion in which temperature is high) is desired, the offset level should be set to be low as shown in the left of FIG. 25. If the offset voltage is set to be too high as shown in the right of FIG. 25, portions exceeding VA/Dmax are displayed in white (or black depending on the setting of the W/B key).

In the automatic offset adjusting mode, the CPU 9 transmits an automatic selection signal to an automatic/manual switching circuit 39. Thus, a signal outputted from a comparing circuit 38 is capable of passing through the automatic/manual switching circuit 39, thereby being inputted to a counter 10. The comparing circuit 38 outputs a down instruction signal when the average level of signals outputted from the amplifier 13 is higher than a predetermined value Va and an up instruction signal when the average level of the signals outputted from the amplifier 13 is lower than a predetermined value Vb which is lower than Va (namely, Vb<Va). The clock outputted from the CPU 9 has been inputted to the counter 10 and based on the number of the clock pulses, the counter 10 increases or decreases a count value according to the up instruction signal or the down instruction signal outputted from the comparing circuit 38, thus outputting the counted value to the D/A converter 11. Thus, the offset injection amount of the offset injecting circuit 8 increases or decreases, so that the output level of the amplifier 13 returns a value between Va and Vb. The offset can be automatically adjusted by such a feedback control. The offset injecting circuit 8 can be constructed of, for example, a circuit as shown in FIG. 1(c) for each detecting element of the infrared detector 5. The reference voltages Va and Vb of the comparing circuit 38 are determined by a circuit constant.

In the case of the manual offset adjustment, the CPU 9 transmits a manual selection signal to the automatic/manual switching circuit 39, thus invalidating a signal from the comparing circuit 38. Thereafter, according to the operation of the + key or the − key, the CPU 9 controls a clock pulse that it transmits to the counter 10 and changes the offset by increasing or decreasing the output of the D/A converter 11.

The change speed in the offset adjustment is variable according to the gain of the amplifier 13, which will be described in detail later.

Figure 1D:
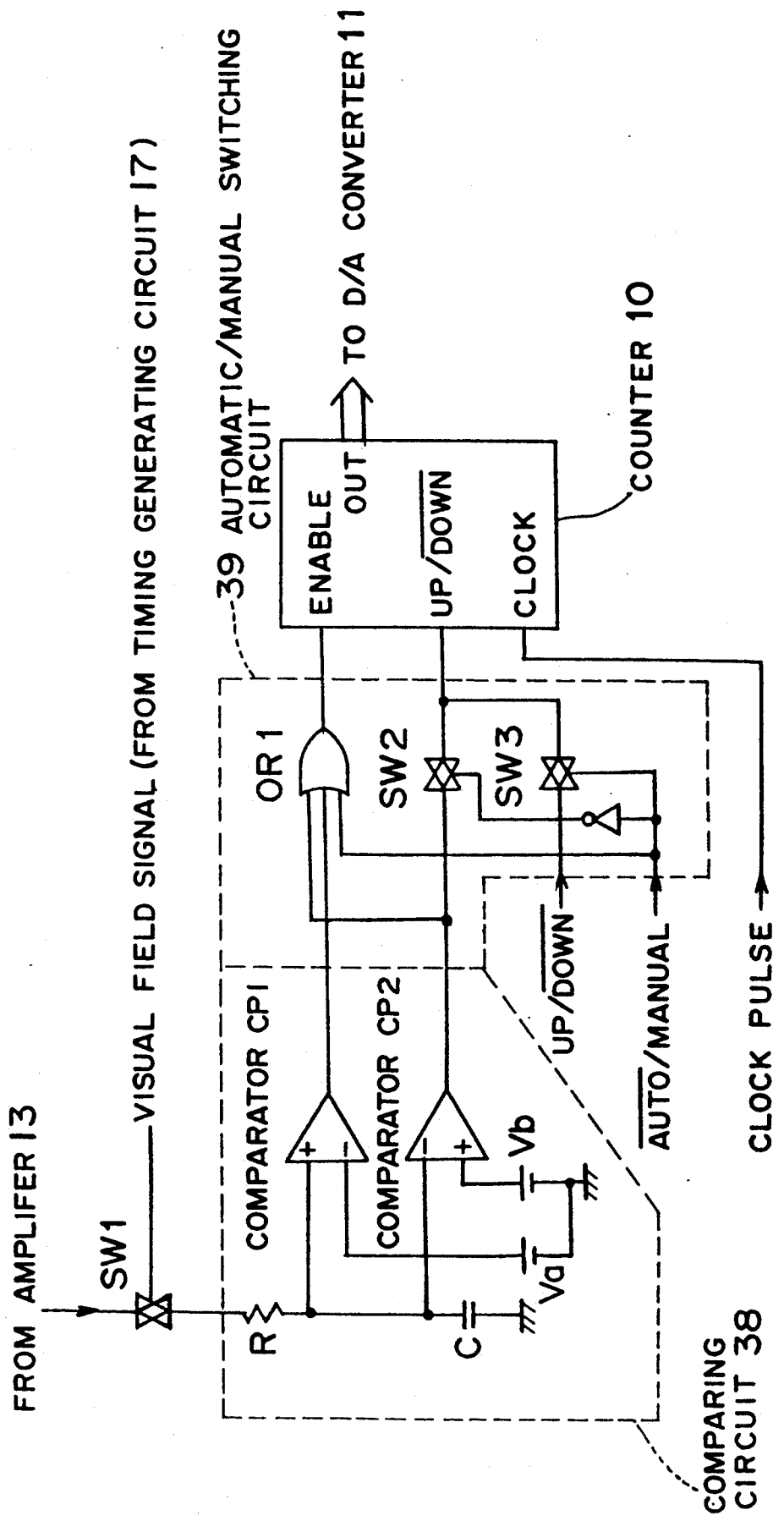
FIG. 1(d) is a view showing a comparing circuit, an automatic/manual switching circuit, and a counter of the apparatus.

Next, the embodiment of the comparing circuit 38, the automatic/manual switching circuit 39, and the counter 10 is shown in FIG. 1(d). The analog switch SW1 is controlled to be ON only when the polygon mirror 2 is scanning the effective visual field according to a visual field signal outputted from the timing generating circuit 17. The output signal of the amplifier 13 is inputted to the comparing circuit 38 and averaged by the resistor R and the comparator CP1 while the analog switch SW1 is ON. The averaged voltage is inputted to the non-inverting input terminal (+) of the comparator CP1 and the inverting terminal (−) of the comparator CP2. On the other hand, the reference voltage Va has been already inputted to the inverting terminal (−) of the comparator CP1 and the reference voltage Vb has been already inputted to the non-inverting terminal (+) of the comparator CP2. In this construction, if the averaged voltage is greater than Va, a signal of "1" is outputted from the comparator CP1, and if the averaged voltage is smaller than Vb, a signal of "1" is outputted from the comparator CP2. These signals are inputted to the automatic/manual switching circuit 39.

In addition to these signals, an $\overline{\text{AUTO/MANUAL}}$ signal and an UP/$\overline{\text{DOWN}}$ signal outputted from the CPU 9 have been already inputted to the automatic/manual switching circuit 39. In the automatic offset adjusting mode, the value of the $\overline{\text{AUTO/MANUAL}}$ signal is "0" (automatic selection), the analog switch SW2 is turned on, and the analog switch SW3 is turned off. Accordingly, a signal outputted from the comparator CP2 is inputted to the UP/$\overline{\text{DOWN}}$ terminal of the counter 10.

If the averaged voltage is greater than Va or smaller than Vb, the output of the OR circuit OR1 becomes "1" and this signal is inputted to the ENABLE terminal of the counter 10. As a result, the counter 10 counts clock pulses supplied from the CPU 9. At this time, when the output of the comparator CP2 is "1", i.e., when the averaged voltage is smaller than Vb, the counter 10 goes into the counter up-mode and the output of the D/A converter 11 becomes great by counting clock pulses supplied from the CPU 9. As a result, the offset voltage becomes large and the output of the amplifier 13 becomes great. When the output of the amplifier 13 becomes a value between Va and Vb, an input signal to the ENABLE terminal of the counter 10 changes to "0", with the result that the counting is stopped and the change of the offset voltage is stopped. When the output of the comparator CP2 is "0", i.e., when the output of the comparator CP1 is "1", the averaged voltage is greater than Va. At this time, the counter 10 goes into the count down-mode and the output of the D/A converter 11 is lowered by the clock pulses supplied from the CPU 9, so that similarly to the above, the counting is stopped when the averaged voltage becomes a value between Va and Vb. Thus, the offset amount is automatically adjusted and the averaged voltage of the output of the amplifier 13 is kept between Va and Vb.

Next, in the manual offset adjusting mode, the $\overline{\text{AUTO/MANUAL}}$ signal is "1" (manual selection signal), so that the output signal of the OR circuit OR1 becomes "1" and this signal is inputted to the ENABLE terminal of the counter 10. That is, in the manual offset adjusting mode, the signal of "1" is always inputted to the ENABLE terminal. At this time, the analog switch SW2 is turned off and the analog switch SW3 is turned on. Accordingly, the UP/$\overline{\text{DOWN}}$ signal from the CPU 9 is inputted to the UP/$\overline{\text{DOWN}}$ terminal of the counter 10 and based on this signal, the counter 10 executes a count-up or a count-down. Then, an offset amount is injected according to a counted value. The UP/$\overline{\text{DOWN}}$ signal and the clock pulse are outputted according to the operation of the + key or the − key and a counting is executed only when the + key or the − key is operated.

Next, wherein calculation that the CPU 9 calculates a temperature from a signal obtained by the detector 5 will be described.

A signal outputted from the pre-amplifier 6 is inputted to a sample holding circuit 32, and sampled by a sampling signal from the CPU 9. The sample-hold signal is inputted to a multiplexer 34. A signal of sensitivity corresponding to the temperature of the detector 5 and the output signal of a temperature sensitive element 33 accommodated in the apparatus are inputted to the multiplexer 34. These three signals are sequentially multiplexed and inputted to the A/D convertor 35 so as to be converted into a digital value, respectively, and then the values are stored in the CPU 9. The CPU 9 calculates the object temperature based on these three digital values. The temperature calculation described above is executed when a specific key positioned on the key switch 29 is pressed. In addition, the CPU 9 is capable of distinguishing the present time by accessing to a clock IC (integrated circuit) 28 and further displaying, the above-described character information such as the calculated object temperature and time, on the display unit 24 by transmitting a character signal to the character generating circuit 25.

A program for executing the operation of the CPU 9 is loaded into a ROM (read-only memory) 26, and a RAM (random access memory) 27 is used so that the CPU 9 stores data. An E$^2$PROM (electrically erasable programmable read-only memory) 40 stores corrected information that the CPU 9 uses to calculate temperatures.

Figure 4:
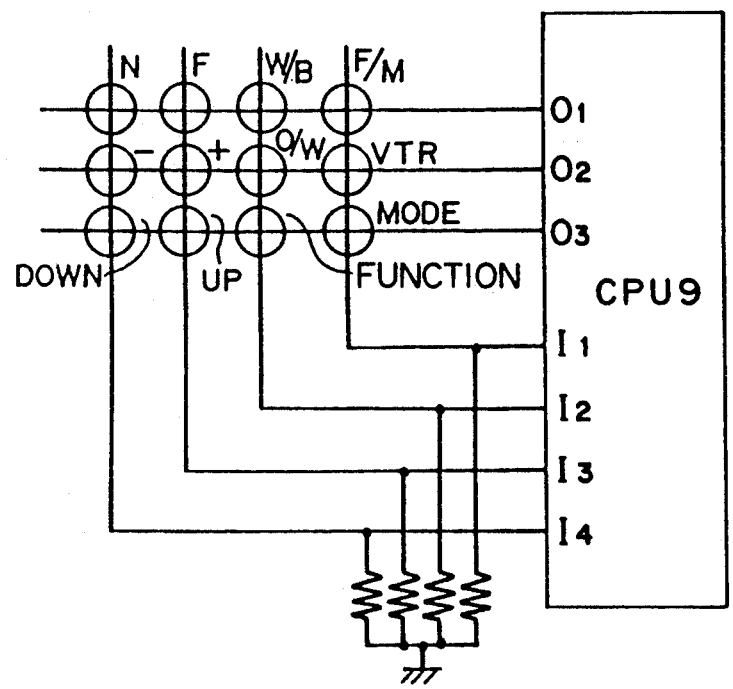
FIG. 4 is an explanatory view for explaining various operation keys mounted on the apparatus.

The key switch 29 is provided with various types of keys as shown in FIG. 4. As previously described, the key switch 29 is constructed of the focusing key for adjusting the infrared image, keys for adjusting the offset and the window, and the like. Patterns which cross in the switch become conductive with each other when the switch is pressed. The CPU 9 first sets an output terminal O$_1$ to a high level so as to detect which of the switches has been pressed. Then, input terminals I$_1$ through I$_4$ are scanned to detect a terminal which has become the high level. Supposing that the switch F has been pressed, the output terminal O$_1$ and the input terminal I$_3$ become conductive with each other, with the result that the input terminal I$_3$ becomes the high level. The CPU 9 detects which of the switches has been pressed according to the combination of the high level terminals. Input terminals I$_1$ to I$_4$ are all at low levels when none of the switches N, F, W/B, and F/M are pressed. In this case, the CPU 9 then sets the output terminal O$_2$ to the high level, thus scanning the input terminals I$_1$ to I$_4$ as well. The output terminal O$_3$ is similarly scanned. The functions of these keys will be briefly described hereinbelow.

MODE key: used to perform switch-over of a display mode displayed at the display unit 24 between the screen for the initial display and the screen for adjusting an infrared image;

FUNCTION key: used to select a set value so as to be changed;

UP/DOWN key: used to change a selected set value;

VTR key: used to output a start/stop signal of a VTR during use thereof;

O/W key: used to select a window adjustment in automatic offset, a manual offset adjustment, or a window adjustment in a manual offset;

+ and − keys: used to change the offset and the window;

F/M key: used to execute temperature measurement, freeze of the screen (hereinafter referred to freeze), the storage of a temperature value into the memory, and the cancellation of a freeze;

W/B key: used to select whether a high temperature section is displayed in white or black;

F key and N key: used to adjust a focusing condition.

Figure 3A:
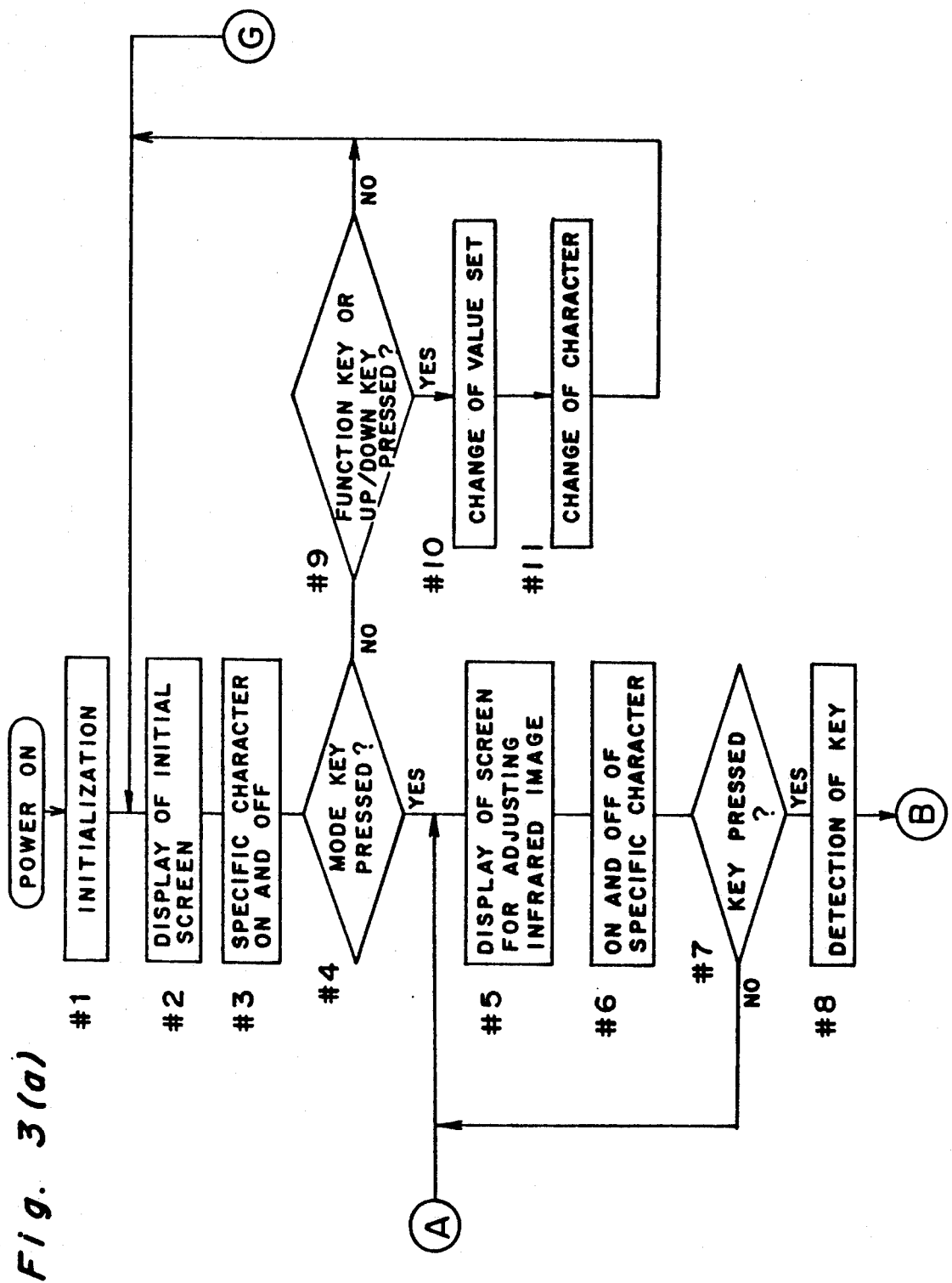
Figure 3C:
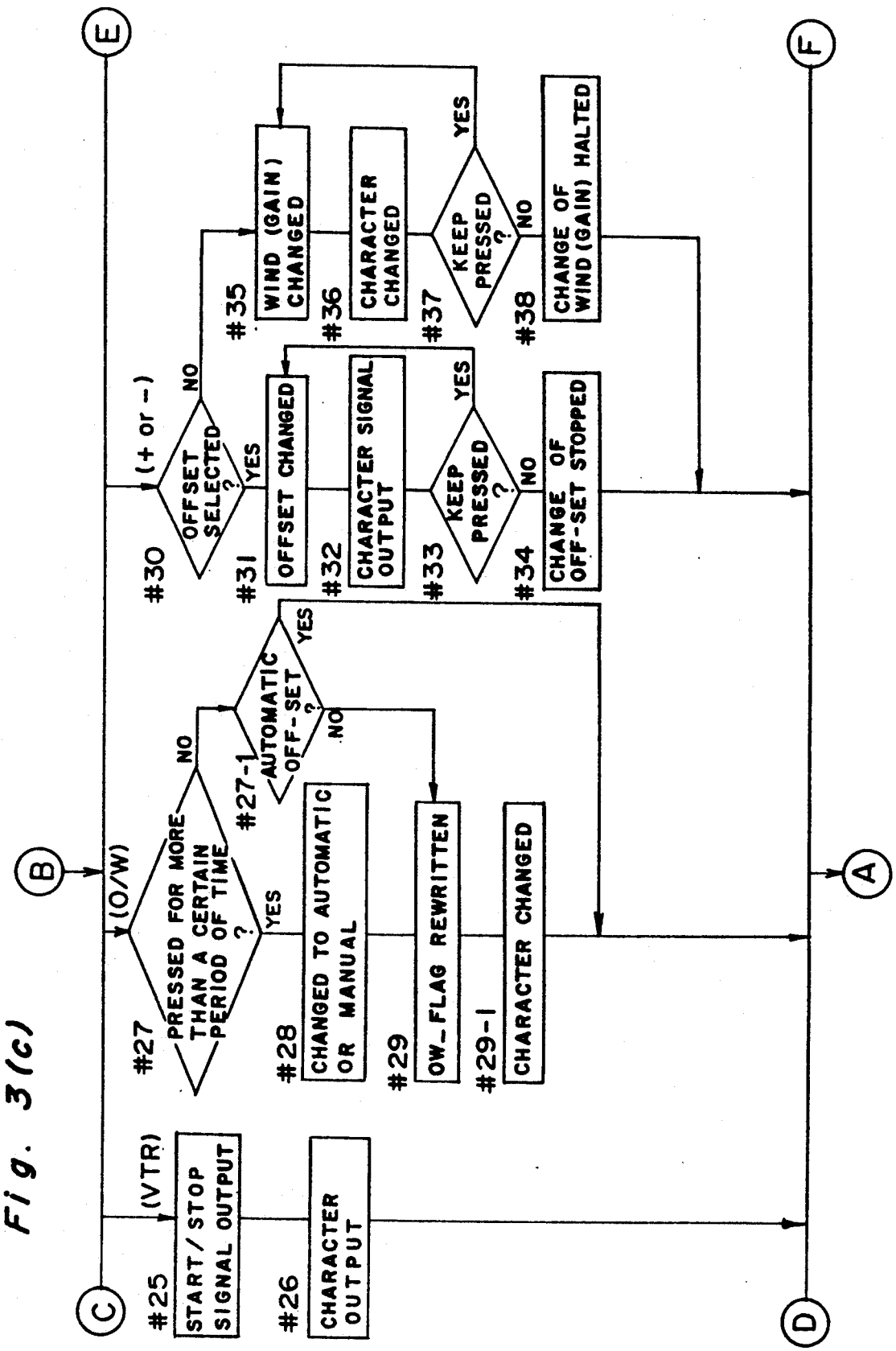
Figure 3D:
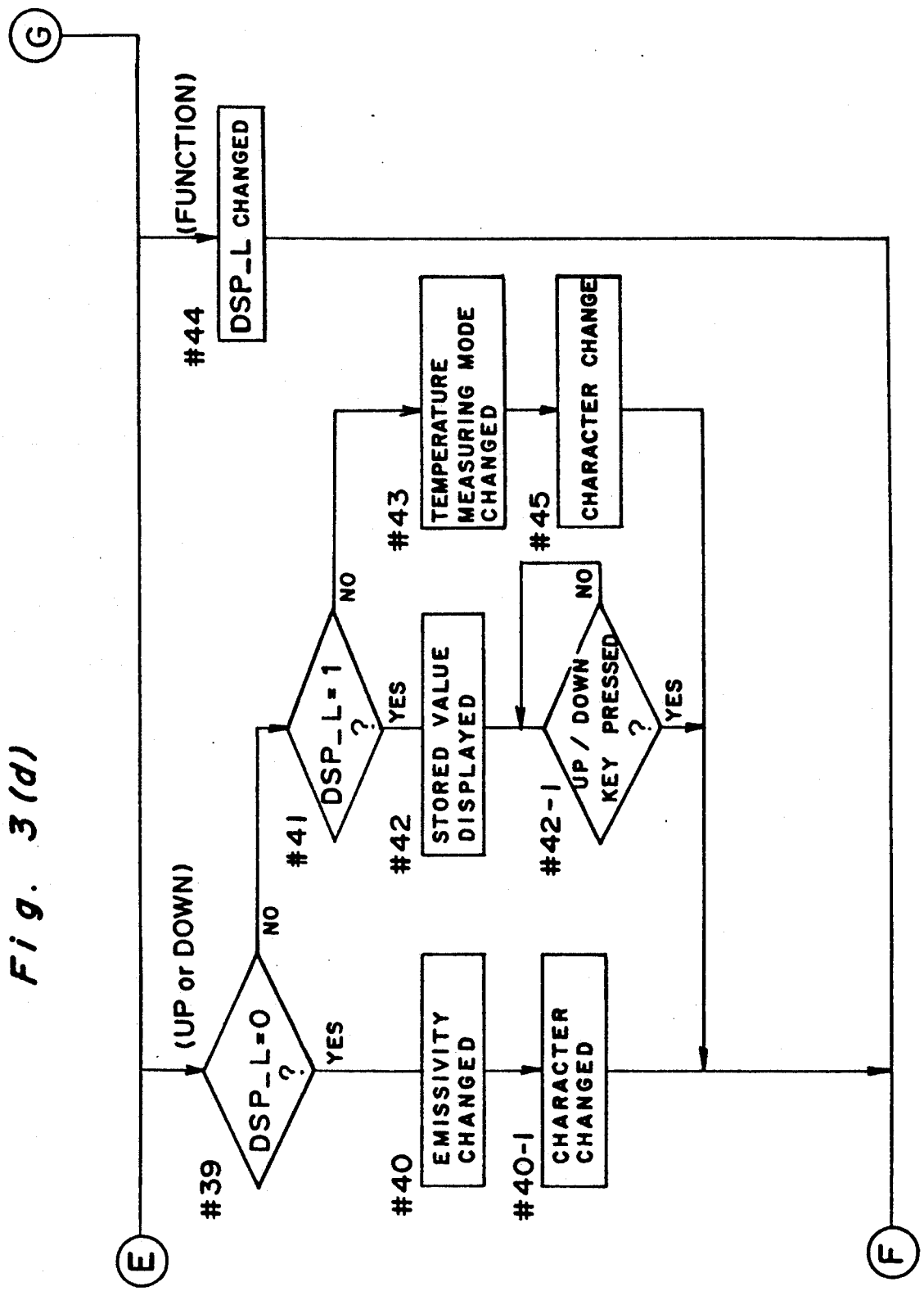
Figure 6A:
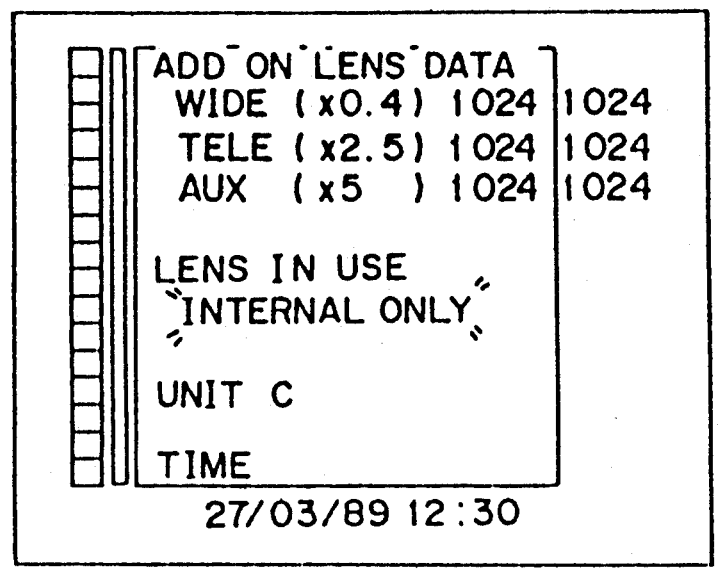

First, as shown in FIG. 3(a), at step #1, processings for initializing the internal register and the RAM 27 of the CPU 9 and storing corrected information stored in the E$^2$PROM 40 into the RAM 27 are executed. Then, the program proceeds to step #2 at which the initial screen is displayed. At step #3, a specific character is flashed on and off on the initial display screen. The ON and OFF of the specific character indicates which of values can be changed by the UP/DOWN key. For example, in FIG. 6(A), a displayed character "INTERNAL ONLY" which is flashing on and off is changed to, for example, a display character "WIDE" when the UP/DOWN key is pressed in this condition. The program proceeds from step #3 to step #4 at which it is checked whether or not the MODE key has been pressed. If it has been pressed, the program proceeds to step #5, however, if not pressed, the program proceeds to step #9 so as to check whether or not the FUNCTION key or the UP/DOWN key has been pressed. If not pressed at this step, the program returns to step #2. If either the FUNCTION key or the UP/DOWN key has been pressed at step #9, the program proceeds to step #10 at which a value set on the initial display screen according to the pressing of the key is changed and at step #11, the character is altered, then the program returns to step #2. FIG. 6(B) shows, for example, a condition in which the ON and OFF character is altered from "WIDE" to "C" by pressing the FUNCTION key. FIG. 6(C) shows a condition in which the FUNCTION key has been again pressed several times to turn on and off the display of "30" indicating a minute and "30" has been changed to "31" by the UP key. The program proceeds to step #5 if the MODE key has been pressed at step #4 so as to switch the initial display screen to the screen for adjusting an infrared image. The screen is switched from the state indicated in FIG. 6(A) to the state indicated in FIG. 7(A). At step #6, a specific character is flashed on and off on the screen for adjusting the infrared image so as to indicate which of the values set can be presently changed. That is, the user can be informed by the ON and OFF of the character whether or not the offset can be manually adjusted or the window is adjustable. FIG. 7(C) shows the display of an "OFM" which flashes on and off, which indicates that the offset can be presently manually adjusted. FIG. 7(D) shows the display of an "H6" which flashes on and off, which indicates that the window can be presently adjusted. Next, at step #7, all keys are scanned to check whether or not a key has been pressed. If none of the keys have been pressed, the program returns to step #5. If any key has been pressed, it is detected at step #8 which of the keys has been pressed so as to distinguish a key from other keys. The program returns to step #5 after executing the processing corresponding to each key. If it is decided that the MODE key has been pressed as a result of the distinction of the keys, the program returns to step #2 at which the screen is changed to the initial display screen according to which set values such as time and the temperature unit can be set again.

If it is decided at step #8 that the F/M key has been pressed, the program proceeds to step #12 at which it is checked whether or not a flag FRZ provided in the RAM 27 carries "0" so as to indicate whether a temperature is currently being measured, a freeze condition continues, or the freeze is cancelled. If the flag FRZ carries "0", the value of FRZ is rewritten as FRZ=2 at step #13 so that a temperature calculation is performed by an interruption as will be described later. If FRZ does not carry "0", it is checked at step #14 whether or not the flag FRZ=2. If FRZ =2, the program then goes to step #15 at which the value of FRZ is rewritten as FRZ=1. Then, at step #16, the screen is changed to the freeze condition by prohibiting a writing to the infrared image memory 15 and permitting only a reading therefrom. If FRZ=1, the program proceeds to step #17 so as to rewrite the value of FRZ as FRZ=0. Then, at step #18, the writing to the infrared image memory 15 is permitted to cancel the freeze condition of the screen. Then, it is checked at step #19 whether or not the F/M key has been pressed for more than a specified period of time (2 seconds, for example). If the F/M key has been pressed, a temperature value calculated in the interruption processing is stored in the RAM 27 at step #19-1. The stored value is displayed on the screen by the FUNCTION key and the UP/DOWN key as described later. Next, at step #19-2, the temperature value calculated and displayed in the interruption processing is cleared. If the F/M key has not been pressed for more than the specified period of time, the temperature value displayed is cleared at step #19-2. Thereafter, the program returns to step #5.

If it is decided at step #8 that the W/B key has been pressed, the program proceeds to step #20 to reverse high order bits of the -PROM 21. There are provided in the τ-PROM 21 two tables, one for displaying the high temperature portion in white and the other in black, and switch-over is carried out between the two tables by the high order bits. The program returns to step #5 after executing this processing.

If it is decided at step #8 that the F key or N key has been pressed, a focusing signal is outputted at step #21 to drive the infrared condenser lens 3. At step #22, a character is transferred to the character generating circuit 25 so that the character is displayed to indicate that either the F key or the N key has been pressed. Then, the program proceeds to step #23 to detect whether or not the F key or the N key keeps being pressed. If it is still pressed, the program returns to step #21 to continue outputting a focusing signal. If it is decided that the hand has been away from the F key or the N key, the program proceeds to step #24 at which the output of the focusing signal is stopped to prevent the infrared condenser lens 3 from being driven and the character indicating that either the F key or the N key has been pressed is cleared. Thereafter, the program returns to step #5.

If it is decided at step #8 that the VTR key has been pressed, the program proceeds to step #25 at which a start/stop signal of the VTR is outputted to stop the start or the stop of a recording of the VTR. At step #26, the character signal is transferred to the character generating circuit 25 so that the character is displayed to inform whether or not a recording is presently carried out. Then, the program returns to step #5.

If it is decided at step #8 that the O/W key has been pressed, the program proceeds to step #27. At this step, it is checked whether the O/W key has been pressed for more than a certain period of time (for example, 2 seconds). If it is decided that the O/W key has been pressed, the program then proceeds to step #28. At step #28, if it is decided that the state is in the automatic offset, a signal is outputted to the automatic/manual switching circuit 39 so that the offset can be manually adjusted. If it is decided that the state is not in the automatic offset, a signal is outputted to the automatic/-manual switching circuit 39 so that the state is changed to the automatic offset state. At step #29, a flag OW—FLAG provided in the RAM 27 is rewritten to indicate three states of the automatic offset state, the state in which the offset can be manually adjusted, and a state in which the window can be adjusted by the manual offset. In this case, the three states are indicated by changing the value of the OW—FLAG, as in the case of FRZ previously described, according to whether the state is in the automatic offset state or in the state in which the window can be adjusted by the manual offset, so that each indication of the states is used in making a decision. Then, at step #29-1, the character signal is outputted to the character generating circuit 25 so as to change a character based on the OW—FLAG. If it is decided at step #27 that the O/W key has not been pressed for more than the certain period of time, it is checked at step #27-1 according to the OW—FLAG whether or not the present state is in the automatic offset. If it is decided at step #27-1 that the state is in the automatic offset, the program returns to step #5 without executing a processing. If it is decided at step #27-1 that the state is not in the automatic offset, at step #29, the rewriting of the OW—FLAG is made to alternately switch between the manual offset adjustment and the manual offset window adjustment according to the operation of the switch, and the character is altered at step #29-1. The program then returns to step #5, then, at step #6, a specific character is flashed on and off according to the OW—FLAG to inform whether the offset or the window can be currently adjusted by the + key or the − key.

If it is decided at step #8 that the + key or the − key has been pressed, the program proceeds to step #30. It is checked at step #30 whether the offset or the window has been presently selected based on the OW—FLAG. If it is decided that the offset has been selected, the program proceeds to step #31 at which the offset is changed by outputting clocks to the counter 10. Then, at step #32, the character signal is outputted to the character generating circuit 25 so as to inform that the offset has been changed. Then, at step #33, it is checked whether the + key or the − key is pressed. If it is decided that the + key or the − key is pressed, the program returns to step #31 at which the offset is changed. If it is decided that the pressing of either the + key or the − key has been cancelled, the program proceeds to step #34 at which time the change of the offset is halted and the character indicative of the change of the offset is cleared, then the program returns to step #5. If it is decided at step #30 that the window has been selected, the program proceeds to step #35 at which time the window is changed. The gain of the amplifier 13 or the range filter is switched and at step #36, the character signal is outputted to the character generating circuit 25 so as to change the character indicative of the window. Then, it is detected at step #37 whether the + key or the − key is pressed. If the + key or the − key is pressed, the program returns to step #35 at which the change of the window continues. If the pressing of either the + key or the − key has been cancelled, the program proceeds to step #38 at which the change of the window is halted, then the program return to step #5.

If it is decided at step #8 that the FUNCTION key has been pressed, the program proceeds to step #44. At this step, the value of a flag DSP_L provided in the RAM 27 is altered to indicate three states of whether or not either the UP key or the DOWN key can alter an emissivity, whether or not a stored temperature value can be displayed, and whether or not a temperature measuring mode can be altered. Then, the program returns to step #5. At step #6, a specific character is flashed on and off according to the DSP_L value to inform what processing is presently being executed by the UP key or the DOWN key.

If it is decided at step #8 that the UP key or the DOWN key has been pressed, it is checked at step #39 whether or not the DSP_L value has been "0". If the value of the DSP_L has been "0", the program proceeds to step #40 wherein the value of the emissivity is changed, and at step #40-1, this value is transferred to the character generating circuit 25 so as to change the character, the program then returns to step #5. If the value of the DSP_has not been "0", it is detected at step #41 whether or not DSP_L has been 1. If DSP_L has been 1, the stored temperature value is displayed on the screen at step #42. Then, it is checked at step #42-1 whether either the UP key or the DOWN key has been pressed again. If it is decided that the UP key or the DOWN key has not been pressed, the program returns to step #42-1 for a pool, and if pressed, the program returns to step #5. If the DSP_L has not been 1, that is, the DSP_L has been 2 at step #41, the program proceeds to step #43 at time the temperature measuring mode is changed. At this step, the user selects one of an instantaneous value, an average value of a few seconds (for example, 0.5 seconds or 2 seconds), or a peak value as the calculation of a temperature value. Then, at step #45, a character is transferred to the character generating circuit 25 so as to display this temperature measuring mode, then the program returns to step #5.

Figure 3E:
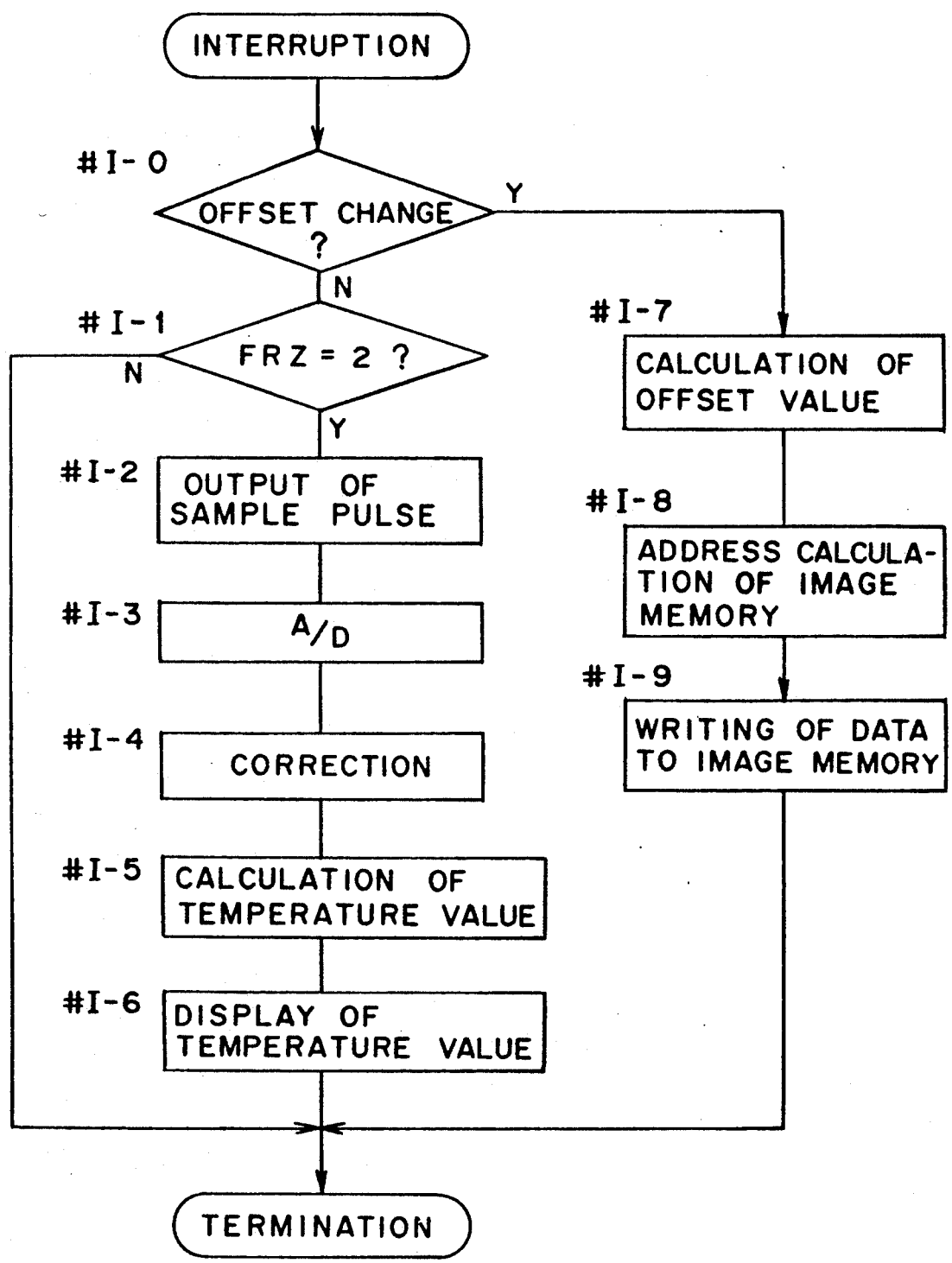
FIG. 3(e) is a flowchart showing an operation for executing an interruption of the apparatus.

Next, an interruption that the CPU 9 executes per rotation (this can be detected by the output of the photosensor 16) of the polygon mirror 2 will be described with reference to the routine shown in FIG. 3(e). When the program goes into this routine, it is checked at step #I-0 according to the value of a flag OW-FLAG whether or not an offset change is being currently executed. In the automatic offset adjusting mode, whether or not the offset is changed can be decided by detecting whether or not a counted value is different from the previously counted value in executing the routine of FIG. 3(c). In the manual offset adjusting mode, whether or not an offset change is executed can be decided by detecting whether or not the + key or the − key has been pressed. If it is decided that an offset change is not executed, it is checked at step #I-1 whether or not the value of the flag FRZ is "2" (real time temperature measuring mode), and when the value of the flag FRZ is not "2", the execution of this routine terminates. Only when the value of the flag FRZ is "2", the program goes to step #1-2 at which time a sampling pulse is outputted to the sample holding circuit 32 so as to sample a signal outputted from the pre-amplifier 6. At step #1-3, the sampled signal is converted into a digital signal by the A/D converter 35 and as described previously, the temperature sensitivity signal of the detector 5 and a signal from the temperature sensitive element 33 are both A/D-converted and multiplexed to be stored in the CPU 9. At step #1-4, based on these three values, the temperature of the object to be measured is calculated by making a correction using a temperature signal supplied from the temperature sensitive element 33, then at step #I-6, a temperature value is displayed on the screen using the character generating circuit 25.

If it is decided at step #I-0 that the offset is being changed, the program goes to step #I-7 at which an offset level is displayed. The offset level is shown by reference numeral 55 of FIG. 7(A).

The display of the offset indicator will be described in detail. Separately from the data region for displaying an infrared image, the image memory 15 is provided with a screen data region, for displaying the offset indicator, in correspondence with the number of the scanning lines of the TV screen. During the period (t1 of FIG. 26(a)) corresponding to the display of this region, the output address counter 20 outputs the address of the screen data region corresponding to a display region 56 and during the period (t2 of FIG. 26(a)) corresponding to an infrared image display region 57, the output address counter 20 outputs the address of the region, to which the intensity of the infrared rays has been written, to the image memory 15 as described previously.

Figure 26:
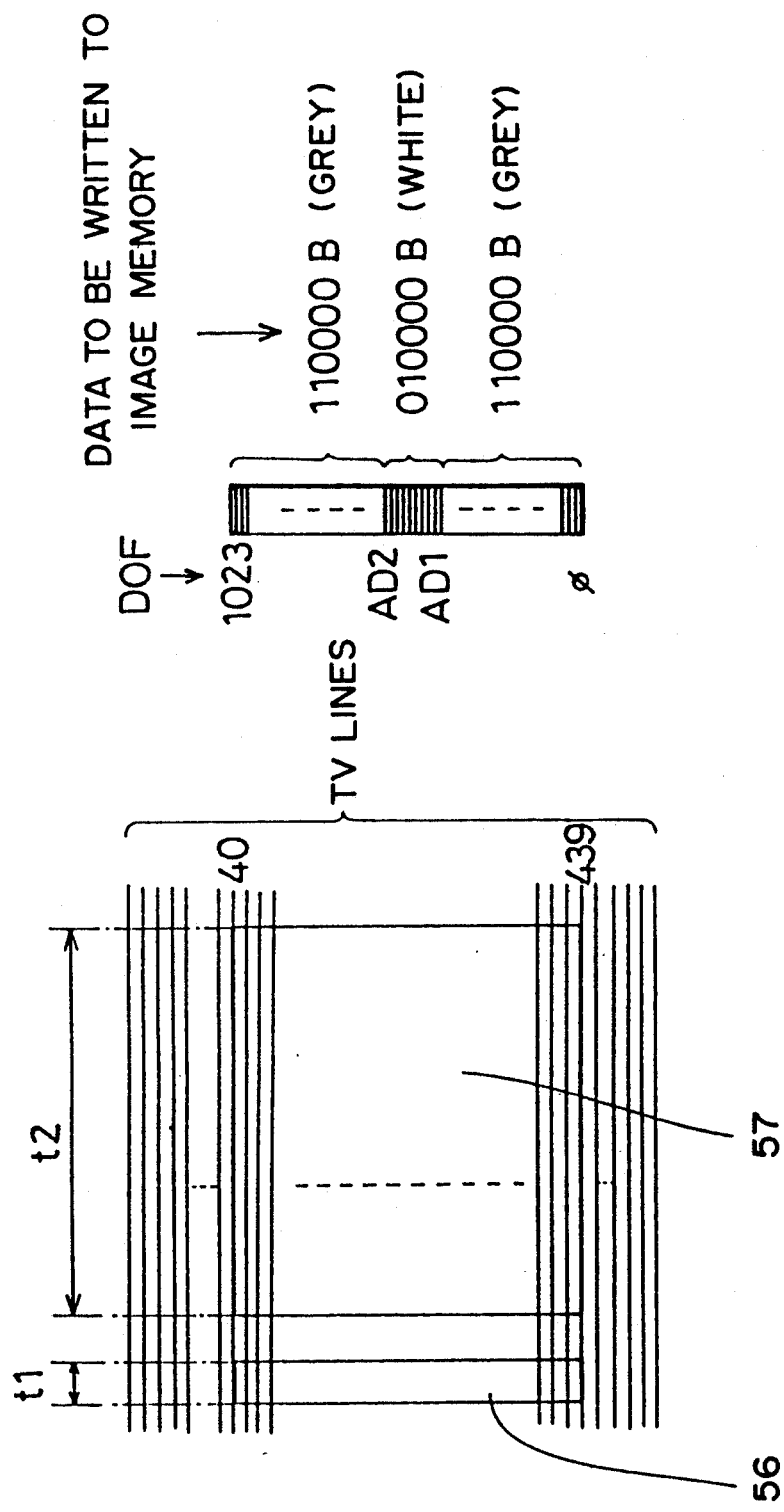
FIG. 26(a) is a view showing TV lines of an offset indicator.
FIG. 26(b) is a view showing a relationship between a counted value DOF outputted from a counter and data to be written to an image memory.

As described previously, when the offset injection amount is changed by the automatic offset adjustment or the manual offset adjustment, the CPU 9 is capable of detecting the offset injection amount according to a counted value outputted from the counter 10. The counted value of the counter 10 ranges from 0 to 1023 if a 10-bit D/A converter is used. On the other hand, the number of the effective scanning lines of the TV screen is normally 484 in the case of NTSC system, but the offset indicator is displayed with 400 lines in consideration of the over-scan of the TV. As shown in FIG. 26(a), supposing that the offset indicator 55 is displayed by 40 to 439 lines, the relationship between the counted value DOF outputted from the counter 10 and the TV line number LN corresponding thereto is as follows:

$$LN = -339 \times (DOF - 1023)/1023 + 40 \qquad (1)$$

The current offset value is understandably displayed on the offset indicator by calculating the address of the above-described memory region of the image memory 15 according to the TV line number LN and writing data serving as a mark to a region corresponding to the offset level. For example, as shown in FIG. 26(b), a color is displayed in the order of grey, white, grey by the offset indicator 55 on the screen by writing data of "110000B" (B represents a binary number) to the memory region corresponding to that DOF equals from 0 to AD1 of the image memory 15, data of "010000B" to the memory region corresponding to that DOF equals from AD1+1 to AD2, and data of "110000B" to the memory region corresponding to that DOF equals from AD2+1 to 1023.

Returning to FIG. 3(e), at step #I-7, the offset value is stored and the TV line number LN corresponding thereto is calculated based on the equation (1). Then, at step #I-8, the address of the image memory 15 corresponding to the line number LN is calculated and then, at step #I-9, data ("010000B" in the above example) serving as a mark is written to the address. Thus, the execution of this routine terminates. In this manner, the current offset level is clearly displayed on the screen together with an infrared image.

Examples of displays are shown in FIGS. 6 and 7. FIG. 6, FIG. 7(A), and FIG. 7(B) indicate the initial screen, the screen for adjusting the infrared image, and the screen which displays a value stored in the memory, respectively. Characters displayed on the screen are briefly described hereinbelow.

① ... display of information on additional lenses to be mounted on the apparatus.

② ... display of temperature unit.

③ ... display of time.

④ ... display of focusing information: "F ↑" or "F ↓" is displayed if the F key or the N key is pressed.

⑤ ... display of window information: numerical values are changed from 1 to 7 due to the alteration of the setting of a circuit gain. The display is altered between H and M and between M and L in both directions by the switch-over of the range filter.

⑥ ... display of offset information: The display is changed to "OFA" in the automatic offset and to "OFM" in the manual offset. "OFM ↑" or "OFM ↓" is displayed if the offset is changed due to the pressing of the UP key or the DOWN key in the manual offset.

⑦ ... display of emissivity.

⑧ ... When the temperature value stored in the memory is displayed, "LIST" is selected by pressing the FUNCTION key and then the UP key or the DOWN key is pressed.

⑨ ... display of the temperature measuring mode and a calculated value of a temperature.

①⓪ ... display that a recording is being carried out.

①① ... display of the temperature measuring mode: "S", "AV1" and "AV2", and "PK" indicate an instantaneous value mode, average value modes, and a peak value mode, respectively. The numerical values "1" to "10" indicate a memory number and the smaller a number, the newer a memory. The letters "E" and "T" indicate an emissivity and the measured value of a temperature, respectively.

Figure 5:
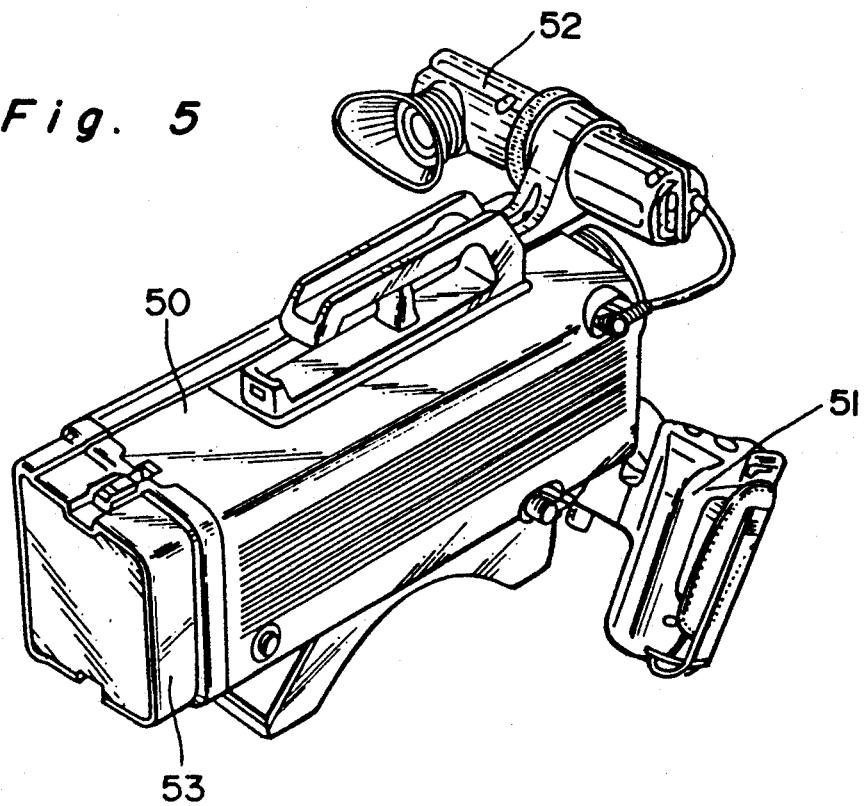
FIG. 5 is a perspective view showing the outer appearance of the apparatus.

The outer appearance of the apparatus is shown in FIG. 5. The apparatus comprises a main body 50, a grip 51, a CRT or electronic finger 52, and a battery pack 53.

First, the user turns on the electric power supply, so that the initial display appears on the screen. Looking at the CRT, the user selects a temperature unit for measuring the temperature and/or sets time. After completing this initial setting, the user presses the MODE key to change the initial display to the display for adjusting an infrared image. The infrared image can be clearly picked up by adjusting a focusing condition and a window on this display screen. A grey scale 54 and an offset indicator 55 are shown in FIG. 7. They can be obtained by the data writing of the CPU 9 after assigning, a portion of the image memory 15 other than regions storing data of the infrared image, to regions of the grey scale 54 and the offset indicator 55.

The grey scale 54 is shaped like a strip, in which a color tone longitudinally and gradually changes from black to white. If the CRT displays a color display, a color scale is used whose color hue changes longitudinally and gradually. A whole length of the grey scale 54 corresponds to a temperature range to be measured. The change of color tone represents a relative temperature level within the temperature range to be measured.

The offset indicator 55 is a strip provided in parallel with the grey scale 54, and has a marker 55A. The marker 55A is movable in parallel with the grey scale 54 and a length of the marker 55A is variable in its longitudinal direction.

Figure 7A:
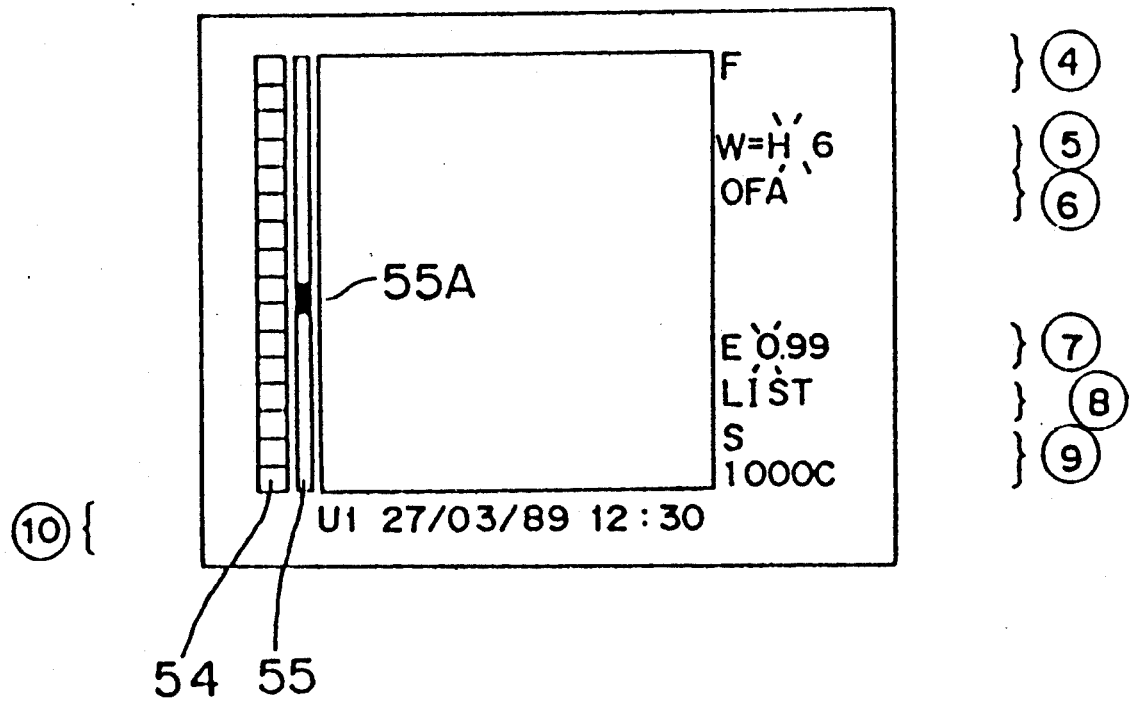
Figure 7B:
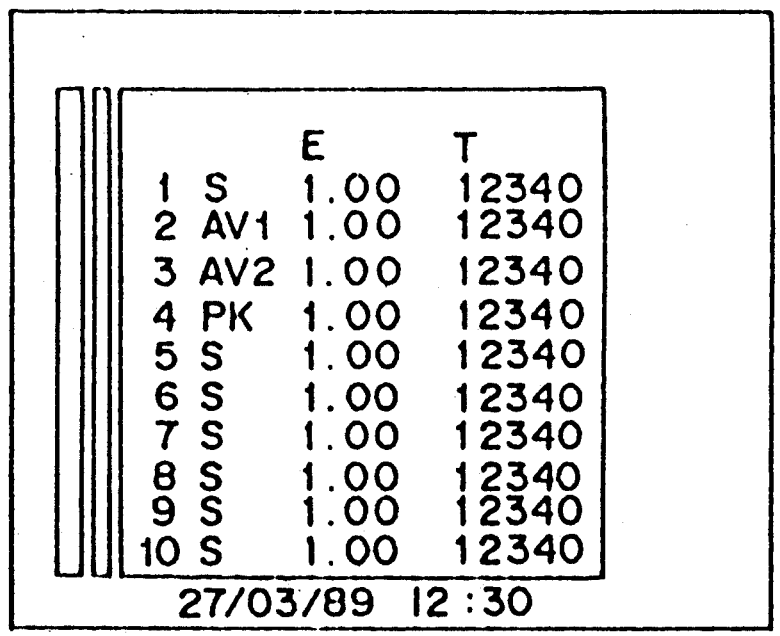
Figure 7C:
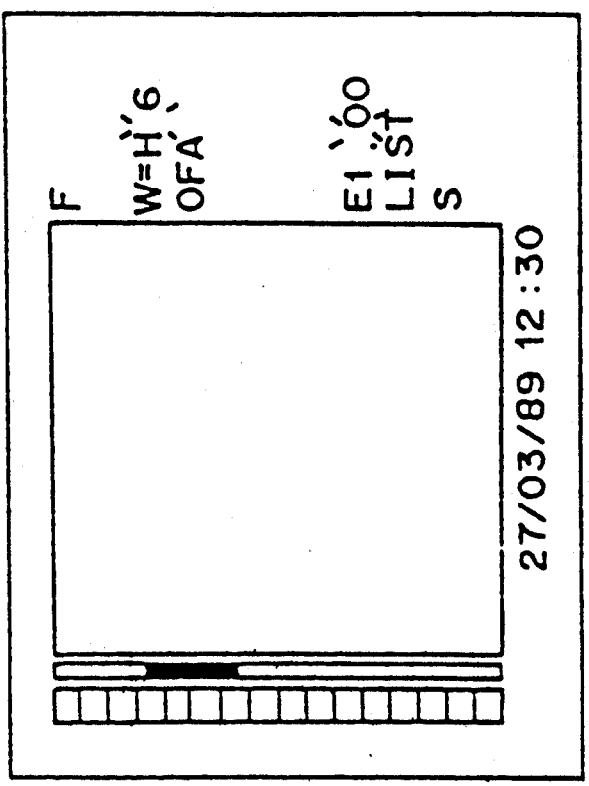
Figure 7D:
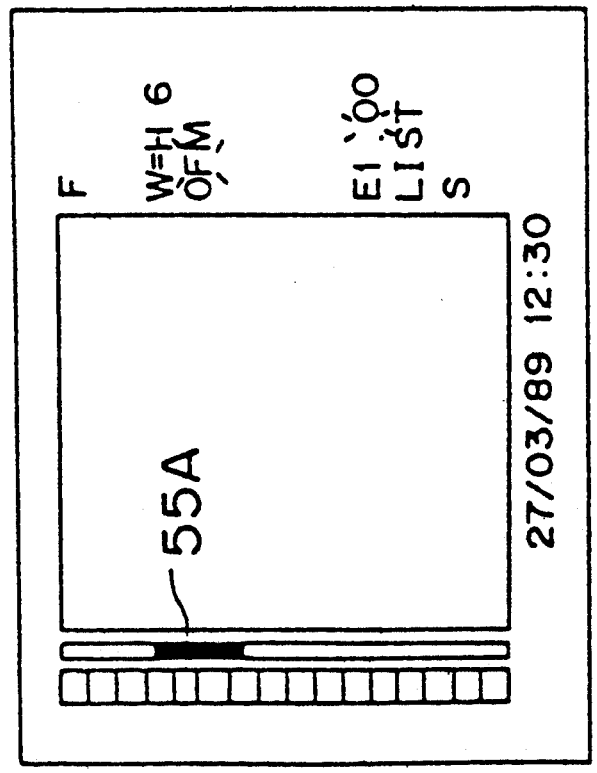

When an offset level is changed, the position of the marker 55A moves, and when a window is changed, the length of the marker 55A becomes longer or shorter (compare 55A in FIG. 7(A) with that in FIG. 7(C)).

Figure 8:
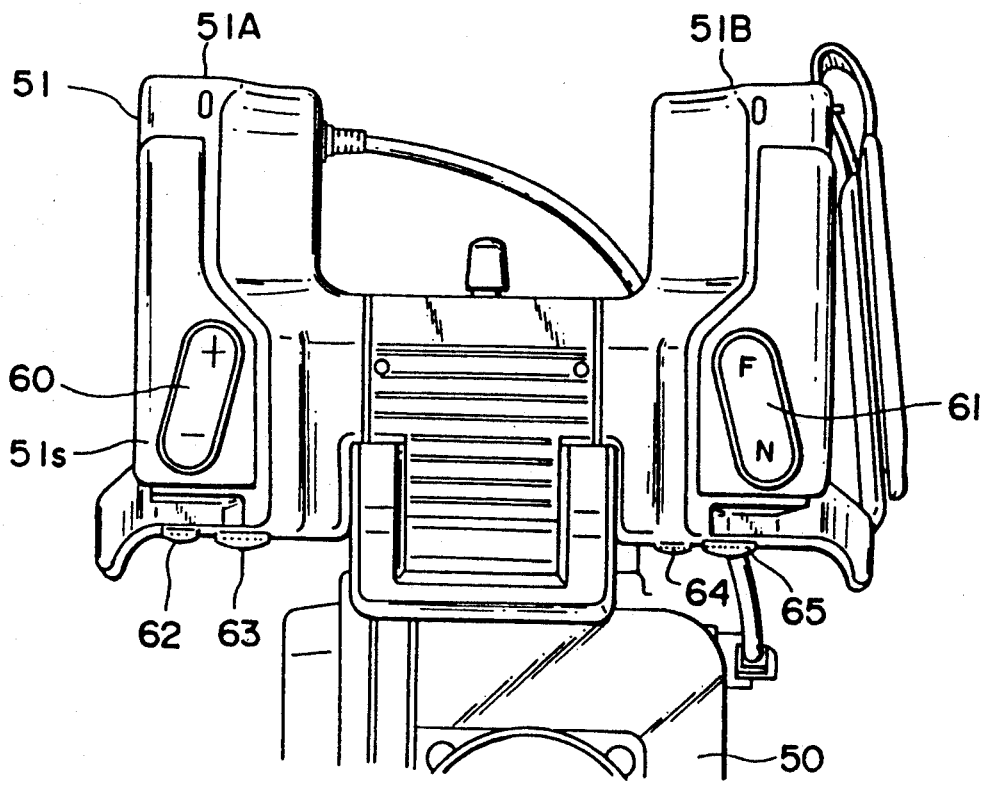
FIG. 8 is a plan view showing operation keys provided on the grip of the apparatus.
Figure 9:
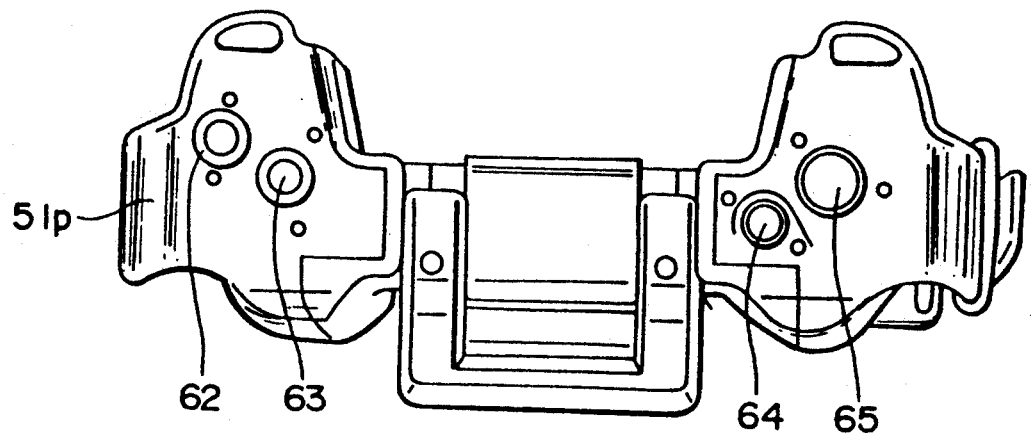
FIG. 9 is a plan view showing a state in which the grip of FIG. 8 is rotated 90°.
Figure 10:
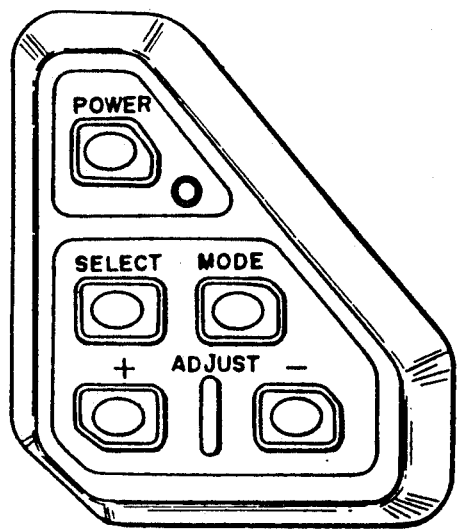
FIG. 10 is a view showing keys arranged on the side panel of the main body of the apparatus.

Keys arranged on the grip 51 are indicated in FIGS. 8 and 9. FIG. 10 shows keys arranged on a side panel mounted on the right side of the main body 50 when viewed from an object. As shown in FIG. 10, there are arranged on the side panel four keys, the MODE key for making a switch-over between the initial display screen and the screen for adjusting the infrared image, the FUNCTION key for selecting a set value so as to be changed, and the + key and the − key for changing a set value. It is almost unnecessary for the user to operate any keys on this side panel once the initial display appears after turning on the power supply.

The remaining keys such as the key for adjusting the infrared image, are all arranged on the grip 51 as shown in FIGS. 8 and 9. Holding the grip 51, which has a pair of grip portion 51A and 51B, with both hands and looking into the CRT 52, the user can adjust the infrared image by adjusting the focusing condition, the offset, and the window. A + and − key 60 and an F and N key 61 provided on a surface 51s of the grip portions 51A and 51B are a seesaw switch, respectively for an easy operation. Reference numerals 62, 63, 64, and 65 shown in FIGS. 8 and 9 are a VTR key, an O/W key, a W/B key, and an F/M key, which are provided on another surface 51p of the grip portions 51s and 51p, respectively. The temperature value of the object can be obtained by operating the F and N key 61 of the grip 51 observing the infrared image.

These keys are conveniently arranged on some portions of the grip 51 for an easy operation.

Figure 11:
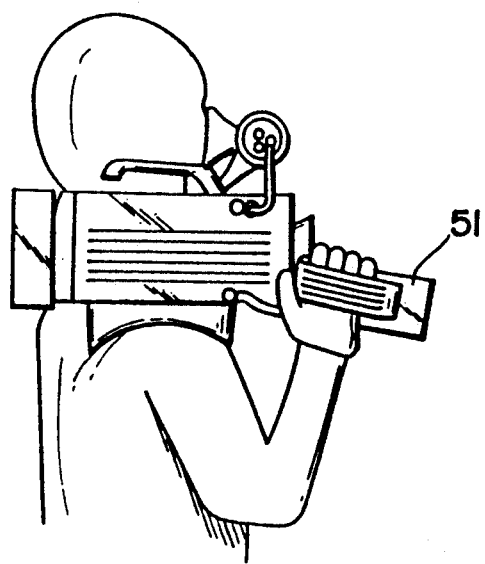
FIG. 11 is a view showing an example of the condition in which the apparatus is held by a user.

The user holds the apparatus by placing it on his shoulder and holding the grip 51 with both hands as shown in FIG. 11. As previously mentioned, it is almost unnecessary to operate any keys on the side panel once the initial display is set. Accordingly, holding the grip 51 with both hands to maintain the apparatus, the infrared image can be observed.

Figure 12:
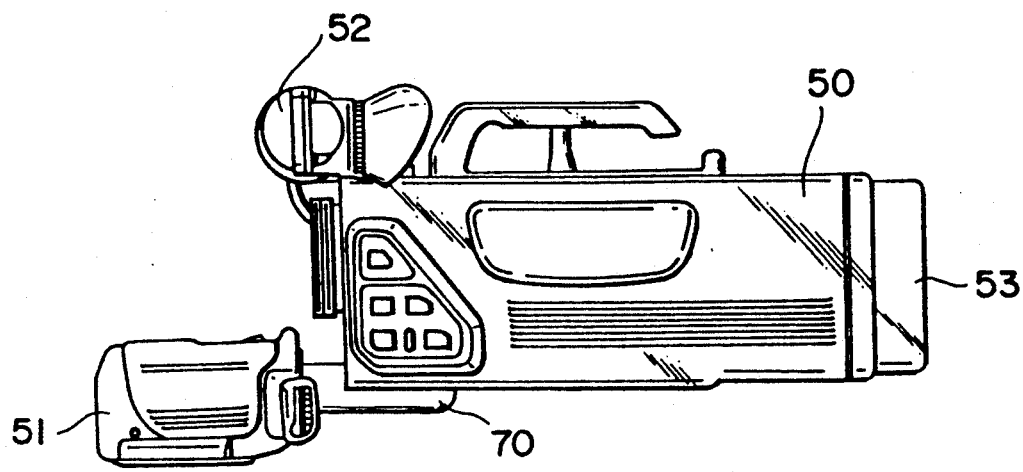
FIG. 12 is a side view of the apparatus.
Figure 13:
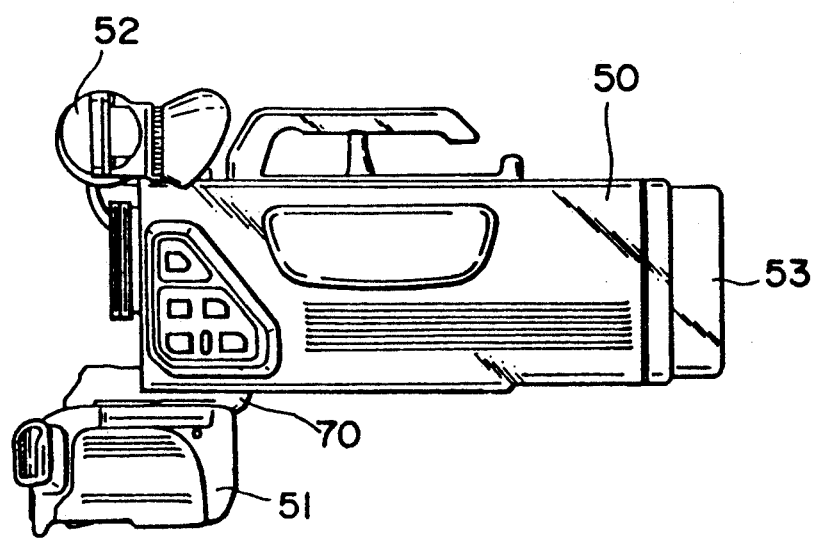
FIG. 13 is a view showing a state in which the grip of FIG. 12 is rotated 180°.

Next, the structure of the grip of the apparatus is described. The grip 51 is rotatably mounted on a grip arm 70 fixed to the main body 50. As shown in FIGS. 12 and 13, the angle between the grip 51 and the grip arm 70 can be freely adjusted, in this case the angle being variable within 180°. Therefore, the user can operate the apparatus by changing the angle of the grip 51 depending on the user's choice. For example, it is very difficult to face upwardly holding the apparatus on the user's shoulder as shown in FIG. 11 when the user observes the object positioned above.

Figure 14:
FIG. 14 is a view showing another example of conditions in which a user is holding the apparatus.

Therefore, the object positioned above can be easily observed by completely folding the grip 51 as shown in FIG. 13 and holding it under the user's arm as shown in, for example, FIG. 14. It is possible to adjust the infrared image even in this case because the keys arranged on the grip 51 can be operated with both hands.

Figure 15:
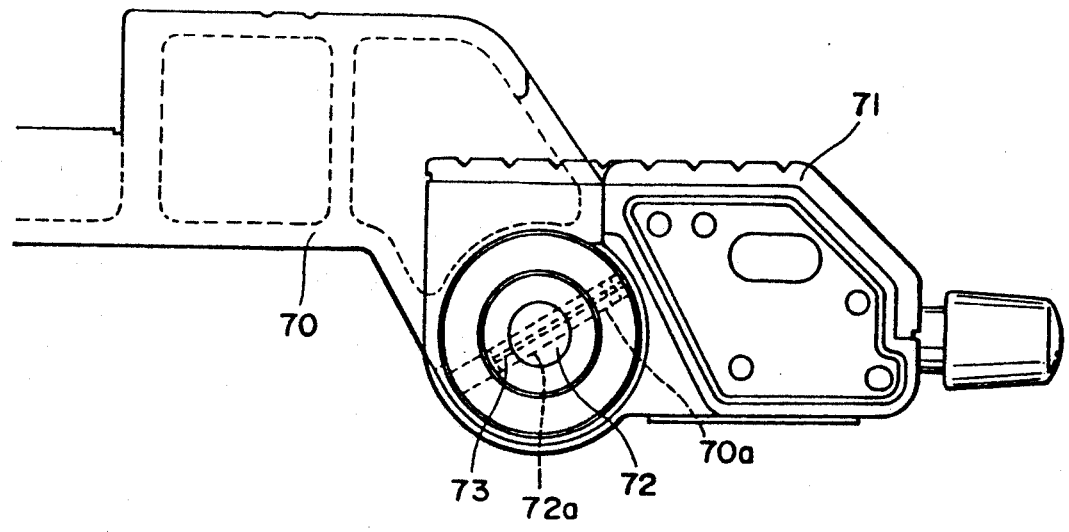
FIG. 15 is a view showing the rotating mechanism of the grip of the apparatus.
Figure 16:
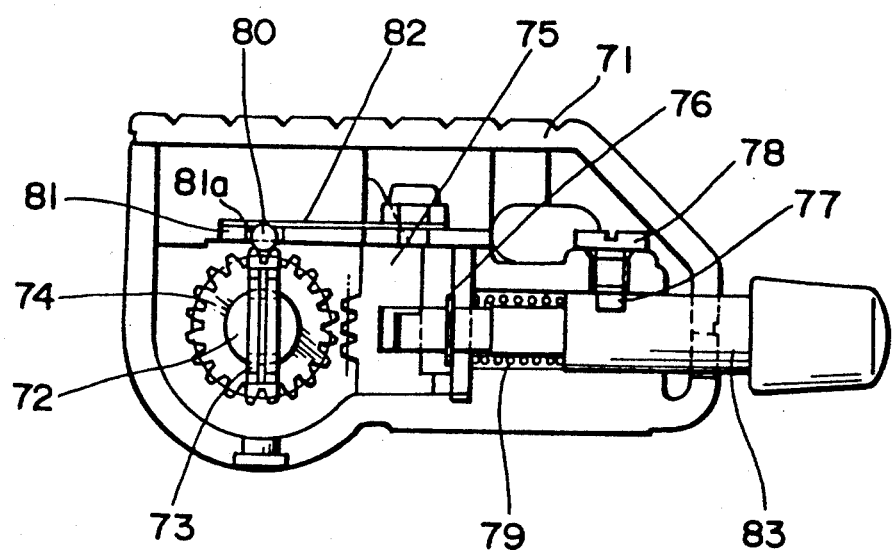
FIG. 16 is a view showing the condition in which the locked condition is released in the click/locking mechanism of the grip of the apparatus.
Figure 17:
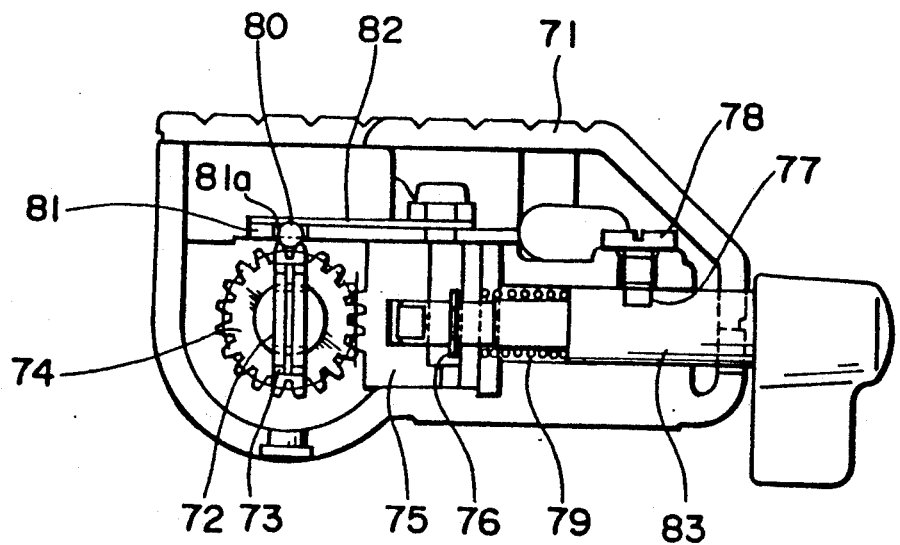
FIG. 17 is a view showing the locked condition of the click/locking mechanism of the grip of the apparatus.
Figure 18:
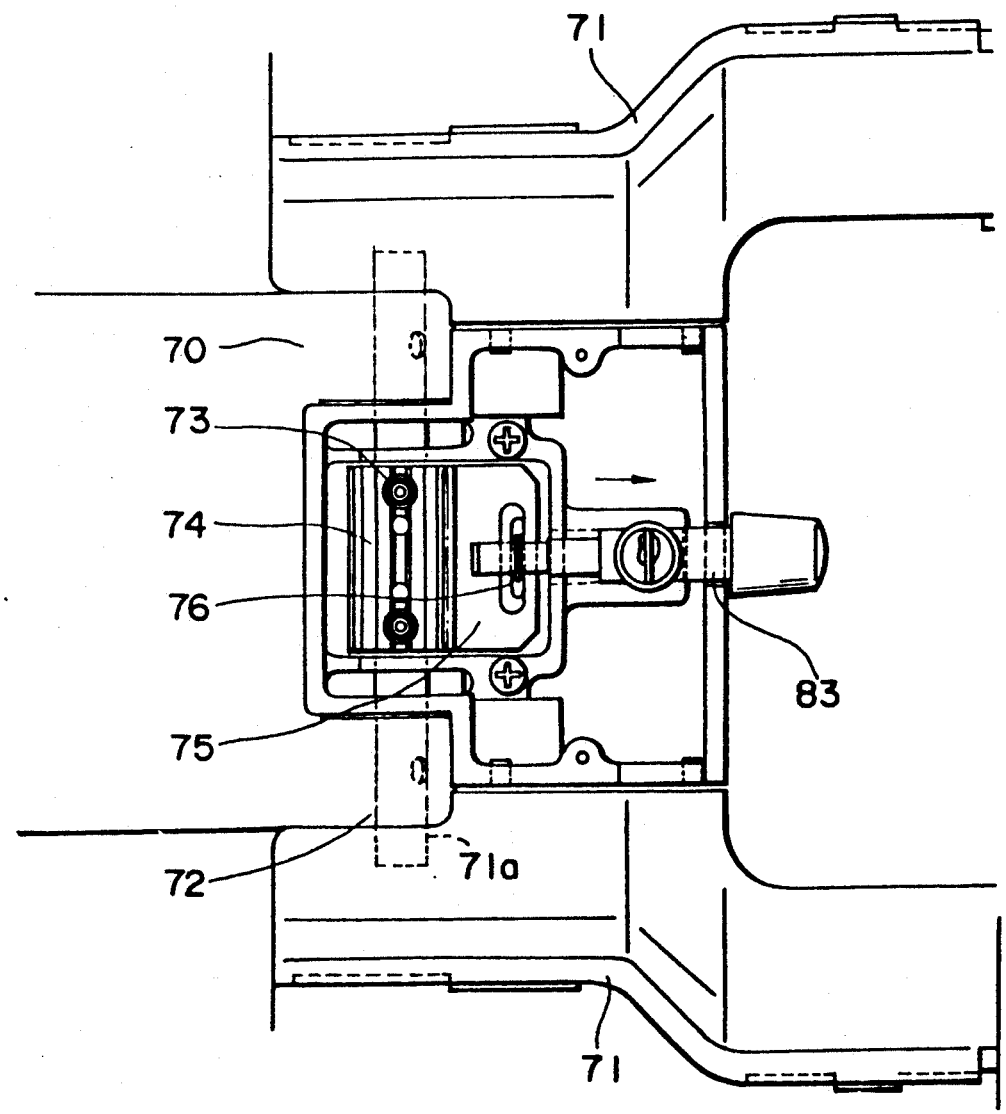
FIG. 18 is a plan view showing the rotating and click-/locking mechanisms of the grip of the apparatus.

Referring to FIGS. 15 through 18, the rotating mechanism of the grip 51 and the click-locking mechanism thereof will be described hereinbelow. FIGS. 15 through 17 are side views thereof and FIG. 18 is a plan view thereof.

The grip arm 70 and a main body 71 of the grip 51 are connected with each other by a locking shaft 72 as shown in FIGS. 15 through 18. Openings 70a and 72a are formed in the grip arm 70 and the locking shaft 72, respectively, and a spring pin 73 is inserted into these openings 70a and 72a under the condition in which these two openings 70a and 72a match with each other. The grip arm 70 and the locking shaft 72 are coupled to each other in this manner. As shown in FIG. 16, a locking gear 74 and the locking shaft 72 are also coupled to each other by the spring pin 73. The locking shaft 72 is inserted into an opening 71a formed on the main body 71 of the grip 51 and rotatable with respect to the main body 71 of the grip 51. That is, the grip arm 70 and the locking gear 74 are coupled to each other through the locking shaft 72, and the grip arm 70, the locking gear 74, and the locking shaft 72 are rotatable with respect to the main body 71 of the grip 51. Here, the locking shaft 72 is arranged on a plane perpendicularly to an incident optical axis of the ray injecting into the main body 50 from an object. Therefore, the grip 51 rotates around the shaft 72 on a plane parallel to the incident optical axis. As shown in FIGS. 11 and 14, the CRT 52 also rotates on a plane parallel to the plane where the grip 51 rotates, and the CRT 52 is locked at a desired position depending on which way the user holds the main body 50. As shown in FIG. 17, the locking mechanism of the grip 51 is constructed by engaging a movable rack 75 and the locking gear 74 with each other. The movable rack 75 is coupled to a locking shaft 83 by an E-shaped ring 76. A cam groove 77 is spirally defined on the locking shaft 83 in the direction of a right-hand screw and a cam groove guide 78 is engaged by the cam groove 78. Therefore, a locking shaft-set (the locking shaft 83, the movable rack 75, the E-shaped ring 76, and an overcharge spring 79) slides back and forth by rotating the locking shaft 83 in the right and left directions. The movable rack 75 engages the locking gear 74 at a position moved forward from an initial position (contact face with the main body 71 of the grip 51 by 2 mm). The locking shaft 83 further moves forward therefrom by 1 mm, then moves backwards by 0.5 mm. According to this locking mechanism, 0.5 mm is overcharged from the position at which the locking shaft 83 and the locking gear 74 engage with each other to the final (stopping) position of the locking shaft 83. Therefore, even if errors of parts accuracy accumulates, the error can be absorbed. During this period of time, the movable rack 75 is pushed against the locking gear 74 by the overcharge spring 79. Although a load is applied to the locking shaft 72 in the lock-off direction at its final position by the overcharge spring 79, the locking shaft 83 is prevented from disengaging from the lock-on condition because, as shown in FIG. 17, the cam groove guide 78 engages the backward moving portion of the cam at this time.

The click mechanism is constructed by dropping a click ball 80 into an opening 81a formed in a lock pressure bar 81 and holding the click ball 80 by the locking gear 74 and a click pressure bar spring 82. When the main body 71 of the grip 51 is rotated in the lock-off state, the click ball 80 rotates along the locking gear 74 with the locking shaft 72 positioned at its center. At this time, since the click ball 80 rotates while moving from the tooth bottom (groove between teeth) of the locking gear 74 to the top thereof, the distance between the click ball 80 and the center of the locking shaft 83 is varied. The click mechanism is constructed by pressing the click ball 80 against the locking gear 74 by the click pressure bar spring 82 utilizing this variation amount. The main body 71 of the grip 51 stops when the click ball 80 is positioned at the tooth bottom of the locking gear 74. At this time, the teeth of the gear 74 and the movable rack 75 engage each other, i.e., the locking gear 74 and the movable rack 75 contact with each other at each stop position without both being unlocked, i.e., the grip 51 can be smoothly locked at any position.

A description is made on the control over the recording start/stop of a VTR in recording an infrared image by the VTR by operating the keys of this apparatus.

Figure 19:
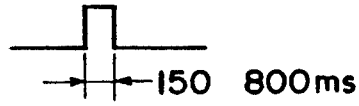
FIG. 19 is a view showing the combination of a VTR type and a start/stop signal.
Figure 20:
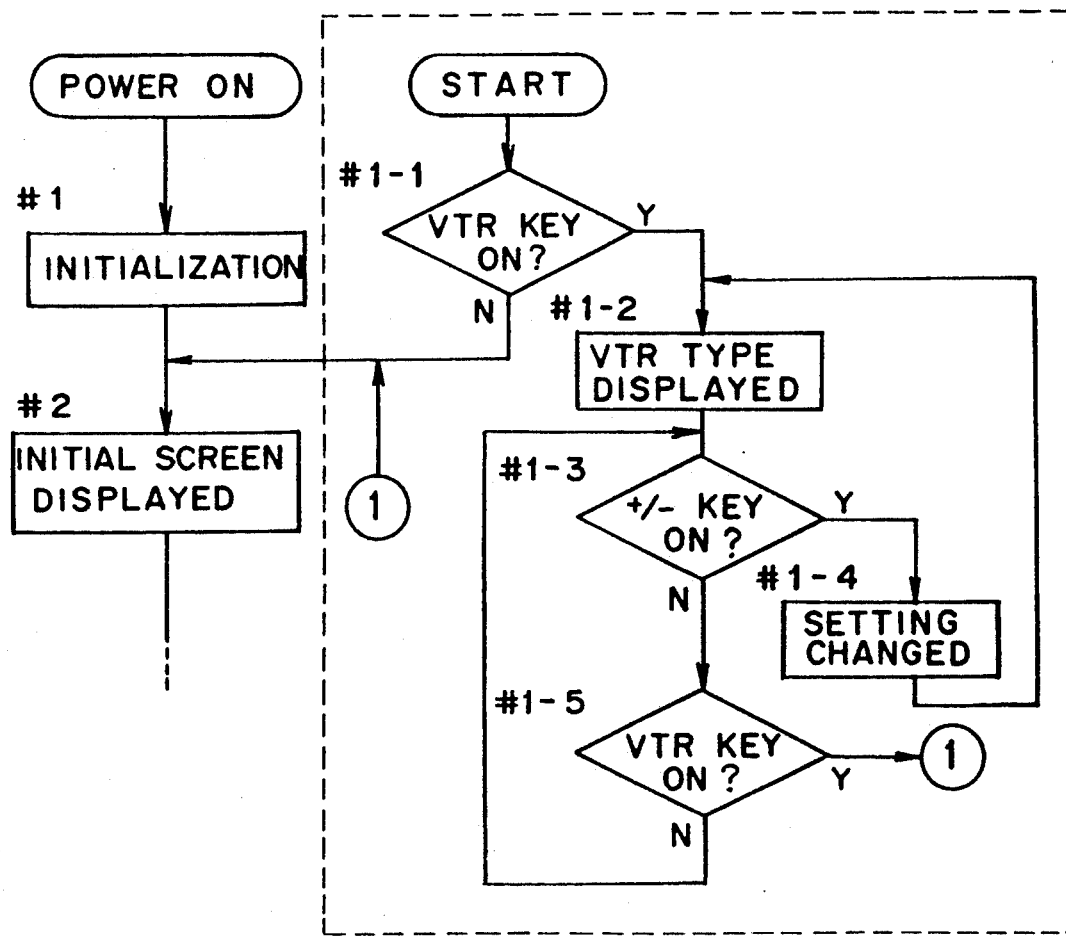
FIG. 20 is a view showing an operation for setting the VTR type.

As shown in FIG. 19, normally, each VTR has a different start/stop signal according to its type. Therefore, the type of a VTR used is inputted to the apparatus in order for the start/stop signal to be outputted to the VTR according to the type of the VTR set therein when the VTR key positioned on the apparatus is pressed. The method for setting a VTR type is described hereinbelow using the flowchart of FIG. 20.

Figure 21:
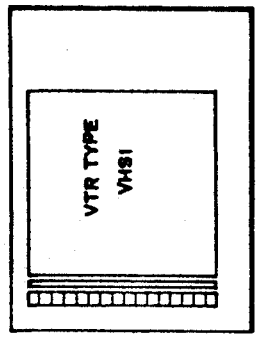
FIG. 21 is a view showing an example of displays of the VTR type.

When the initialization of the CPU 9 and the RAM 27 has been executed by the initialization executed at step #1 in the flowchart of FIG. 3, the program goes to step #1-1. At this step, it is checked whether or not the VTR key has been pressed. If not pressed, the program proceeds to step #2 at which the display on the screen is switched to the initial display. If pressed, the program proceeds to step #1-2 at which a VTR type is displayed in accordance with a flag indicative of the VTR type stored in the RAM 27. The VTR type may be displayed as, for example, "VHS1", "VHS2", "BETA1" and "BETA2" as shown in FIG. 19. Then, the program proceeds to step #1-3 at which it is checked whether or not the + key or the − key has been pressed. If the + key or the − key has been pressed, the program goes to step #1-4 at which the flag indicative of the VTR type is changed, then the program returns to step #1-2 at which the changed VTR type is displayed. If the + key and the − key have not been pressed, the program proceeds to step #1-5 at which it is checked whether or not the VTR key has been pressed again. If not pressed, the program returns to step #1-3, and if pressed, the program goes to step #2 at which the display on the screen is switched to the initial display. FIG. 21 shows an example of a VTR type display. Thus, the setting of the VTR type is accomplished. Then, at step #25 of the flowchart of FIG. 3, a start/stop signal for a recording is outputted according to the flag, in the RAM 27, indicative of the VTR type when the VTR key is pressed in the display for adjusting an infrared image.

Figure 22:
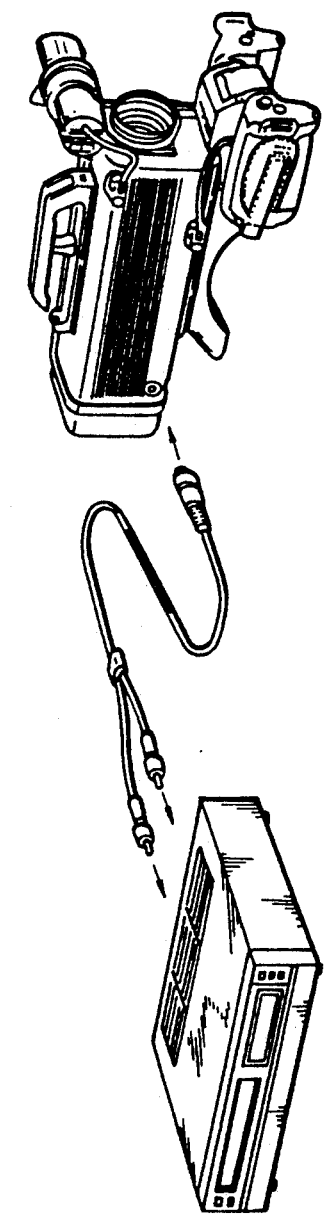
FIG. 22 is a view showing a condition in which the apparatus and a VTR are connected to each other.
Figure 23:
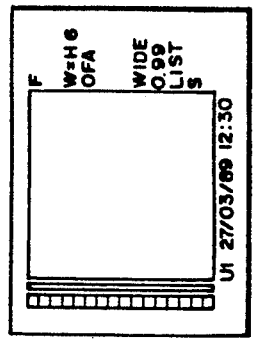
FIG. 23 is a view showing an example of displays of a recording being performed on an infrared image adjusting screen.

First, the user turns on the power supply while pressing the VTR key so that the VTR type can be altered. Then, a type is set by the + key or the − key according to the VTR. Next, the apparatus and the VTR are connected to each other as shown in FIG. 22, then the power supply of the apparatus is turned on with the VTR set in a recording stop condition. A recording stop signal is outputted from the apparatus through a VTR cable as a result of the initializing processing executed at step #1 of the flowchart of FIG. 3. Then, when the VTR key is pressed with the screen switching to the display for adjusting the infrared image, the VTR recording start/stop signal is outputted to the VTR according to a VTR type, and consequently, the VTR recording start/stop is controlled. FIG. 23 is an example, of an infrared image adjusting screen, showing a condition in which a recording is being carried out. Watching the CRT, the user can operate the start of a recording or the stop thereof and is informed whether or not the recording is presently carried out. Thus, the start/stop for the recording can be operated with one touch in any type of VTR and it is unnecessary for the user to have a labor for operating the VTR.

It is appeared that the invention is not limited to the above-described embodiments. Various changes and modifications can be made.

Figure 27:
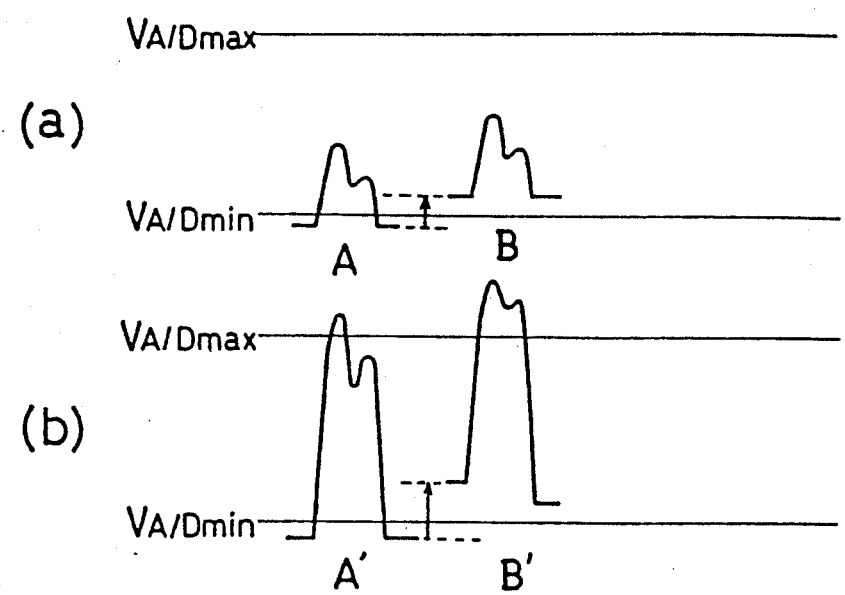
FIG. 27 is a view showing gains of an amplifier of an apparatus according to another embodiment of the present invention.

Next, another embodiment of the present invention in which the offset change speed is changed by the gain of the amplifier 13 is described. The reason for the above is as follows: When the gain of the amplifier 13 is small, the amplitude of a signal inputted to the A/D converter 14 is generally small as shown in FIG. 27(a), so that the temperature distribution (temperature difference in each portion) of an object to be measured cannot be read in detail on the screen. Therefore, if a fine temperature difference is to be displayed on the screen (if resolution is to be increased), the gain of the amplifier 13 is increased as shown in FIG. 27(b). As described previously, the offset adjustment is accomplished by transmitting a clock pulse to the counter 10 and changing its counted value DOF. Supposing that the frequency of the clock pulse is constant irrespective of the magnitude of a gain because the change (namely, the change of offset level) of the counted value DOF is amplified by the amplifier 13, a change from (A) to (B) occurs when the gain is small (FIG. 27(a)) while a great amount of change from (A') to (B') occurs when the gain is large (FIG. 27(b)) within the same period of time. Accordingly, when the gain is large, the level of the infrared image rapidly changes from black to white (or white to black) during a short period of time, so that the screen may become white (or black).

In the automatic offset adjusting mode, it takes a considerable period of time for the output of the amplifier 13 to be taken out as an average voltage. Therefore, even if the change of the offset amount is stopped by deciding that the average voltage has become a predetermined value, the offset amount is not actually stopped at the predetermined value, thus exceeding the predetermined value. For example, describing the case in which the average voltage is adjusted so that the average voltage becomes a voltage between the reference voltages Va and Vb, when the average voltage is smaller than Vb and the offset amount is increased, the actual average voltage of the output of the amplifier 13 becomes $Vb+\alpha$ when the average voltage has reached Vb. In the above, $\alpha$ is determined by the change speed of the output of the amplifier 13 and the above-described delay time. Accordingly, the faster the change speed of the output of the amplifier 13 is, i.e., the greater the gain of the amplifier 13 is, the greater $\alpha$ becomes, so that there is a case in which $(Vb+\alpha)$ exceeds Va depending on the gain of the amplifier 13. As a result, an oscillation occurs in the offset level, so that the output of the amplifier 13 does not take a value between Va and Vb.

Therefore, according to this embodiment, when the gain is great, the frequency of the clock pulse supplied by the CPU 9 to the counter 10 is reduced. By doing so, the greater the gain is, the slower the offset level automatically and slowly changes. Thus, the change of the output of the amplifier 13 becomes slow, so that an oscillation as described above does not occur in the automatic offset adjusting mode, and the offset adjustment also can be easily accomplished in the manual offset adjusting mode.

Figure 28:
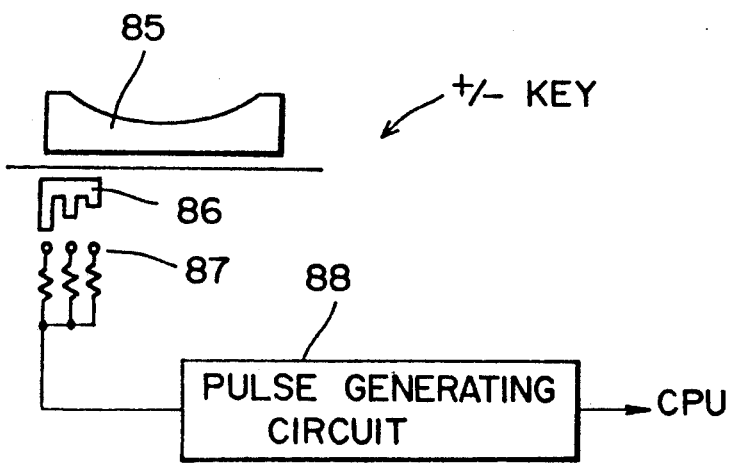
FIG. 28 is a view showing the partial construction of a +/− key, i.e. a + key and a − key according to the embodiment of FIG. 27.

Further, the offset changing speed can be manually (at operator's option) adjusted by constructing the ± key as shown in FIG. 28. Although only the mechanism in which the ± key is pressed to the (+) side is shown, a comb-shaped moving member 86 having three height-different teeth is provided below a key switch 85 and each tooth of the moving member 86 sequentially contacts a fixed contact 87 depending on the press amount of the key switch 85. A pulse generating circuit 88 sends to the CPU 9 a pulse of a frequency which is varied according to a resistance value which changes depending on the number of contacts of the teeth with the fixed contacts 87. According to the frequency of the pulse, the CPU 9 changes the frequency of the pulse signal it transmits to the counter 10.

Figure 29:
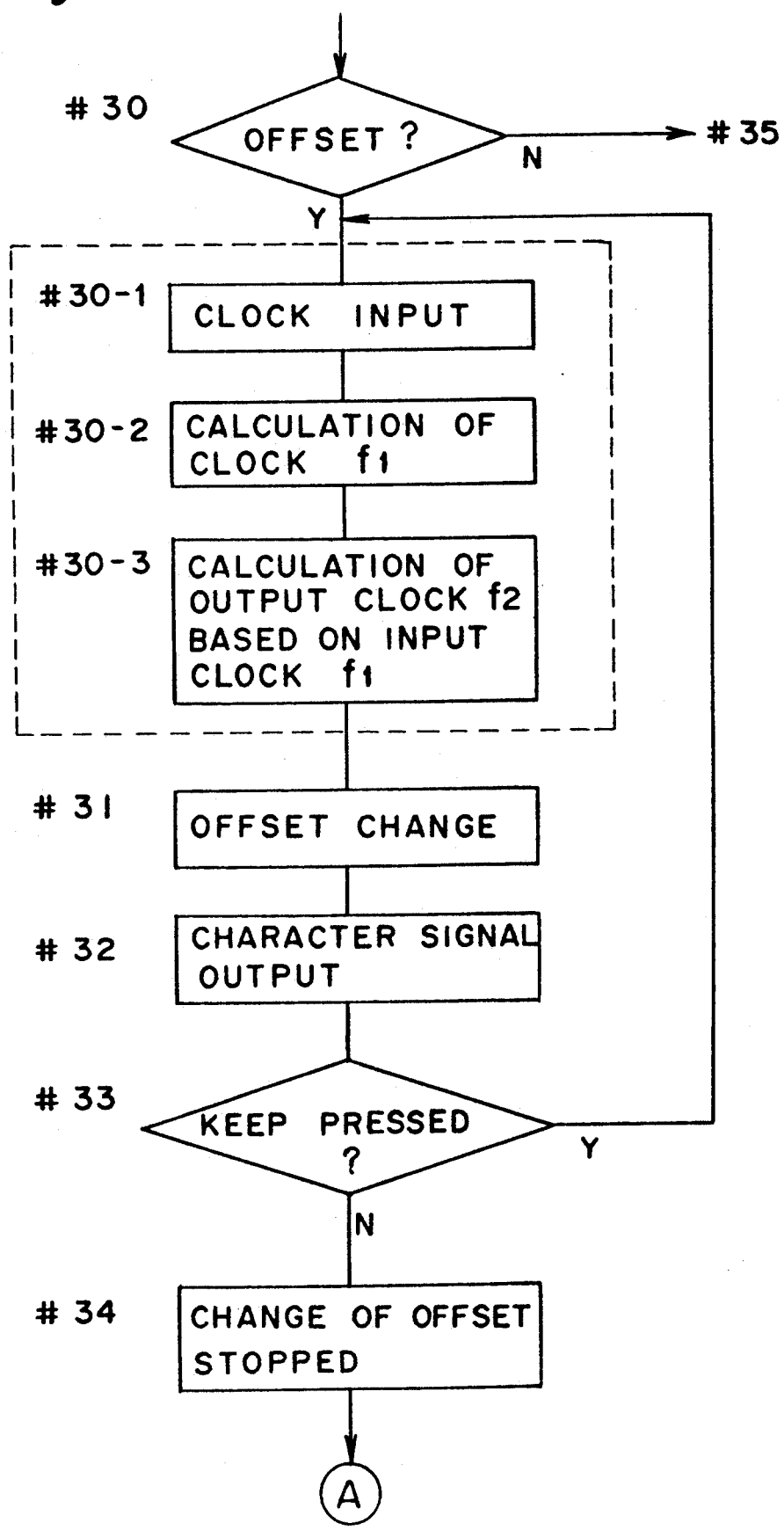
FIG. 29 is a flowchart to be added between steps #30 and #31 of FIG. 3(c) for adjusting an offset change

FIG. 29 shows a routine to be executed by the CPU 9 when the ± key is used. In this routine, steps #30-1-#30-3 are added between steps #30 and #31 of the flowchart of FIG. 3(c). If it is decided at step #30 that the offset adjusting mode is selected, at step #30-1, a pulse generated by the pressing of the key switch 85 is inputted from the generating circuit 88 to the counter 10, and at step #30-2, the frequency f1 thereof is calculated. Then, at step #30-3, based on the input frequency f1, the frequency f2 of the output pulse signal to the counter 10 is calculated using a predetermined conversion equation (or a conversion table), and at step #31, a pulse signal of the frequency f2 is outputted to the counter 10. Thus, the offset level is changed at a speed corresponding to the press amount of the key switch 85. That is, if an operator desires to change the offset slowly, the ± key should be pressed in a shallow degree and if the operator desires to change it promptly, the ± key should be pressed deeply.

Figure 30:
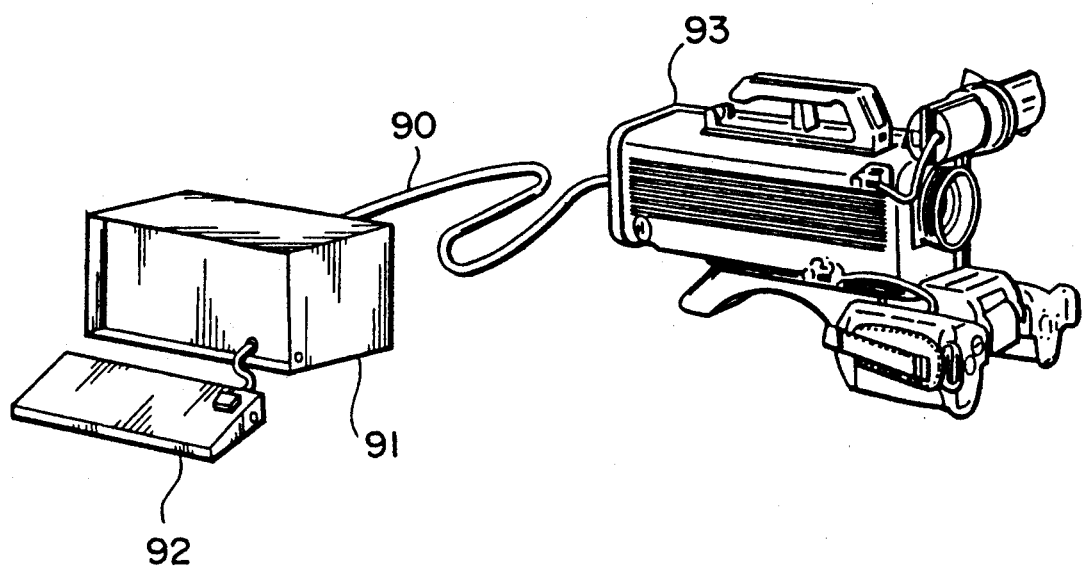
FIG. 30 is a perspective view showing the outer appearance of an apparatus according to still another embodiment of the present invention.
Figure 31:
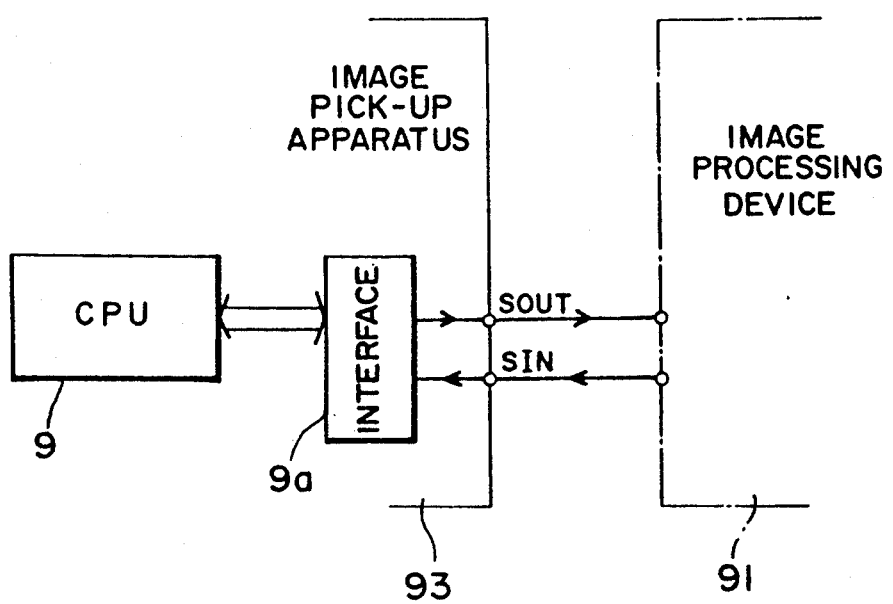
FIG. 31 is an explanatory view showing a data exchange between the apparatus of FIG. 30 and an image processing device thereof.

FIGS. 30-40 show an apparatus according to a still another embodiment of the present invention. As shown in FIG. 30, an image pick-up apparatus 93 can be connected with an external apparatus, that is, an image processing apparatus 91 through a cable 90. This cable 90 is capable of transmitting the output of the pre-amplifier 6 of FIG. 1(a), provided in the image pick-up apparatus 91, to the image processing device 91. Reference numeral 92 denotes an operation key board. If the user wants to remotely control the image pick-up apparatus 93, the operation key board 92 is used to set a data for controlling the image pick-up apparatus 93. Since signals obtained by the detector 5 are supplied to the image processing device 91, the image processing device 91 can independently process these signals. As shown in FIG. 31, the transmission and receipt of data between the image pick-up apparatus 93 and the image processing device 91 are performed through two wires. Reference letter SIN denotes a data signal to be inputted to the image pick-up apparatus 93 and SOUT designates a data signal to be transmitted from the image pick-up apparatus 93. These signals are inputted to and outputted from the CPU 9 through an interface 9a. The CPU 9 reads SIN, controls the apparatus in accordance with the SIN. On the other hand, the CPU 9 processes a signal from the detector 5 and transmits the signal SOUT to the image processing device 91 through the interface 9a.

Figure 32:
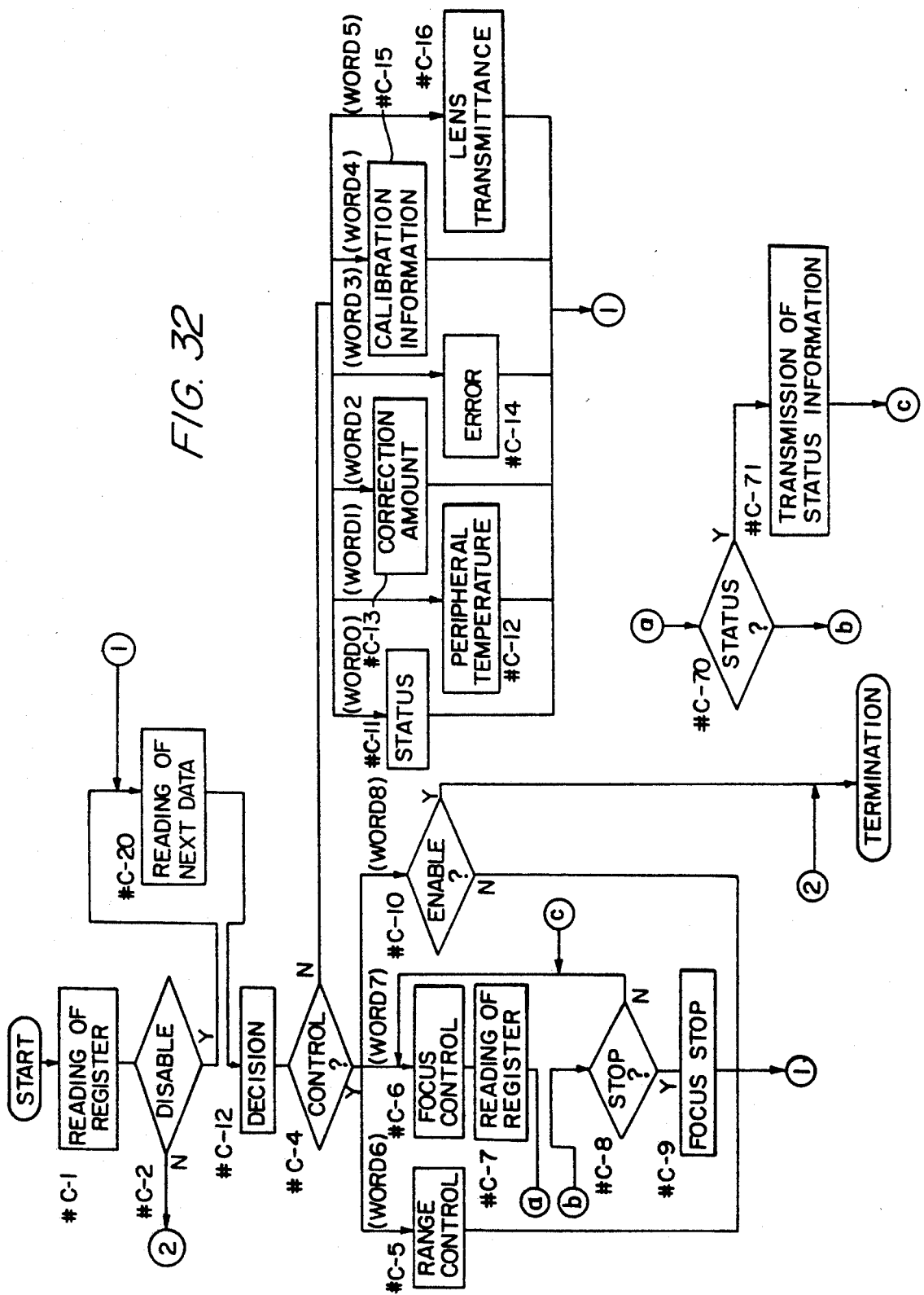
FIG. 32 is a flowchart concerning the receipt and transmission of a signal.

Next, the transmission and receipt of information are described using Table 1 and FIG. 32. FIG. 32 is a flowchart concerning the receipt and transmission of a signal. and the operation based on this flowchart is executed together with the key scan executed at step #7 of FIG. 3(a). Table 1 shows an example of data received and processings corresponding thereto.

First, the CPU 9 checks at step #7 of FIG. 3(a) whether or not the key switch has been pressed. If the key switch has been pressed, the program goes to step #C-1 of FIG. 32 after executing a processing corresponding to the pressed key and if not, the program directly goes to step #C-I of FIG. 32. At this time, the CPU 9 designates the register of the interface 9a in which a SIN signal of a serial input data from the image processing device 91 is stored as a parallel signal, thus reading the SIN signal. Then, the program goes to step #C-2 and based on Word 8 of Table 1, it is checked whether the SIN signal indicates the function prohibition condition (Disable) of the image pick-up apparatus 93 or the function release condition (Enable) thereof. If the SIN signal indicates the function prohibition condition, namely, Disable, it signifies that the grip keys provided on the grip 51 of the image pick-up apparatus 93 do not function, and if the SIN signal indicates the function release condition, namely, Enable, it signifies that the grip keys function. If the SIN does not indicate Disable, the program returns to step #5 of FIG. 3(a) after completing such a receipt/transmission processing. If the SIN signal indicates Disable, the register of the interface 9a is designated at step #C-20 to read the next SIN signal. Then, at step #C-3, the data analysis of the SIN is carried out. If this data indicates the control of the apparatus as a result of the analysis, the program goes to steps #C-5—#C-10 according to the SIN, and if the request for a data output is indicated, the program proceeds to steps #C-11-#C-16. The operation is described with reference to Table 1.

TABLE 1

|  |  | input data(SIN) | output data(SOUT) |
|---|---|---|---|
| data output to image processing apparatus | Word 0 | 00H | bit 0,1 = range bit 2 = focus limit |
|  | Word 1 | 01H | peripheral temperature |
|  | Word 2 | 02H | correction amount |
|  | Word 3 | 03H | error information |
|  | Word 4 | 04H | calibration information |
|  | Word 5 | 05H | lens transmittance |
| control of apparatus | Word 6 | 0 1 X X X X _ _ B bit 0, 1 = range |  |
|  | Word 7 | 1 0 _ _ _ _ _ _ bit 0 = $\overline{F/N}$ bit 1 = $\overline{OFF/ON}$ bit 2-5 = focus speed |  |
|  | Word 8 | 1 1 X X X X X bit 0 = Disable/$\overline{Enable}$ |  |

(X: non-use)

In the case of Word 6, the range filter is switched at step #C-5 according to the contents of bit 0 and bit 1. The contents of bit 0, 1 are determined beforehand so that, for example, (1, 0)=low range; (0, 1)=middle range; and (1, 1)=high range. A drive signal is sent to the range filter driving circuit 31 and the program returns to step #C-20 after switching the range filter.

Next, the switching of the range filter is described in detail.

Figure 33A:
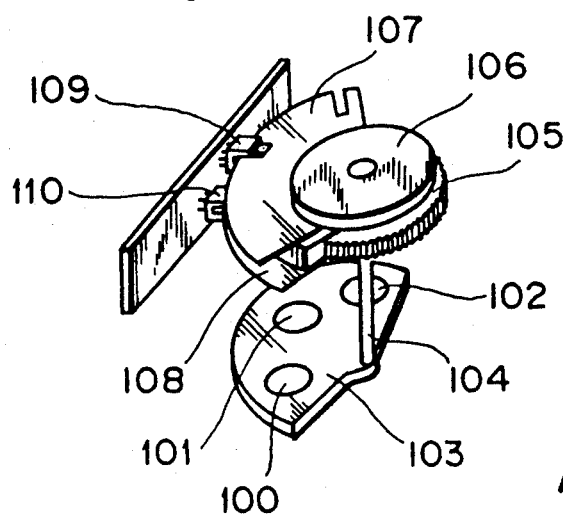
FIG. 33(a) is a perspective view showing the range filter driving mechanism.
Figure 33B:
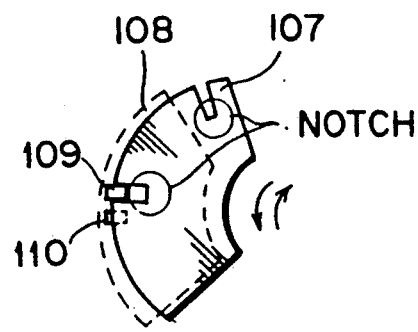
FIG. 33(b) is an explanatory view showing a mechanism for detecting the position of the range filter of a photosensor provided in a range filter driving mechanism.
Figure 33C:
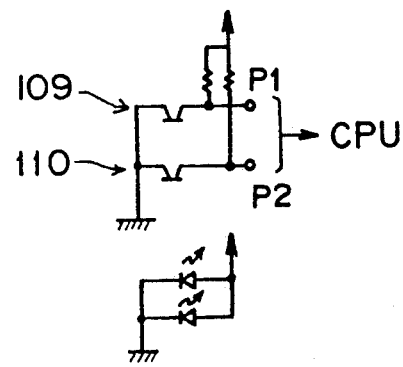
FIG. 33(c) is a detecting circuit diagram of a photosensor.
Figure 34:
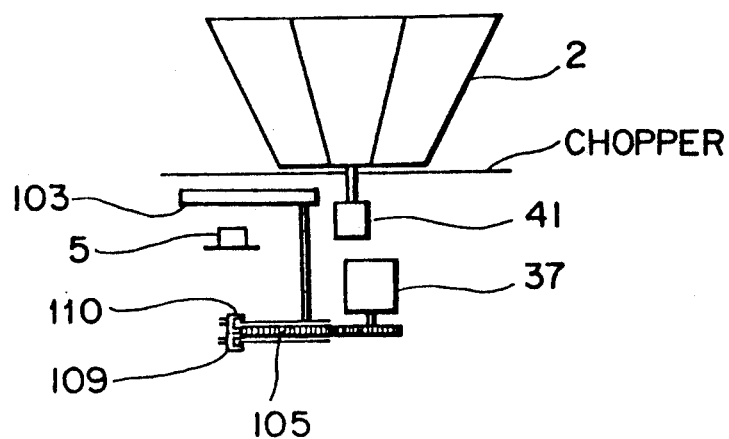
FIG. 34 is a view showing the position of the range filter driving mechanism of FIG. 33.

As shown in FIG. 33(a), a low range filter 100, a middle range filter 101, and a high range filter 102 are mounted on a range filter mounting plate 103 at a predetermined position thereof, respectively. The range filter mounting plate 103 is coupled to a gear 105 and a plate-pressing plate 106 through a shaft 104. Two plates A107 and B108 are mounted on the plate-pressing plate 106 and these two plates A107 and B108 intercept photosensors A109 and B110, respectively. FIG. 34 shows the arrangement of these members. Since the gear 105 engages the gear of a range filter driving motor 37 as shown in FIG. 34, the gear 105 rotates by rotating the range filter driving motor 37. Since the gear 105, the plate-pressing plate 106, the plate A107, the plate B108, the shaft 104, and the range filter mounting plate 103 are coupled to each other, these members rotate as a unit. A notch is formed on each of the plates A107 and B108 as shown in FIG. 33(b) so that when the respective range filters are positioned directly above the detector 5 by the rotations thereof, patterns formed when the photosensors A109 and B110 are intercepted by the plates A107 and B108 differ from each other. As shown in FIG. 33(c), since the outputs P1 and P2 of the photosensors A109 and B110 are inputted to the CPU 9, the pitch pattern of (P1, P2) is as follows: (P1, P2)=(0, 0) in the case of the high range; (P1, P2)=(0, 1) in the case of the middle range; and (P1, P2)=(1, 0) in the case of the low range. Thus, (P1, P2) becomes a different bit pattern according to the position of the filter range.

Figure 35:
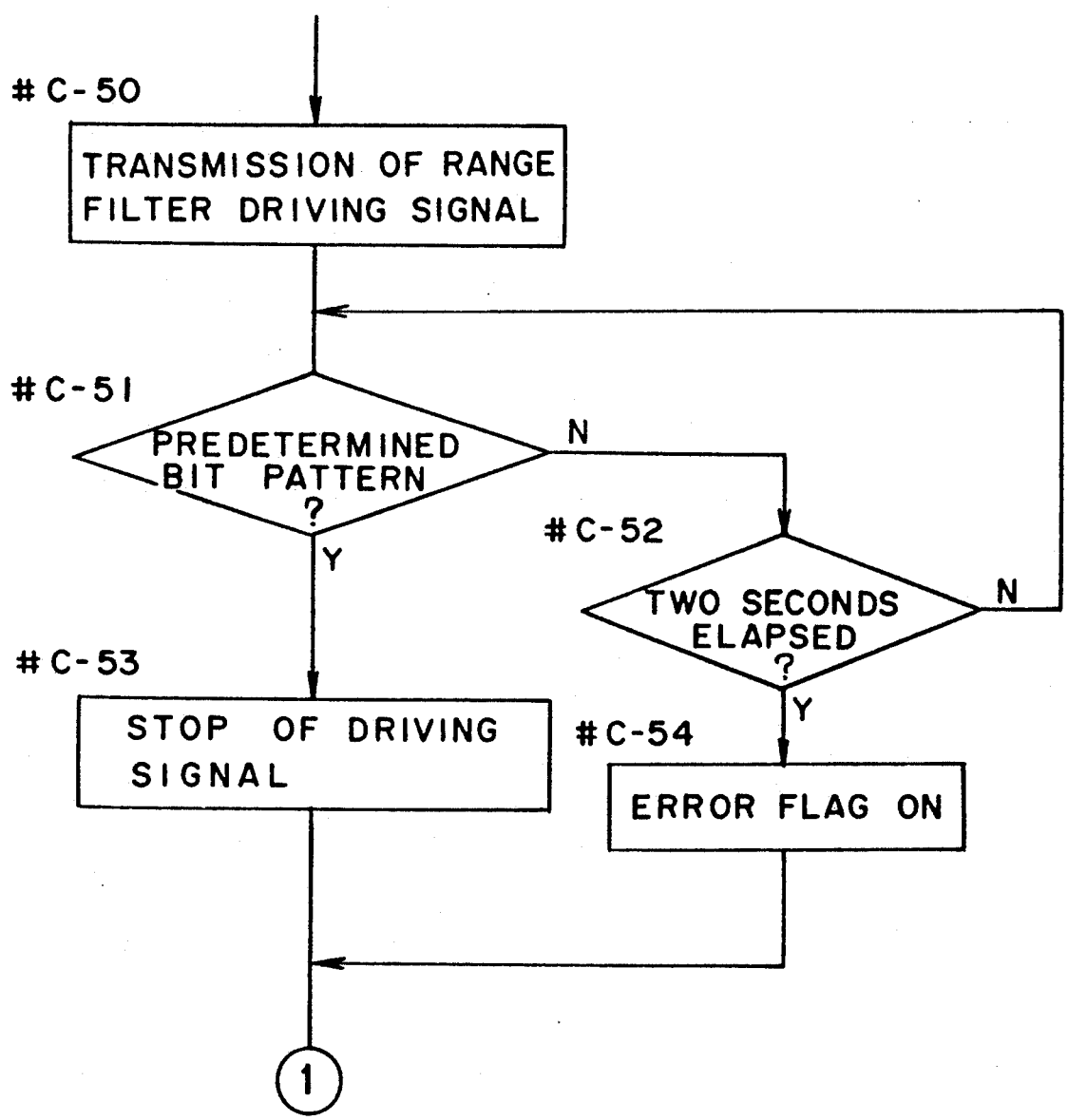
FIG. 35 is a flowchart for explaining step #C-5 of FIG. 32 in detail.

FIG. 35 shows a flowchart which describes step #C-5 of FIG. 32 in detail. At step #C-50, a range filter driving signal is transmitted according to the signal obtained at step #C-20 so as to rotate the motor 37. As described above, it is checked at step #C-51 whether or not the bit pattern of P1 and P2 have become the bit pattern corresponding to a designated range. If the corresponding bit pattern has been obtained, i.e., if it signifies that the range filter has been set at a predetermined position, the transmitting of the range filter driving signal is stopped at step #C-53, then the program returns to step #C-20. If the corresponding bit pattern has not been obtained, the program goes to step #C-52 at which time it is checked whether or not two seconds have elapsed after the range filter driving motor 37 is driven. If two seconds have not elapsed, the program returns to step #C-51 at which time the bit patterns of P1 and P2 are checked. Two seconds are enough to switch the high range filter 102 to the low range filter 100 by the rotation of the range filter mounting plate 103. Therefore, that when P1 and P2 does not become the bit pattern corresponding to the designated range in the two seconds means that, for example, the range filter driving motor 37 may have failed or the range filter mounting plate 103 is incapable of rotating because of some reason or other. In order to know the elapse of time, for example, the free counter of the CPU 9 can be utilized. If two seconds have elapsed by the check carried out at step #C-52, it signifies that the range filter has failed as described previously, so that at step #C-54, a range filter error flag provided in the RAM 27 is turned on to indicate the failure of the range filter. Then, the program returns to step #C-20. This error flag is utilized for Word 3 as described later.

Next, Word 7 will be described. In the case of Word 7, a focus driving signal is outputted to the focusing lens driving circuit 30 in order to control the focusing motor 36 at step #C-6. At this time, the frequency of a clock to be outputted according to the content of the bit 2 –5 is determined. Then, the program goes to step #C-7 at which the register of the interface 9a is again designated to read the next SIN signal. Then, at step #C-70, it is checked whether or not this signal is a status signal which will be described later. If the signal is the status signal, range information and focus limit information, namely, data indicating that the focus adjusting lens has reached the movement limit are outputted. If the signal is not the status signal, at step #C-8, it is checked whether or not the signal is a focus control signal and whether or not a focusing is stopped, namely, whether or not bit 1=1. If bit 1=0 or if the signal is not the focus control signal, the program returns to step #C-6. If the signal is the focus control signal and bit 1=1, the program goes to step #C-9 at which a focus stopping signal is outputted to the focusing lens driving circuit 30. Then, the program returns to step #C-20.

In the case of Word 8, it is checked at step #C-10 whether the apparatus is Enable or not, namely, bit 0=0. If bit 0=1, the program returns to step #C-20, and if bit 0=0, the program returns to step #5 of FIG. 3(a) after completing such a signal receipt/transmission processing.

In the case of Word 0, at step #C-11, the status of the apparatus, namely, range information and the focus limit information are outputted. As shown in the item of Word 0 of Table 1, the range information and the focus limit information are indicated by bit 0, 1 and bit 2, respectively. For example, the contents of bit 0, 1 are set so that (bit 0, 1)=(1, 0) in the low range; (bit 0, 1)=(0, 1) in the middle range; (bit 0, 1)=(1, 1) in the high range, and in the case of the focus limit condition, bit 2="1" is set. Accordingly, if the low range filter is currently used in the apparatus and the focus limit condition has been attained, 05H(00000101B) is outputted. Then, the program returns to step #C-20.

The detection of the focus limit of the apparatus is described with reference to FIGS. 39 and 40.

Figure 39:
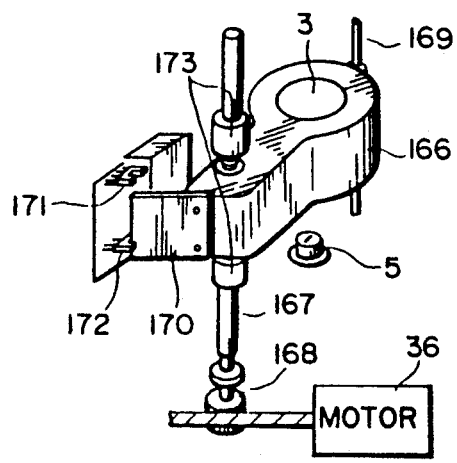
FIG. 39 is a perspective view showing the constructions of the focus limit driving device and focus limit detecting device of the apparatus according to still another embodiment.

FIG. 39 is a perspective view showing the constructions of the focus limit driving device and the focus limit detecting device according to a still another embodiment. The infrared condenser lens 3 is accommodated in a holder 166 and the holder 166 is guided by a holder pressing shaft 169 and screw-coupled to a shaft 167. A gear 168 is fixed to the end of the shaft 167 and engages the rotation shaft of the motor 36. Accordingly, when the motor 36 rotates, its rotation is transmitted to the shaft 167 through the gear 168, and the holder 166 moves in an axial direction of the shaft 167 according to the rotation of the shaft 167. As a result, an infrared image which has passed through the lens 3 is focused and condensed on the infrared detector 5.

Stoppers 173 are fixed to the shaft 167 with the holder 166 interposing therebetween so as to set the movement limit of the holder 166.

Further, a plate 170 is mounted on the holder 166 and near and far limit detecting photosensors 171 and 172 are provided in opposition to the plate 170. When the holder 166 has moved to its limit, the photosensors 171 and 172 are intercepted by the plate 170, thus outputting a limit detecting signal, respectively.

Figure 40:
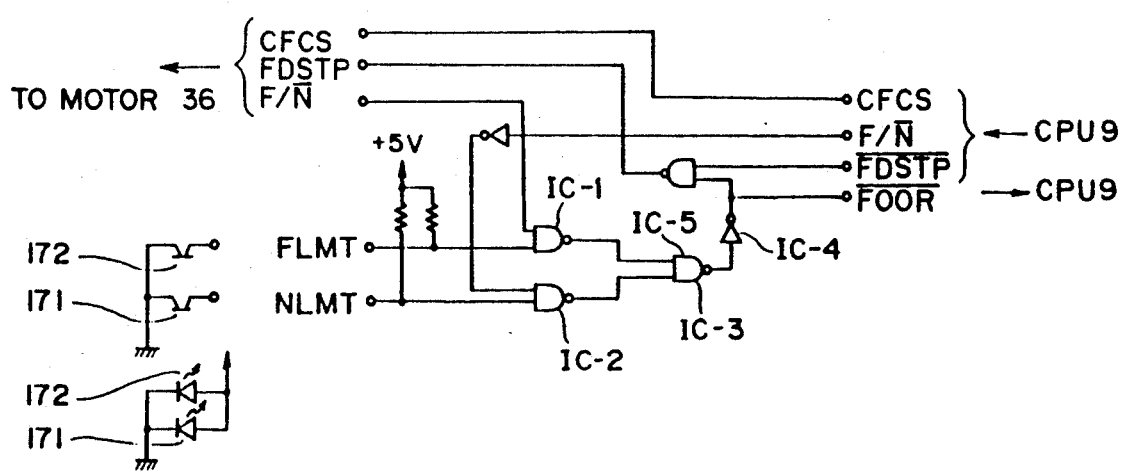
FIG. 40 is a circuit diagram showing the detecting section of a focusing limit.

FIG. 40 is a circuit diagram of the detecting section of the focus limit. The motor 36 is of a stepping motor which is driven when the rotation/stop signal $\overline{FDSTP}$, rotation direction signal F/$\overline{N}$, and clock pulse CFCS are supplied thereto. When the clock pulse is supplied to the motor 36 with the level of the $\overline{FDSTP}$ high (H) and the F/$\overline{N}$ low (L), the motor 36 rotates on the near side. When the focus has reached the limit, the photosensor 171 is intercepted by the plate 170 and the output of the IC-2 becomes "L" and consequently, the output of an IC-3 becomes "H" and the output of an IC-4 becomes "L". When the CPU 9 detects the signal $\overline{FOOR}$, the limit is detected.

In the example of the circuit of FIG. 40, when the focusing has reached the limit, the level of the output signal $\overline{FOOR}$ of the IC-4 becomes "L", with the result that the motor 36 is stopped.

In the case of Word 1, at step #C-12, the signal of the temperature sensitive element 33 positioned inside the apparatus is processed to calculate a peripheral temperature, and a signal is outputted according to a predetermined format. The format is used by expressing the absolute value of a temperature value by bit 0–6 and a sign flag by bit 7 with the resolution being 0.5° C. If a calculated temperature is +16° C., 20H(00100000B) is outputted. Then, the program returns to step #C-20. The peripheral temperature is used as data when the image processing device 91 measures a temperature.

In the case of Word 2, at step #C-13, the correction amount of the entire gain is calculated based on the current temperature of the detector 5 and the gain change of the pre-amplifier 6 which has occurred due to the peripheral temperature, and a signal is outputted based on a predetermined format. The format is so determined that a value obtained by multiplying the correction amount calculated in the above by 128 is outputted. If a calculated correction amount is "1", 80H(10000000B) is outputted. Then, the program returns to step #C-20. This correction amount is used as data when the image processing device 91 measures a temperature.

In the case of Word 3, at step #C-14, a signal is outputted according to a predetermined format. The error information will be described in detail.

Figures 36, 37:
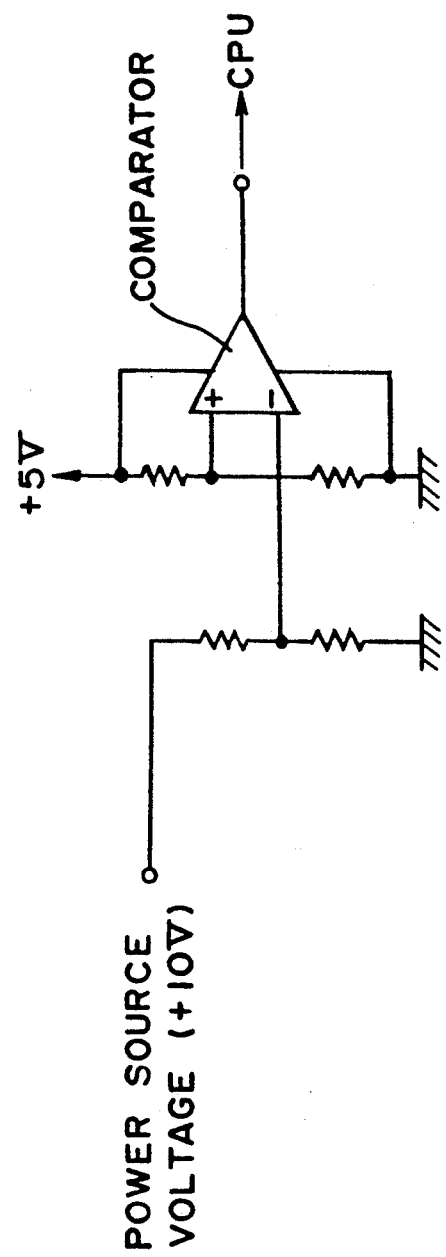
FIG. 36 is a view showing an example of a format of error information.
FIG. 37 is a view showing a circuit for detecting the power source voltage.

FIG. 36 shows an example of a format showing the error information. Bit "0" indicates whether the rotation of the polygon (rotating polygon mirror) 2 is normal or abnormal. Bit "1" indicates whether or not the reading of the content of E²PROM 40 storing calibration information is correct or wrong. Bit "2" indicates whether or not a range filter has been set in a predetermined range. Bit "3" indicates whether the voltage of the power source supplied to the apparatus is normal or abnormal. Bit "4" indicates whether or not the content of the RAM 27 backed up by a back-up battery (not shown) is normal. If an abnormality has been detected, "1" is set. Thus, the error format is decided, thereby error information is outputted. For example, if only the rotating polygon mirror 2 is currently abnormal, 01H(00000001B) is outputted. Next, the method for detecting these errors will be described.

Rotation of Rotating Polygon Mirror

Figure 38:
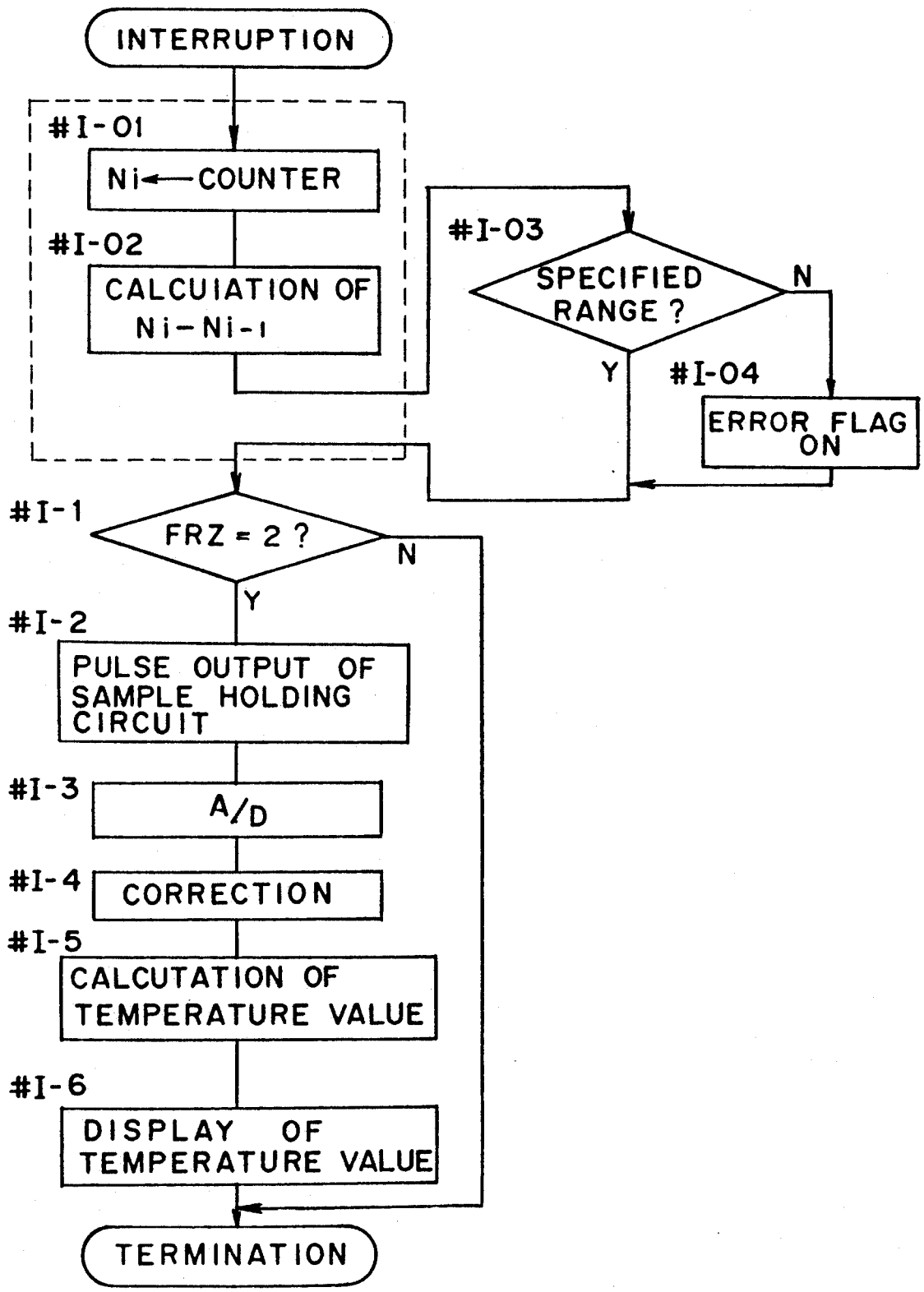
FIG. 38 is a flowchart showing a method for detecting an error which has occurred when a rotating polygon mirror has failed in its rotation.

As shown in FIG. 38, steps #I-01–#I-04 are added to an interruption processing to which the program goes each time the rotating polygon mirror 2 makes one rotation. At step #I-01, the free counter of the CPU 9 is read and the read value Ni is stored in the RAM 27. Then, at step #I-02, the difference between the value Ni of the free counter read in the current interruption and Ni-1 thereof read in the previous interruption is calculated. A value (Ni−Ni−1) calculated when the polygon mirror 2 is rotating in a specified cycle is known, but it is checked at step #I-04 whether or not (Ni−Ni−1) calculated at this time is in the specified range. If (Ni−Ni−1) is not in the specified range, the program goes to step #I-04 at which a flag provided in the RAM 27 is turned on to indicate that the polygon mirror 2 is abnormally rotating. Then, the program goes to step #I-1. Whether the polygon mirror 2 is rotating normally or abnormally is detected by examining whether this flag is ON or OFF.

Reading of E²PROM

As described previously, at step #1 of FIG. 3(a), with the initializations of the internal register of the CPU 9 and the RAM 27, a processing for storing the calibration information stored in E²PROM 40 into the RAM 27 is executed. A sum checking area is provided in the E²PROM 40 in which the addition of all data is stored. When the storing processing is executed, all data except the added data stored in E²PROM 40 are successively read to perform an addition and it is checked whether or not the added value coincides with the added data stored in the E²PROM 40. If no, a flag provided in the RAM 27 is turned on to indicate that the reading of the E²PROM 40 has failed. Whether the reading of E²PROM 40 is normal or abnormal is detected by checking whether this flag is ON or OFF.

Range

Whether or not the range filter is normal or abnormal is detected by checking whether the error flag, mentioned in the description of the Word 6, of the range filter provided in the RAM 27 is ON or OFF.

Power Source Voltage

The detecting circuit of the power source voltage is shown in FIG. 37. If normal, the CPU 9 detects "0". If the power source voltage decreases from +10 V, the output of the comparator is inverted to the plus side and the CPU 9 detects "1". The CPU 9 detects "0" or "1" to check whether the power source voltage is normal or abnormal.

Back-up

In the RAM 27, specified data is written to a predetermined address and it is checked whether or not input data coincides with the specified data. If it is decided that the data has an error as a result of the execution of step #1 of FIG. 3(a), the flag provided in the RAM 27 is turned on to indicate a back-up error. The back-up error is detected by checking whether this flag is ON or OFF.

As described above, error information is obtained by checking each error flag or detecting an error and then, a signal is outputted according to the format shown in FIG. 36.

In the case of Word 4, at step #1, calibration information stored in E²PROM 40 is stored into the RAM 27 and these data are successively outputted at step #C-15. These calibration information are used as data by the image processing device 91 when it measures a temperature.

In the case of Word 5, the transmittance data of all lenses set on the initial display screen are successively outputted at step #C-16. These values are used as data for the image processing device 91 to calculate a temperature value when an additional lens is mounted on the apparatus.

As described above, the image processing device 91 can perform a remote control of the apparatus. In addition, once the disable signal is outputted, the grip key of the apparatus does not function, so that the setting of the apparatus is not unintentionally changed while the image processing device 91 is being used. Furthermore, a calibration is individually performed and calibration information is stored in E²PROM 40 of the apparatus, so that the apparatus is exchangeable when a temperature is measured by the image processing device 91.

A further embodiment of the present invention is described below.

Figure 41:
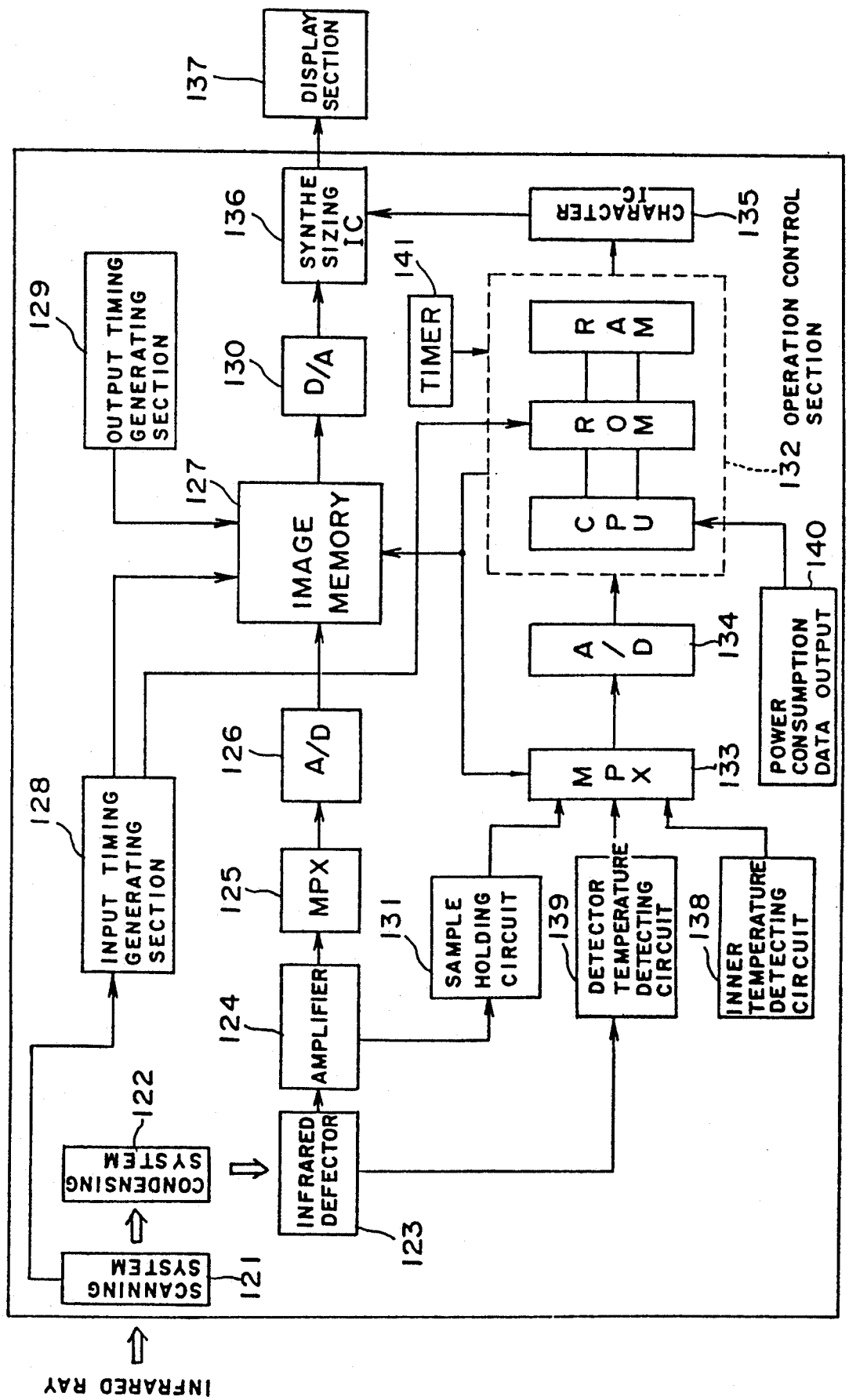
FIG. 41 is a block diagram showing the construction of an infrared image pick-up apparatus according to a further embodiment of the present invention.

FIG. 41 is a block diagram showing the construction of an infrared image pick-up apparatus. Infrared rays emitted by an object to be measured is scanned horizontally and vertically by a scanning system 121 and condensed by a condensing system 122 and guided to an infrared detector 123. Each detector element constructing the infrared detector 123 is of a linear array construction and outputs in parallel an electric signal corresponding to an incident infrared ray.

Each outputted video signal is amplified by an amplifier 124 and converted into a time series analog signal by a multiplexer 125, respectively. This analog signal is A/D-converted by an A/D converter 126 and stored in an image memory 127 according to a predetermined address. Based on a synchronizing signal generated by the scanning system 121, this address is designated by an input timing generating section 128.

An output timing generating section 129 designates the address of the image memory 127 and the image memory 127 outputs a video signal stored in correspondence with the designated address. The outputted video signal is converted into an analog signal by a D/A converter 130 and becomes a video signal.

An output signal of a certain detecting element of the infrared detector 123 is amplified by the amplifier 124 and sample-held by a sample holding circuit 131. The value of the sample-held temperature signal which has passed through a multiplexer 133 is A/D-converted by an A/D converter 134 and outputted to an operation control section 132 by means of the control signal of the operation control section 132.

A data of power consumption of the image pick-up apparatus is outputted from a power consumption data output 140 to the CPU of the operation control section 132. The operating time is measured by the timer 141 at the same time that the power source of the apparatus is turned on. Then, the timer 141 outputs an operating time signal to the operation control section 132.

A peripheral temperature calculation is performed repeatedly by the operation control section 132 based on the value of the temperature signal and the data of power consumption and converted into a character signal by a character IC 135. The operation control section 132 receives the operating time signal from the timer 141 and calculates an interval of each peripheral temperature calculation. The above-described video signal and the character signal are superimposed by a synthesizing IC 136, thus being sent to a display section 137. The display section 137 displays the value of a video signal showing the temperature distribution of the object.

Figure 42:
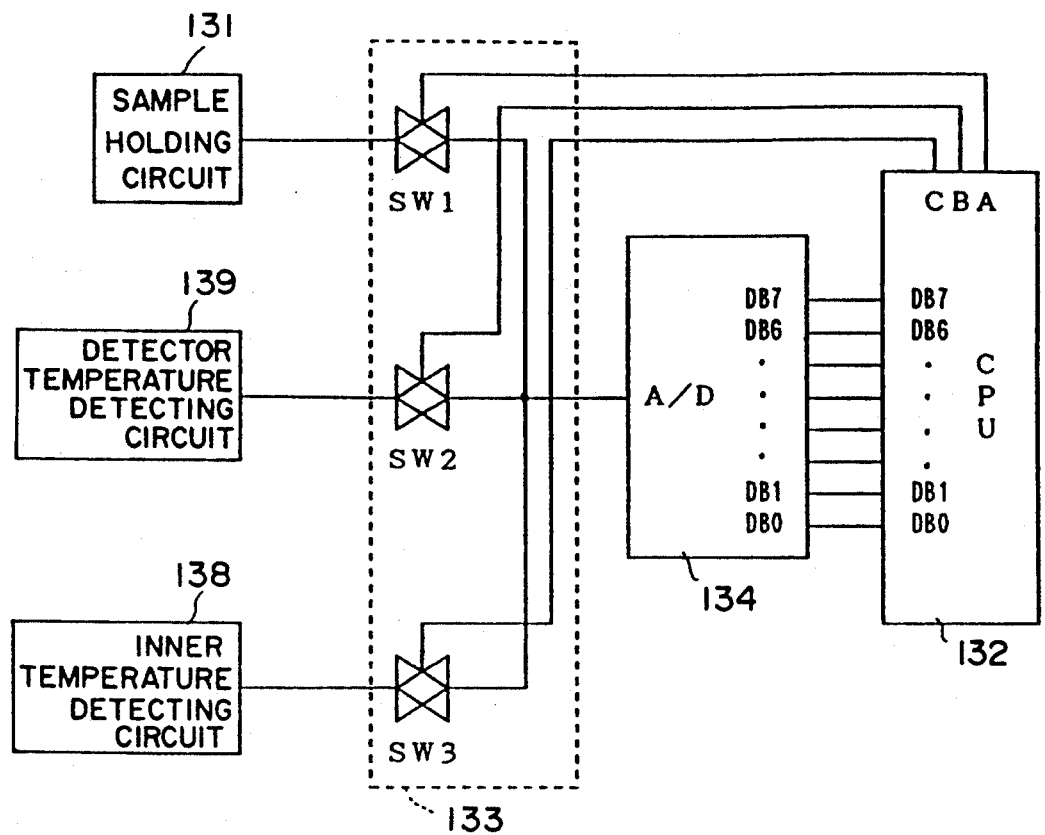
FIG. 42 is a view showing relationship between an operation control section and a multiplexer.

FIG. 42 shows the relationship between the operation control section 132 and the multiplexer 133. When the CPU of the operation control section 132 sets the level of an output port (A) to "H" (levels of output ports (B) and (C) are set to "L") and turns on the switch SW1, the temperature signal sample-held by the sample holding circuit 131 is outputted to the A/D converter 134, through the switch SW1, at which the temperature signal is A/D-converted and outputted to the data bus of the CPU of the operation control section 132.

When the CPU of the operation control section 132 sets the level of the output port (B) to "H" (the levels of the output ports (A) and (C) are set to "L") and a switch SW2 is turned on, an output signal corresponding to a detector temperature detected by a detector temperature detecting circuit 139 is outputted to the A/D converter 134, through the switch SW2, at which time the output signal is A/D-converted, then outputted to the data bus of the CPU of the operation control section 132.

Next, when the CPU of the operation control section 132 sets the level of the output port (C) to "H" (the levels of the output ports (A) and (B) are set to "L") and a switch SW3 is turned on, an output signal, corresponding to an internal temperature, outputted from an internal temperature detecting circuit 138 is inputted to the A/D converter 134, through the switch SW3, at which the output signal is A/D-converted by the A/D converter 134, then the A/D-converted signal is outputted to the data bus of the CPU of the operation control section 132.

As described above, the CPU is capable of calculating respective temperatures based on the temperature signals of the object, the detector, and the inside of the apparatus by outputting a control signal from the CPU.

A chopper not shown is mounted on the optical paths of the condensing system 122 and the infrared detector 123. Supposing that the temperature of the object is Tt; its emissivity is $\epsilon$; the internal temperature of the apparatus is Tm; and the peripheral temperature of the object is Ta, the radiation energy of the object having the temperatures Tt, Tm, and Ta is indicated by a function of a wavelength $\lambda$, respectively, namely, Wt ($\lambda$), Wm ($\lambda$), and Wa ($\lambda$).

The energy quantity within the sensitivity region from $\lambda 1$ to $\lambda 2$ of the infrared detector 123 is shown as follows, respectively:

$$Et = \int_{\lambda 1}^{\lambda 2} Wt(\lambda)d\lambda \tag{1}$$

$$Em = \int_{\lambda 1}^{\lambda 2} Wm(\lambda)d\lambda \tag{2}$$

$$Ea = \int_{\lambda 1}^{\lambda 2} Wa(\lambda)d\lambda \tag{3}$$

The radiation energy of the object to be measured, the radiation energy emitted by parts positioned inside the apparatus and in the periphery of the infrared detector 123, and the radiation energy radiated from the periphery of the object to be measured and reflected by the object to be measured enter into the infrared detector 123 when the chopper is opened. The quantity of energy E1 which enters the infrared detector 123 at this time is shown as follows:

$$E1 = A \cdot \{\epsilon \cdot Et + (1-\epsilon)Ea\} + B \cdot Em \tag{94}$$

The quantity of energy E2 which enters the infrared detector 123 when the chopper is closed is as follows:

$$E2 \cdot C \cdot Em \tag{5}$$

where A, B, and C are constants determined by the configuration of the constructions and sizes of the scanning system 121, the condensing system 122, and the infrared detector 123.

As understood from the equation (4), the energy E1 is greatly influenced by energy Ea, namely, energy radiated from the periphery when emissivity [ is small compared with 1.

The output $\Delta E$ of the infrared detector 123 is as follows:

$$\Delta E = E1 - E2 = A \cdot \{\epsilon \cdot Et + (1-\epsilon)Ea\} + (B-C) \cdot Em \tag{6}$$

Changing the form of the equation (6), $$Et = \left\{ \frac{1}{A} \cdot \Delta E + \frac{C-B}{A} \cdot Em - (1-\epsilon) \cdot Ea \right\}/\epsilon \tag{7}$$

The radiation energy from the object is chopped by the chopper, thus entering into the infrared detector 123. Each of the detecting elements of the infrared detector 123 is of a linear array construction. The output of a detecting element is amplified by the amplifier 124 and sample-held by the sample holding circuit 131.

The sample-held temperature signal of the object to be measured and the internal temperature signal detected by the internal temperature detecting circuit 138 pass through the multiplexer 133 operated by the control signal of the operation control section 132, then are converted into a digital value by the A/D converter 134, and the A/D-converted signals are inputted to the operation control section 132.

Supposing that the digital value corresponding to the temperature signal of the object is D1, D1 corresponds to $\Delta E$ of the equation (7), and supposing that the digital value corresponding to the internal temperature signal obtained from the internal temperature detecting circuit 138 is D2, D2 corresponds to Em of the equation (7). Further, 1/A and (C−B)/A can be calculated beforehand from the outputs obtained when two objects to be measured whose temperatures are known are measured (two points calibration). In addition, as described later, Ea is calculated because the peripheral temperature of the object can be calculated, and the operation control section 132 calculates Et according to the equation (7) so as to calculate the temperature of the object.

Next, the method for calculating the peripheral temperature from the internal temperature, the operating time, and the power consumption will be described. There is the following relationship between the internal temperature and the peripheral temperature:

$$\frac{dTm(t)}{dt} + \frac{k}{C} Tm(t) = \frac{Q}{C} + \frac{k}{C} \cdot Ta(t) \tag{8}$$

where Tm(t): internal temperature (°C.) at time (t);

k: thermal conduction coefficient (Joule/sec/°C.) between infrared image pick-up apparatus and atmospheric air;

C: thermal capacity (Joule/°C.) of infrared image pick-up apparatus;

Q: calorific value (Joule/sec) of infrared image pick-up apparatus per time; and Ta(t): peripheral temperature (°C.) at an operating time (t).

Changing the form of the equation (8), $$Ta(t) = \frac{C}{k} \cdot \frac{dTm(t)}{dT} + Tm(t) - \frac{Q}{k} \quad (9)$$

Ta (t) is determined by measuring Tm (t) supposing that C/k and Q/k are known.

It takes more than an hour for the internal temperature of the infrared image pick-up apparatus to become a stationary condition because the thermal capacity thereof is great.

When the stationary condition of the internal temperature is established (when the internal temperature becomes constant), the equation (9) is expressed as follows:

$$Ta(\infty) = Tm(\infty) - \frac{Q}{k}$$

therefore, $Q/k = Tm(\infty) - Ta(\infty) \quad (10)$

Measuring Tm ($\infty$)—Ta ($\infty$), the Table 2 is obtained as shown below.

TABLE 2

| supply power voltage | power source electric current | power consumption | Tm ($\infty$) — Ta ($\infty$) = Q/K |
|---|---|---|---|
| 10 V | 0.86 A | 8.6 W | 9.3° C. |
| 13 V | 0.76 A | 9.88 W | 10.5° C. |

Thus, the following equation is established:

$$Q/k = 1.07 \; (°C./W) \cdot P \quad (11)$$

where P is power consumption of the image pick-up apparatus.

As known from the equations (10) and (11), even when the internal temperature of the infrared image pick-up apparatus is on a stationary condition, the peripheral temperature Ta ($\infty$) is greatly influenced by the power consumption P of the apparatus.

Next, thermal time constant C/k is calculated. From the equation (9), $$C/K = \frac{Ta(t) - Tm(t) + Q/k}{dTm(t)/dt} \quad (12)$$

Table 3 is obtained from the equation (11), (12), and data obtained by a measurement using an infrared image pick-up apparatus having P=8.76 W.

TABLE 3

| t (min) | Ta (°C.) | Tm (°C.) | dTm/dt (°C./min) | C/K |
|---|---|---|---|---|
| 5 | 24.45 | 26.15 | 0.3667 | 20.92 |
| 12 | 24.46 | 28.2 | 0.2625 | 21.45 |
| 23 | 24.76 | 30.5 | 0.1429 | 25.40 |
| 43 | 24.22 | 32.41 | 0.06923 | 17.04 |

From the Table 3, the following is calculated:

$$C/k = 21.2 \; (min) \quad (13)$$

From the equations (9), (11), and (13), the following is obtained:

$$Ta(t) = 21.2 \cdot \frac{dTm(t)}{dt} + Tm(t) - 1.07 \cdot P \quad (14)$$

Ta calculated using the equation (14) and measured values are shown in Table 4 supposing that P=8.76 W. As understood from Table 4, calculated values and measured values are considerably approximate although there is a small error therebetween.

If $t \geq 60$ minutes, the error of the following equation (15) is smaller than the error of the equation (14).

$$Ta(t) = Tm(t) - 1.07 \cdot P \quad (15)$$

Figure 43:
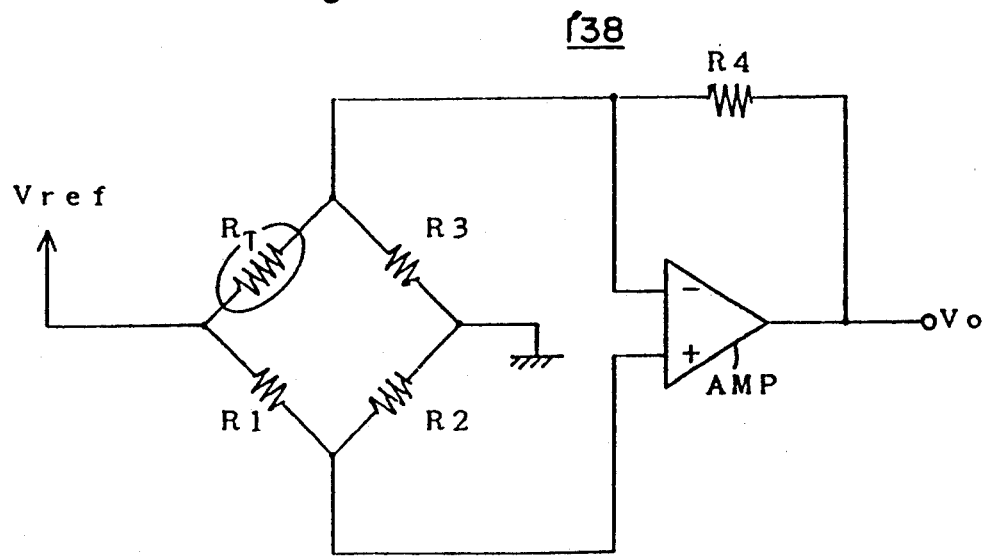
FIG. 43 is a view showing an example of an internal temperature detecting circuit.

The internal temperature necessary for estimating the peripheral temperature is described below. FIG. 43 shows an example of the internal temperature detecting circuit 138.

The internal temperature detecting circuit 18 comprises a bridge circuit and an amplifier AMP. Reference letter Vref denotes a reference voltage; R1, R2, R3, and R4 designate a known resistance, respectively; and $R_T$ represents a temperature sensitivity resistance. Output voltage Vo is as follows:

$$Vo = \frac{Vref}{R1 + R2} \cdot \left( R2 - \frac{R1 \cdot R4}{R_T} + \frac{R2 \cdot R4}{R3} \right) \quad (16)$$

The resistance value $R_T$ of the temperature sensitivity resistance is expressed as follows:

$$R_T = R_{TO}(1 + C_{RT} \cdot Tm) \quad (17)$$

In the above, $R_{TO}$ denotes the resistance value of the temperature sensitivity resistance at 0° C.; $C_{RT}$ designates a temperature correction coefficient; and Tm indicates an internal temperature.

The internal temperature Tm is expressed as follows from the equations (16) and (17):

$$Tm = \frac{R1 \cdot R4/R_{TO} \cdot C_{RT}}{\left( R2 + \frac{R2 \cdot R4}{R3} \right) - \frac{R1 + R2}{Vref} \cdot Vo} - \frac{1}{C_{RT}} \quad (18)$$

The output voltage Vo is A/D-converted by the A/D converter 134. Supposing that the A/D converter 134 has an N-bit resolution when the analog input range is from 0 to Vref; Vo is expressed as follows:

$$Vo = \frac{Vref}{2^N} \times (A/D \text{ count value}) \quad (19)$$

Tm is expressed in the following equation according to the equations (18) and (19):

$$Tm = \quad (20)$$

$$\frac{R1 \cdot R4/R_{TO} \cdot C_{RT}}{\left( R2 + \frac{R2 \cdot R4}{R3} \right) - \frac{R1 + R2}{2^N} \times (A/D \text{ count value})} -$$

$$\frac{1}{C_{RT}}$$

It is necessary to correctly measure the internal temperature in order to measure the peripheral temperature correctly. The quantization error in the A/D conversion to be performed by the A/D converter 134 should be small to correctly measure and calculate the internal temperature. In order to reduce the quantization error, the resolution in the A/D conversion should be increased, however, the A/D converter is expensive. Therefore, the influence of the quantization error is reduced by averaging A/D count values.

From the above, the CPU of the operation control section 132 averages inputted A/D count values of internal temperatures, thus calculating the internal temperature Tm based on the equation (20) using the averaged A/D count value.

Next, the outline of an operation for calculating the peripheral temperature based on the internal temperature, checking the peripheral temperature, and outputting a warning display will be described using the flowchart of FIG. 44.

Figure 45:
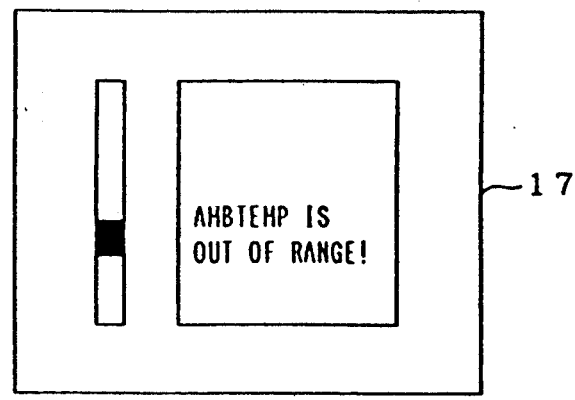
FIGS. 45–47 are views of the warning displays.

First, the internal temperature is calculated (step S1 is described as only S1. Similarly expressed hereinafter). Next, the peripheral temperature is estimated based on the internal temperature obtained by this calculation (S2). Thereafter, it is checked whether or not the peripheral temperature is not less than 50° C. (S3). If the peripheral temperature is not less than 50° C., a warning display 1 (this example is shown in FIG. 45) is outputted (S5), then the program returns to S1.

If the peripheral temperature is less than 50° C. according to the decision of S3, it is checked whether or not the peripheral temperature is not less than 40° C. (S4). If the peripheral temperature is not less than 40° C., a warning display 2 (this example is shown in FIG. 46) is outputted (S7), then, the program returns to S1.

If it is decided at S4 that the peripheral temperature is less than 40° C., it is checked at S6 whether or not the peripheral temperature is not more than −20° C. and if the peripheral temperature is not more than −20° C., the same warning display 1 as the above is outputted (S9), then, the program returns to S1.

Figure 47:
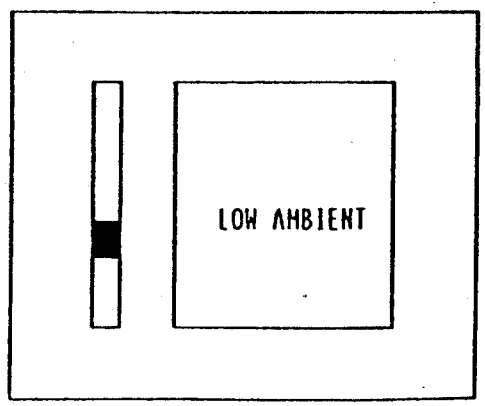

If it is decided at S6 that the peripheral temperature is more than −20° C., it is checked at S8 whether or not the peripheral temperature is not more than 0° C., and if the peripheral temperature is not more than 0° C., a warning display 3 (this example is shown in FIG. 47) is outputted (S10), then, the program returns to S1. If the peripheral temperature is more than 0° C., the program returns to S1. Thereafter, similar operations are repeated.

Figure 46:
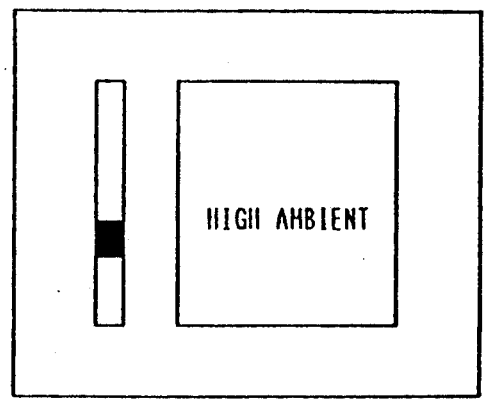

The display examples of the warning displays 1 through 3 are shown in FIGS. 45 through 47. The warning display 1 corresponds to the case in which a peripheral temperature obtained by a calculation is a value which causes a failure, and the displays 2 and 3 correspond to a value which causes the lowering of the function. Since warning messages are thus displayed in a plurality of stages in correspondence with the peripheral temperature, a user can correctly estimate measured data watching this display.

Figure 48:
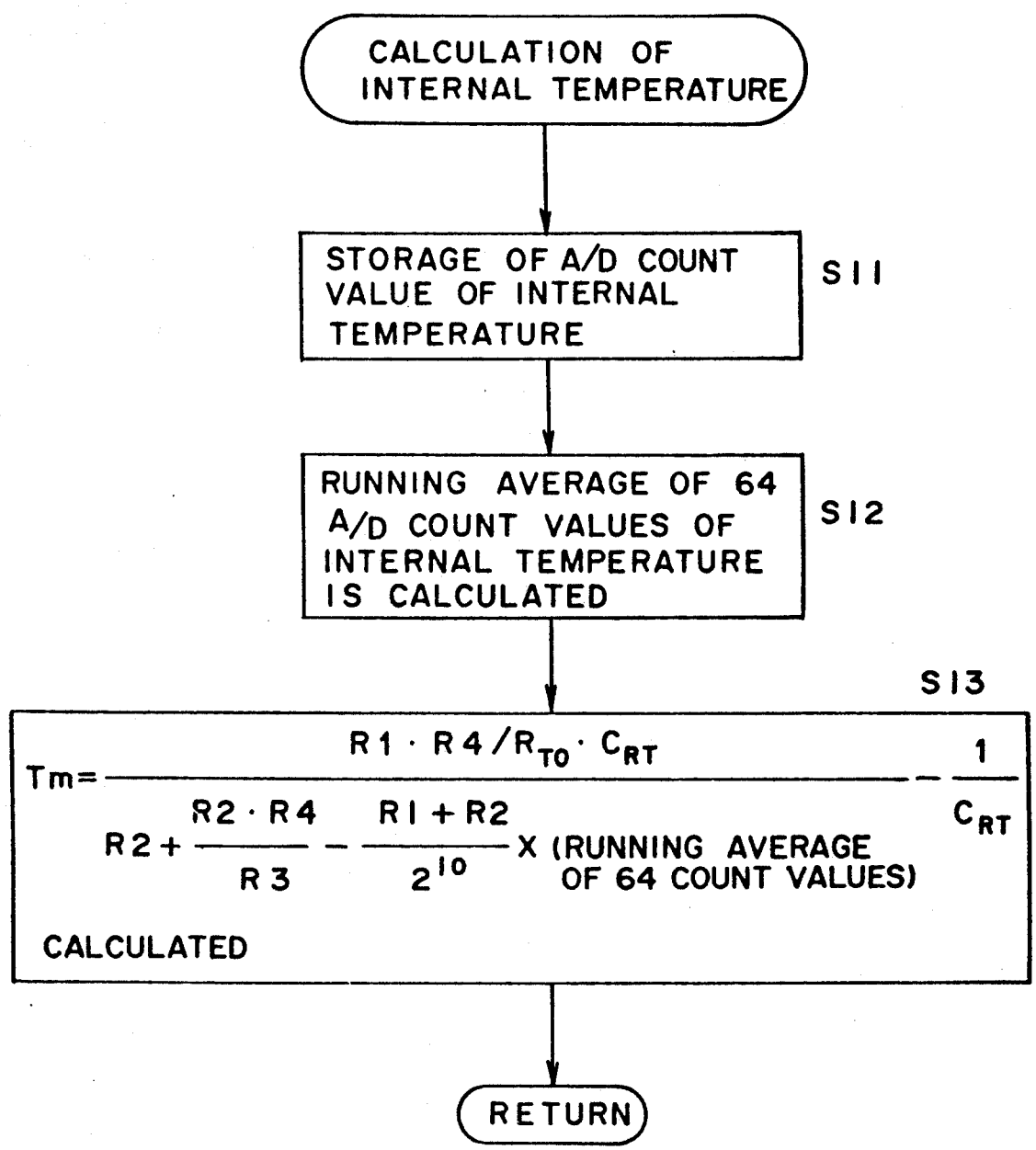
FIG. 48 is a flowchart of a procedure for calculating an internal temperature according to step S1 in the flowchart of FIG. 44.

Next, the procedure, for calculating the internal temperature according to step S1 shown by the flowchart of FIG. 44, will be described using the flowchart of FIG. 48.

First, the CPU of the operation control section 12 sets the level of the output port (C) to "H" and stores a digital value obtained by A/D-converting the output voltage corresponding to the internal temperature of the internal temperature detecting circuit 18 (S11). Next, the running average of 64 A/D count values of the internal temperature stored at step S11 are performed (S12). The running average means that the average of an (i)th value through an (i+j)th value is calculated, then, the average of an (i+1)th value through an (j+1)th value is calculated, so that the average of (j-i+1) pieces of data is always obtained. The average of 64 pieces of A/D count values is obtained according to this method. Subsequently, the operation of the internal temperature Tm is performed using the running average value of the 64 pieces of A/D count values at each time when a new running is obtained (S13). This operation is performed based on the above equation (20). In the flowchart, the resolution bit number (N) is 10. Thus, the processing for calculating the internal temperature terminates, and the program returns to step S2, of FIG. 44, at which the peripheral temperature is estimated and to which peripheral temperature checking step and warning display loop are subsequent.

Figure 44:
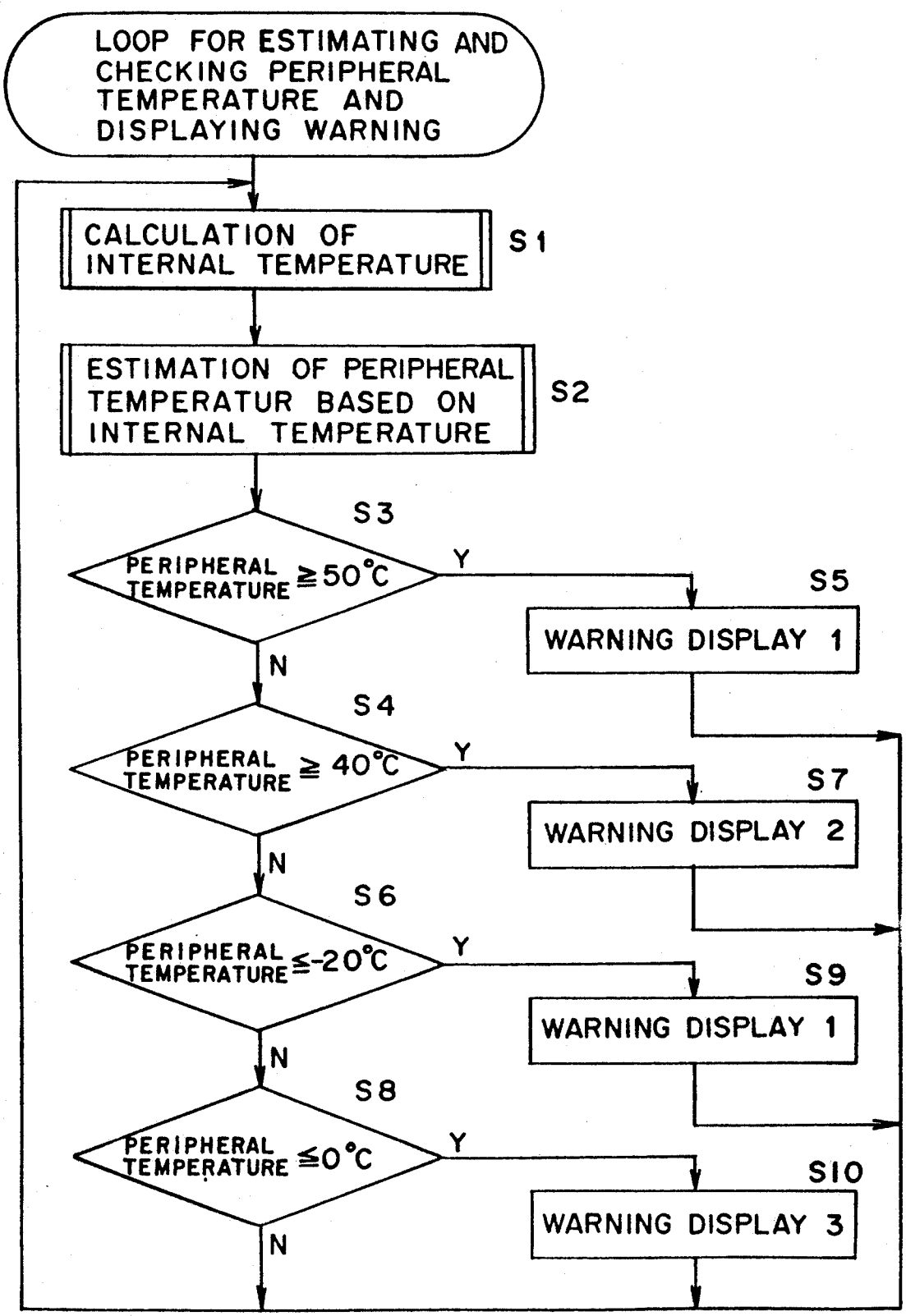
FIG. 44 is a flowchart of a procedure for calculating a peripheral temperature based on an internal temperature, checking the peripheral temperature, and outputting a warning display.
Figure 49:
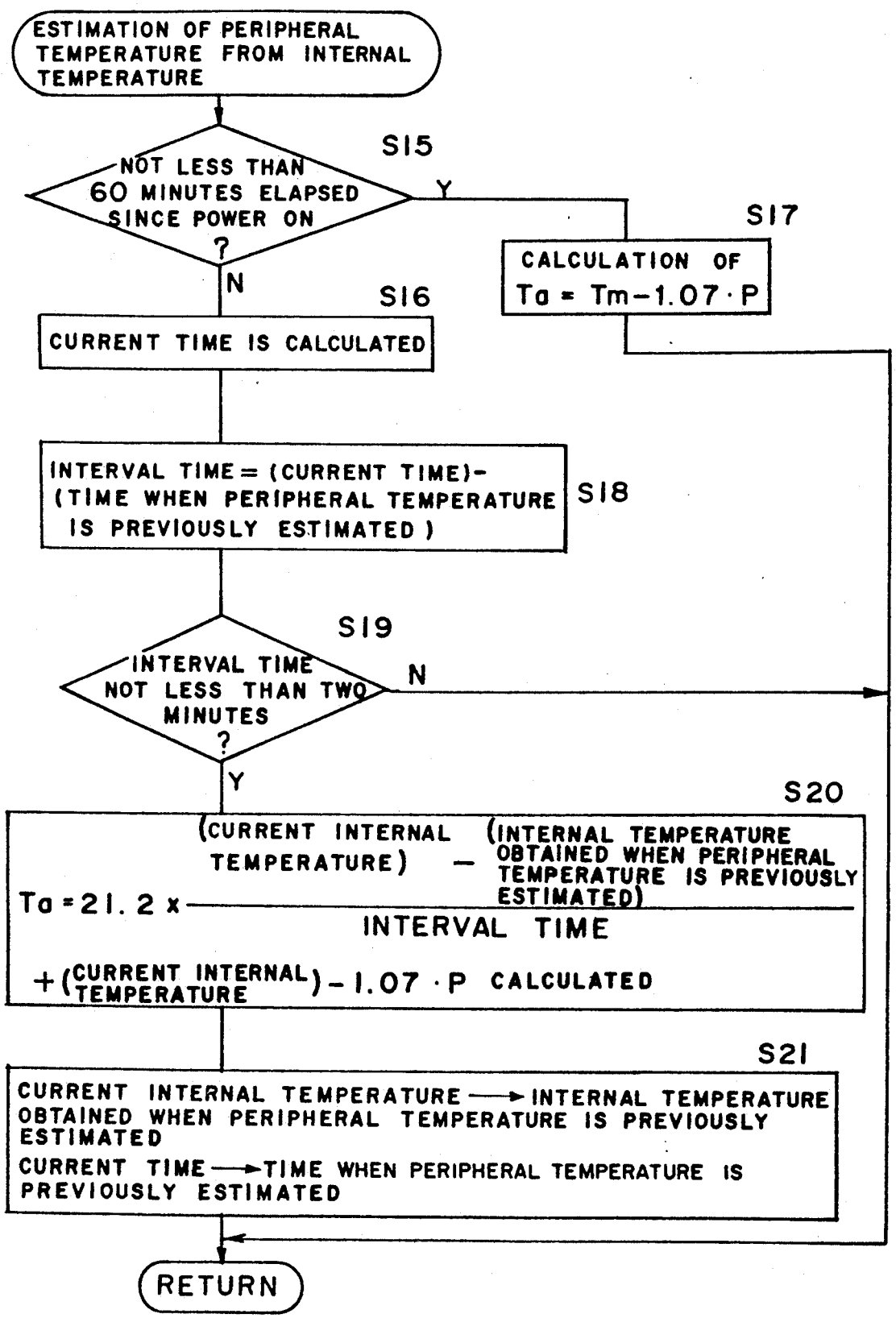
FIG. 49 is a flowchart of a procedure for estimating a peripheral temperature from the internal temperature at step S2 in FIG. 44.

Next, the procedure, for estimating the peripheral temperature from the internal temperature at step S2 of FIG. 44, is described using the flowchart of FIG. 49.

First, it is checked whether or not the drive period of time of the infrared image pick-up apparatus has elapsed not less than 60 minutes from the time when the power is turned on, based on the operating time signal outputted by the timer 141 (S15), and if the drive period of time is not less than 60 minutes as a result of this decision, the peripheral temperature Ta is calculated (S17), then, the program returns to S3 of the initial flowchart of FIG. 44. "P" of S17 signifies power consumption of the image pick-up apparatus.

If it is decided at step S15 that the drive time is less than 60 minutes, the current time is calculated (S16), then, an interval time (minute) is calculated according to the current time and the time when the previous peripheral temperature is estimated (S18). Thereafter, it is checked whether or not the interval time is not less than two minutes (S19), and if it is decided that the interval time is less than two minutes, the program returns to S3 of the initial flowchart. On the other hand, if the interval time is not less than two minutes, the program goes to step S20 at which the peripheral temperature Ta is calculated using the interval time calculated at S18. This calculation is based on the above equation (14). Next, the current internal temperature and the current time are stored to estimate the next peripheral temperature (S21), then the program returns to S3 of the initial flowchart. Thus, the estimation and operation of the peripheral temperature terminate.

As described above, according to the further embodiment of the present invention, a peripheral temperature can be estimated according to a detected internal temperature value without externally providing the apparatus with a means for measuring the peripheral temperature and it is possible to correctly measure the temperature of an object of a low emissivity.

Further, the peripheral temperature is estimated by considering from only the internal temperature and the operating time but also the power consumption. Therefore, the temperature of an object is correctly measured.

Further, the nonuniformity of the peripheral temperature which occurs due to the quantization error of the A/D conversion can be reduced by averaging internal temperatures.

In addition, according to warning displays made in a plurality of stages in correspondence with peripheral temperatures, a user can accurately distinguish whether the peripheral temperature causes the failures of the infrared image pick-up apparatus or an error in measuring a temperature due to the function deterioration of an IC or the like even if the infrared image pick-up apparatus does not fail.

TABLE 4

| t (min) | Ta (measured value) | Ta (calculated value) | measurement value - calculation value | Tm | dTm/dt | Tm-1.07 P |
|---|---|---|---|---|---|---|
| 0 | 24.3 | | | | | |
| 2 | 24.5 | | | 25.0 | | |
| 4 | 24.4 | 24.9 | −0.5 | 25.8 | 0.4 | 16.4 |
| 6 | 24.4 | 25.7 | −1.3 | 26.6 | 0.4 | 17.2 |
| 8 | 24.5 | 24.2 | 0.3 | 27.2 | 0.3 | 17.8 |
| 10 | 24.5 | 24.8 | −0.3 | 27.8 | 0.3 | 18.4 |
| 12 | 24.3 | 21.9 | 2.4 | 28.1 | 0.15 | 18.7 |
| 14 | 24.3 | 24.5 | −0.2 | 28.6 | 0.25 | 19.2 |
| 16 | 24.8 | 27.4 | −2.6 | 29.3 | 0.35 | 19.9 |
| 18 | 25.2 | 27.0 | −1.8 | 30.0 | 0.3 | 20.6 |
| 20 | 25.4 | 27.6 | −2.2 | 30.6 | 0.3 | 21.2 |
| . | | | | | | |
| 26 | 24.3 | 25.7 | −1.4 | 30.8 | 0.2 | 21.4 |
| 28 | 24.3 | 24.9 | −0.6 | 31.1 | 0.15 | 21.7 |
| 30 | 24.6 | 24.1 | 0.5 | 31.3 | 0.1 | 21.9 |
| 32 | 24.4 | 26.6 | −2.2 | 31.7 | 0.2 | 22.3 |
| 36 | 24.5 | 25.5 | −1.0 | 32.2 | 0.125 | 22.8 |
| 40 | 24.6 | 24.1 | 0.5 | 32.4 | 0.05 | 23.0 |
| 44 | 24.3 | 24.3 | 0 | 32.6 | 0.05 | 23.2 |
| 48 | 23.9 | 23.9 | 0 | 32.7 | 0.025 | 23.3 |
| 52 | 23.9 | 24.6 | −0.7 | 32.9 | 0.05 | 23.5 |
| 56 | 23.8 | 24.8 | −1.0 | 33.1 | 0.05 | 23.7 |
| . | | | | | | |
| 68 | 24.0 | 25.2 | −1.2 | 33.5 | 0.05 | 24.1 |
| . | | | | | | |
| 72 | 24.0 | 24.8 | −0.8 | 33.6 | 0.025 | 24.2 |

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An infrared image pick-up apparatus for obtaining a two-dimensional infrared image by detecting an infrared ray emitted from an object, comprising:
   a body having a condenser lens for condensing the infrared ray emitted from the object, a sensor for detecting intensity of the ray condensed by the condenser lens and generating an electric signal corresponding to the intensity, and a signal processing circuit for processing the signal outputted from the sensor;
   a grip attached to said body;
   a grip rotating means having a rotary shaft on a plane perpendicularly to an incident optical axis of the ray injecting into said body from the object, said means attaching said grip to said body so that said grip rotates around the rotary shaft on a plane parallel to the incident optical axis;
   a lock means for releasably locking said grip at a desired position thereof with respect to said body;
   an electronic finder for displaying a two-dimensional infrared image in accordance with the signal processed by the signal processing circuit of said body, and
   means for attaching said finder to said body so that said finder rotates on a plane parallel to the plane where said grip rotates and said finder is capable of releasably locking at a desired position thereof.

2. An infrared image pick-up apparatus as claimed in claim 1, wherein the grip has operation keys necessary to operate said body.

3. An infrared image pick-up apparatus as claimed in claim 1, wherein said grip is capable of rotating around the rotary shaft within 180 degrees.

4. An infrared image pick-up apparatus comprising:
   a body having a condenser lens for condensing an infrared ray emitted from an object, a sensor for detecting intensity of the ray condensed by the condenser lens and generating an electric signal corresponding to the intensity, a signal processing circuit for processing the signal outputted from the sensor, and a display means for displaying a two-dimensional infrared image in accordance with a signal outputted from said signal processing circuit; and
   a grip attached to said body, said grip having an operating member for adjusting a focus condition of the infrared image.

5. An infrared image pick-up apparatus as claimed in claim 4, wherein said grip comprises a pair of grip members to be supported with both hands of a user, each grip member having the operating member.

6. An infrared image pick-up apparatus as claimed in claim 4, wherein said grip has a plurality of supporting surfaces, and the operating member is arranged at each of at least two supporting surfaces.

7. An infrared image pick-up apparatus comprising:
   a body having a condenser lens for condensing an infrared ray emitted from an object, a sensor for detecting intensity of the ray condensed by the condenser lens and generating an electric signal corresponding to the intensity, a signal processing circuit for processing the signal outputted from the sensor, and a display means for displaying a two-dimensional infrared image in accordance with a signal outputted from said signal processing circuit; and
   a grip attached to said body, said grip having a pair of grip members to be supported with both hands of a user.

8. An infrared image pick-up apparatus as claimed in claim 7, further comprising a grip rotating means having a rotary shaft on a plane perpendicular to an incident optical axis of a ray entering into said body from the object, said means attaching said grip to said body so that said grip rotates around the rotary shaft on a plane parallel to the incident optical axis.

9. An infrared image pick-up apparatus as claimed in claim 7, wherein said grip is arranged on an object side of said body.

10. An infrared image pick-up apparatus as claimed in claim 7, wherein said grip has a plurality of operating members, and each grip member has at least one operating member.

11. An infrared image pick-up apparatus comprising:
   a condenser lens for condensing an infrared ray emitted from an object;
   a sensor for detecting intensity of the ray condensed by said condenser lens and generating an electric signal corresponding to the intensity;
   a signal processing means for processing the signal outputted from said sensor;
   a display means for displaying a first display mode in which a display of a two-dimensional infrared image is carried out in accordance with a signal outputted from said signal processing means, and a second display mode in which a display other than an infrared image is carried out;

a display mode selecting means for selecting one of the display modes of said display means;

an operating means having a first operating member for adjustment in the first display mode and a second operating member for adjustment in the second display mode; and a control means for controlling the first operating member to effectively function in selecting the first display mode and the second operating member to effectively function in selecting the second display mode.

12. An infrared image pick-up apparatus as claimed in claim 11, wherein a body has said condenser lens, said sensor, said signal processing means, said display means, the second operating member of said operating means, and said control means, and a grip is provided separately from the body, attached to the body, and has the first operating member of said operating means.

13. An infrared image pick-up apparatus comprising:
a condenser lens for condensing an infrared ray emitted from an object;
a sensor for detecting intensity of the ray condensed by said condenser lens and generating an electric signal corresponding to the intensity;
a signal processing circuit for processing the signal outputted from said sensor, said signal processing circuit having an offset change means;
a display means for simultaneously displaying both the intensity of the ray as a two-dimensional image in accordance with a signal processed by said signal processing circuit and an offset level, which is served as reference intensity of an infrared ray in displaying the image in accordance with the signal processed by said signal processing circuit; and
a control means for controlling the offset change means to change the offset level and a change speed of the offset level.

14. An infrared image pick-up apparatus as claimed in claim 13, further comprising an operating member for changing the offset level, wherein the change speed of the offset level is changed by said control means in accordance with an operating amount of said operating member.

15. An infrared image pick-up apparatus as claimed in claim 13, the change speed of the offset level is changed by said control means in accordance with the signal processed by said signal processing circuit.

16. An infrared image pick-up apparatus as claimed in claim 15, wherein said signal processing circuit further comprises a gain change means for changing a gain to amplify the signal outputted from said sensor while the offset level being changed, and said control means changes the change speed of the offset level in accordance with the gain changed by said gain change means.

17. An infrared image pick-up system comprising an infrared image pick-up apparatus and an external apparatus electrically connecting with said pick-up apparatus,
said pick-up apparatus comprising:
a condenser lens for condensing an infrared ray emitted from an object;
a sensor for detecting intensity of the ray condensed by said condenser lens and generating an electric signal corresponding to the intensity;
a control means for processing a signal outputted from said sensor and controlling function of said pick-up apparatus;
a display means for displaying in accordance with control of said control means; and
an interface for inputting a signal outputted from said external apparatus;
said external apparatus comprising:
a data originating means for originating data for controlling the function of said pick-up apparatus; and
a data output means for outputting a data signal originated by said data originating means to said interface,
whereby said control means controls the function of said pick-up apparatus on the basis of the data signal from said external apparatus.

18. An infrared image pick-up system as claimed in claim 17, wherein said pick-up apparatus further comprises an operation key for setting and changing the function of said pick-up apparatus, and said control means controls allowance and prohibition of setting and changing of the function of said pick-up apparatus by operating said operation key in accordance with the data signal from external apparatus.

19. An infrared image pick-up system comprising an infrared image pick-up apparatus and an external apparatus electrically connecting with said pick-up apparatus,
said pick-up apparatus comprising:
a condenser lens for condensing an infrared ray emitted from an object;
a sensor for detecting intensity of the ray condensed by said condenser lens and generating an electric signal corresponding to the intensity;
a control means for processing a signal outputted from said sensor and controlling function of said pick-up apparatus;
a display means for displaying in accordance with control of said control means; and
an interface for outputting a signal to said external apparatus;
said external apparatus comprising:
a data input means for inputting the signal outputted from said pick-up apparatus through said interface; and
a data processing means for processing the signal inputted into said data input means.

20. An infrared image pick-up apparatus comprising:
a body having an condenser lens for condensing an infrared ray emitted from an object, a sensor for detecting intensity of the ray condensed by the condenser lens and generating an electric signal corresponding to the intensity, a signal processing circuit for processing the signal outputted from the sensor to adjusting the infrared image, and a display means for displaying a two-dimensional infrared image in accordance with a signal outputted from said signal processing circuit; and
a grip attached to said body, said grip having an operating member for controlling the operation of said signal processing circuit.

21. An infrared image pick-up apparatus as claimed in claim 20, wherein the signal processing circuit adjusts an offset level which serves as a reference intensity of an infrared ray in displaying the image, and the operating member selects one of a first mode for automatically carrying out the adjustment of the signal processing circuit and a second mode for manually carrying out the adjustment.

22. An infrared image pick-up apparatus as claimed in claim 20, wherein the signal processing circuit outputs a first signal for brightly displaying the infrared image by the display means in accordance with a high intensity output from the sensor and darkly displaying the infrared image by the display means in accordance with a low intensity output from the sensor and a second signal for darkly displaying the infrared image by the display means in accordance with the high intensity output from the sensor and brightly displaying the infrared image by the display means in accordance with the low intensity output from the sensor, and the operating member selects one of a first mode where the signal processing circuit outputs the first signal and a second mode where the signal processing circuit outputs the second signal.

23. An infrared image pick-up apparatus as claimed in claim 20, wherein the signal processing circuit has a means for storing an output from the sensor at a predetermined timing and outputting the stored signal, and the operating member enables the storing means to operate.

24. An infrared image pick-up apparatus as claimed in claim 20, wherein the signal processing circuit amplifies the electric signal, and the operating member adjusts a gain of the electric signal.

25. An infrared image pick-up apparatus for obtaining a two-dimensional infrared image by detecting an infrared ray emitted from an object, comprising:
  a body having a condenser lens for condensing the infrared ray emitted from the object, a sensor for detecting intensity of the ray condensed by the condenser lens and generating an electric signal corresponding to the intensity, and a signal processing circuit for processing the signal outputted from the sensor;
  a grip attached to said body;
  a grip rotating means projected forward from a front surface of the body and having a rotary shaft on a plane perpendicularly to an incident optical axis of the infrared ray entering into said body from the object, said means attaching said grip to said body so that said grip rotates around the rotary shaft on a plane parallel to the incident optical axis; and
  a lock means for releasably locking said grip a two desired grip positions thereof corresponding to two predetermined attitudes with respect to said body.

26. An infrared image pick-up apparatus for obtaining a two-dimensional infrared image by detecting an infrared ray emitted from an object, as claimed in claim 25, wherein one of the grip positions corresponds to a first attitude and the other of the grip positions corresponds to a second attitude which is rotated from the first attitude by approximately 180 degrees.

27. An infrared image pick-up apparatus for obtaining a two-dimensional infrared image by detecting an infrared ray emitted from an object, comprising:
  a body having a condenser lens for condensing the infrared ray emitted from the object, a sensor for detecting intensity of the ray condensed by the condenser lens and generating an electric signal corresponding to the intensity, and a signal processing circuit for processing the signal outputted from the sensor;
  a grip attached to said body;
  a grip rotating means having a rotary shaft on a plane perpendicularly to an incident optical axis of the ray injecting into said body from the object, said means attaching said grip to said body so that said grip rotates around the rotary shaft on a plane parallel to the incident optical axis;
  a lock means for releasably locking said grip at a desired position thereof with respect to said body; and
  a CRT rotatably attached to said body so that said CRT rotates on a plane parallel to the plane where said grip rotates and said CRT is capable of releasably locking at a desired position thereof.

* * * * *